(12) United States Patent
Boguraev

(10) Patent No.: US 6,212,494 B1
(45) Date of Patent: *Apr. 3, 2001

(54) METHOD FOR EXTRACTING KNOWLEDGE FROM ONLINE DOCUMENTATION AND CREATING A GLOSSARY, INDEX, HELP DATABASE OR THE LIKE

(75) Inventor: Branimir K. Boguraev, Los Gatos, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/119,166

(22) Filed: Jul. 20, 1998

Related U.S. Application Data

(63) Continuation of application No. 08/314,589, filed on Sep. 28, 1994, now Pat. No. 5,799,268.

(51) Int. Cl.$^7$ .............................. G06F 17/21; G06F 17/30
(52) U.S. Cl. ............................... 704/9; 704/10; 707/102; 707/531; 395/703
(58) Field of Search .................................. 704/1, 9, 10, 8; 707/530, 531, 532, 100, 102, 104, 3, 4, 5, 1; 395/703, 707, 708

(56) References Cited

U.S. PATENT DOCUMENTS

| | | | |
|---|---|---|---|
| 4,965,763 | * 10/1990 | Zamora | 704/1 |
| 4,992,972 | * 2/1991 | Brooks et al. | 345/338 |
| 5,274,818 | * 12/1993 | Vasilevsky et al. | 395/705 |
| 5,276,616 | * 1/1994 | Kuga et al. | 704/10 |
| 5,278,980 | * 1/1994 | Pedersen et al. | 707/4 |
| 5,424,947 | * 6/1995 | Nagao et al. | 704/9 |
| 5,475,587 | * 12/1995 | Anick et al. | 704/9 |
| 5,708,822 | * 1/1998 | Wical | 704/1 |
| 5,799,268 | * 8/1998 | Boguraev | 704/9 |
| 5,860,075 | * 1/1999 | Hashizume et al. | 707/530 |

FOREIGN PATENT DOCUMENTS 0 262 938 A1 * 4/1988 (EP) .

OTHER PUBLICATIONS

Alan F. Smeaton: "Natural Language Processing and Information Retrieval", Information Processing and Management, vol. 26, No. 1, pp. 73–92, 1990.*

DIALOG file 148, Acc. No. 07238482: Mark Wolff: "Post-structuralism and the ARTFUL Database: Some Theoretical Considerations", Information Technology and Libraries, col. 13, No. 1, pp. 35–42, Mar. 1994.*

L.L.Briner: "Identifying Keywords in Text Data Processing", Directions and Challenges, Fifteenth Annual Technical Symposium, pp. 85–90, Jun. 17, 1996.*

* cited by examiner

*Primary Examiner*—Joseph Thomas
(74) *Attorney, Agent, or Firm*—Blakely, Sokoloff, Taylor & Zafman

(57) ABSTRACT

A method involving computer-mediated linguistic analysis of online technical documentation to extract and catalog from the documentation knowledge essential to, for example, creating a online help database useful in providing online assistance to users in performing a task. The method comprises stripping markup tags from the documentation, linguistically analyzing and annotating the text, including the steps of morphologically and lexically analyzing the text, disambiguating between possible parts-of-speech for each word, and syntactically analyzing and labeling each word. The method further comprises the steps of combining the linguistically analyzed, annotated, and labeled text and previously stripped markup information into a merged file, mining the merged file for domain knowledge, including the steps of identifying and creating a list of technical terminology, mining the merged file for manifestations of domain primitives and maintaining a list of manifestations of such domain primitives in an observations file, analyzing the discourse context of each sentence or phrase in the merged file, analyzing the frequency of manifestations of domain primitives in the observations file to determine those that are important, expanding the list of key terms by searching for terms sanctioned by a domain primitive deemed important in the previous step, and searching the merged file for larger relations by searching for particular lexico-syntactic patterns involving key terms and manifestations of domain primitives previously identified. The method further comprises the steps of structuring the knowledge thus mined and building a domain catalog.

7 Claims, 13 Drawing Sheets

"... use a commercial disk repair program for initializing the disk ...."

... use </base "use"> </lfeats > </pos N> </mfeats NOM SG> </syn @APP @NN> @<P> </base "use"> </lfeats <as/SVOC/A> <SVO> <SV>> </pos V> </mfeats IMP VFIN> </syn @+FMAINV> </base "use"> </lfeats <as/SVOC/A> <SVO> <SV>> </pos V> </mfeats PRES -SG3 VFIN> </syn @+FMAINV> a </base "a"> </lfeats <Indef>> </pos DET> </mfeats CENTRAL ART SG> </syn @DN>> commercial </base "commercial"> </lfeats > </pos A> </mfeats ABS> </syn @AN>> disk </base "disk"> </lfeats > </pos N> </mfeats NOM SG> </syn @NN>> repair </base "repair"> </lfeats > </pos N> </mfeats NOM SG> </syn @SUBJ @OBJ @APP @NN> @<P> program </base "program"> </lfeats <SVO>> </pos V> </mfeats PRES -SG3 VFIN> </syn @+FMAINV> </base "program"> </lfeats > </pos N> </mfeats NOM SG> </syn @OBJ @APP @<P> for </base "for"> </lfeats > </pos PREP> </mfeats > </syn @ADVL> initializing </base "initialize"> </lfeats <SVO>> </pos PCP1> </mfeats > </syn @SUBJ @OBJ @NN> @+FMAINV> the </base "the"> </lfeats <Def>> </pos DET> </mfeats CENTRAL ART SG/PL> </syn @DN>> disk </base "disk"> </lfeats > </pos N> </mfeats NOM SG> </syn @OBJ @APP> ...

FIG. 4

Initializing a hard disk

Most hard disks are pre-initialized when you buy them. Occasionally a hard disk may become damaged in such a way that you have to reinitialize it. You lose all the information on a disk when you reinitialize it.

If your hard disk's icon does not appear on the desktop, first try to repair it as described in "Testing and Repairing Disks" later in this chapter. If you can't repair the disk, use the Apple HD SC Setup program to reinitialize the disk. The program is on the floppy disk called Disk Tools or on the CD-ROM disc that contains system software.

> WARNING If you purchased a hard disk with the A/UX operating system installed on it, do not initialize the hard disk; doing so will erase A/UX. See the instructions that came with the A/UX operating system.

1. Insert the Disk Tools or the CD-ROM disc that contains system software and turn on your computer.

2. Locate the Apple HD SC Setup icon and open it.

The name of the hard disk currently selected is shown as the "volume name." The SCSI ID number of the selected hard disk is displayed above the Drive button. (The ID number of an internal hard disk is 0.)

3. Click Drive until the disk you want to initialize appears.

FIG. 7

Initializing a [hard disk]~901

Most [hard disks] are pre-initialized when you buy them. Occasionally a [hard disk] may become damaged in such a way that you have to reinitialize it. You lose all the information on a disk when you reinitialize it.

If your [hard disk]s icon does not appear on the desktop, first try to repair it as described in "Testing and Repairing Disks" later in this chapter. If you can't repair the disk, use the [Apple HD SC Setup program] to reinitialize the disk. The program is on the [floppy disk]~902 called [Disk Tools] or on the [CD-ROM disc] that contains [system software].

WARNING If you purchased a [hard disk] with the [A/UX operating system] installed on it, do not initialize the [hard disk]; doing so will erase A/UX. See the instructions that came with the [A/UX operating system]

1 Insert the [Disk Tools] or the [CD-ROM disc] that contains [system software] and turn on your computer.

2 Locate the [Apple HD SC Setup icon] and open it.

The name of the [hard disk] currently selected is shown as the "volume name."
The [SCSI ID number] of the selected [hard disk] is displayed above the Drive button. (The [ID number] of an [internal hard disk] is 0.)

3 Click Drive until the disk you want to initialize appears.

Initializing a hard disk

Most hard disks are pre-initialized when you buy them. Occasionally a hard disk may become damaged in such a way that you have to reinitialize it. You lose all the information on a disk when you reinitialize it.

If your hard disk's icon does not appear on the desktop, first try to repair it as described in "Testing and Repairing Disks" later in this chapter. If you can't repair the disk, use the Apple HD SC Setup program to reinitialize the disk. The program is on the floppy disk called *Disk Tools* or on the CD-ROM disc that contains system software.

WARNING If you purchased a hard disk with the A/UX operating system installed on it, do not initialize the hard disk; doing so will erase A/UX. See the instructions that came with the A/UX operating system.

1  Insert the *Disk Tools* or the CD-ROM disc that contains system software and turn on your computer.

2  Locate the Apple HD SC Setup icon and open it.

The name of the hard disk currently selected is shown as the "volume name." The SCSI ID number of the selected hard disk is displayed above the Drive button. (The ID number of an internal hard disk is 0.)

3  Click Drive until the disk you want to initialize appears.

FIG. 12

Initializing a hard disk

Most hard disks are pre-initialized when you buy them. Occasionally a hard disk may become damaged in such a way that you have to reinitialize it. You lose all the information on a disk when you reinitialize it. — 1201

If your hard disk's icon does not appear on the desktop, first try to repair it as described in "Testing and Repairing Disks" later in this chapter. If you can't repair the disk, use the Apple HD SC Setup program to reinitialize the disk. The program is on the floppy disk called *Disk Tools* or on the CD-ROM disc that contains system software.

WARNING If you purchased a hard disk with the A/UX operating system installed on it, do not initialize the hard disk; doing so will erase A/UX. See the instructions that came with the A/UX operating system.

1 Insert the *Disk Tools* or the CD-ROM disc that contains system software and turn on your computer.

2 Locate the Apple HD SC Setup icon and open it. — 1202
  The name of the hard disk currently selected is shown as the "volume name." — 1203
  The SCSI ID number of the selected hard disk is displayed above the Drive button. (The ID number of an internal hard disk is 0.)

3 Click Drive until the disk you want to initialize appears. — 1204

1301 — if you can't X = $problem,
( then ) Y = $solution
1302 — { what-if ( $problem, $solution ) }
"if you can't repair the disk, use the Apple HD SC Setup Program to reinitialize the disk"

1303 — use, NP = $term, $VERB_PHRASE = $goal
{ term-use ( $term, $goal ) }
1304 — "use the Apple HD SC Setup Program to reinitialize the disk"

1305 — - ( N ( which | that ) X ) = $defn -
NP = $term
{ term-defn ( $term, $defn ) }
1306 — "viruses-programs that damage files or erase disks-"

--- hard disk —1311
Properties:
  pre-initialized
  damaged
Relations:
  test
  repair
  initialize
  reinitialize
Associated with:
  icon
  SCSI id number
What id I can't: —1310
  repair [self]
  initialize [self]

Apple HD SC Setup program: —1307
Use for: —1308
  reinitialize hard disk virus —1312
Definition:
  programs that damage files or erase disks

1309

1300

METHOD FOR EXTRACTING KNOWLEDGE FROM ONLINE DOCUMENTATION AND CREATING A GLOSSARY, INDEX, HELP DATABASE OR THE LIKE

This is a continuation of application Ser. No. 08/314,589, filed Sep. 28, 1994, now U.S. Pat. No. 5,799,268.

BACKGROUND OF THE INVENTION

The present invention relates to natural language processing of textual information in a data processing system. Specifically, the invention relates to a process comprising computer-mediated linguistic analysis of online technical documentation and extraction of representative text from the documentation to acquire knowledge essential to, for example, providing assistance to users in performing a task.

Reference books, user guides, instructional manuals, and similar types of technical documentation have long been a main source of background information (as opposed to foreground information, e.g., as found in newspapers) useful to individuals in developing the knowledge necessary to perform some task such as operating an apparatus or item of equipment, for example, a digital computer. The primary purpose of this genre of text is to assist a user of the apparatus to which the material is applicable in operating the apparatus.

More recently, with the proliferation of digital computers in all facets of modern society, and, more specifically, with the advent of desktop computers in the home and the workplace, such assistance has usually taken the form of an online help facility, that is, information useful in assisting the user in performing some task is made available at the user display device of the desktop computer by means of electronic retrieval. This type of assistance is commonly referred to as online assistance or online help. The text of the information may be stored locally in a database file (which may also be referred to as an online help database, or simply, help database) in electronic media on a memory storage device such as a hard disk drive or optical drive coupled to the desktop computer. Alternatively, the text of the information may be stored in a file on a memory storage device coupled to a server which the desktop computer accesses by way of a data network to which the desktop computer, participating as a client in the data network, may be coupled. In either case, the information may be retrieved from the memory storage device and displayed on the user display device as directed by commands input by the user from an input device such as a keyboard, mouse, pen device, etc. In a desktop computing environment, some form of online assistance is provided, usually with respect to some aspect of operating the desktop computer or performing a specific task involving an application program, e.g., a wordprocessor or spreadsheet application.

In the context of online assistance, early versions of assistance generally provide information regarding what tasks or functions can be accomplished with the tools and commands of a computer operating system or software application, and/or what is the proper syntax or procedure for invoking such a command. For example, an early form of online assistance termed Balloon Help (in which explanatory text is displayed in a small pop-up window shaped like the balloons used for dialog in comic strips) is provided on Apple Macintosh computers operating under version System 7 and later versions of the Apple Macintosh Operating System. Using Balloon Help, a user of an Apple Macintosh computer can determine the function of potentially any command, symbol, window, icon, or object visible on the user display device, i.e., the screen of the Apple Macintosh computer. When a user enables this form of online assistance, short, descriptive text messages appear on the screen describing the function performed by a particular command, symbol, or object whenever the user places the cursor on the command, symbol, or object in question.

More recent versions of online assistance provide a more comprehensive form of online assistance that not only provides assistance regarding functions of objects, but also what tasks can be accomplished with these objects, as well as how to accomplish the tasks. For example, with reference to FIG. 11 a novel metaphor of online assistance termed Apple Guide is provided on Apple Macintosh computers operating under version System 7.5 and later versions of the Apple Macintosh Operating System. Apple Guide provides online interactive instructions in response to user questions. An answer is provided to a user inquiry by leading the user through a series of interactive windows to a window or sequence of panels that contains explanatory text. An online help database behind the Apple Guide user interface provides the explanatory (coaching) text. Referring to FIG. 1, the user may begin the navigation through a series of windows upon selecting assistance by topic 102, index 103 or "look for" 104 (where an attempt is made to map a free form user query onto an appropriate answer script from the help database) from an access window 101 (here, the Full Access window as displayed by Macintosh Guide). Using Apple Guide, users of an Apple Macintosh computer are able to obtain online assistance in different forms, including task-oriented procedures on a software application's features, tutorials, advanced features for sophisticated users, and reference material of the type found on quick reference cards.

In early versions of online assistance such as the Balloon Help previously described, the process of determining the content of the database file (herein before and after referred to as the help database) in which is stored the text of information that may be retrieved by online assistance is relatively straightforward. Essentially, the content of the help database is governed by the commands that appear on the user display device or that can be invoked by the user from a user input device. It should be noted that the term command is used here to encompass any object through which a user can control the system or application software running on the digital computer, including, for example, a window, icon, symbol, or text string. The creator, or "author" of the help database simply catalogs each command and provides a short description of its function, or the appropriate syntax for invoking the command, thereby providing a complete enumeration of commands arranged systematically with descriptive details.

In the more recent versions of online assistance, the process of determining the content of the online help database is an arduous, time consuming, and iterative task, typically involving a team of instructional designers. Whereas in earlier versions of online assistance, the author simply cataloged all possible commands and the like, in more recent versions of online assistance, the instructional designers or persons acting in that capacity are not provided with such finite boundaries regarding what information is important and, thus, should be included in the help database. Providing online assistance to questions such as, "how do I do this task?" involves more than just cataloging and describing the functionality of every possible command. The designers need to determine, for example, what task-oriented procedures, what tutorials, what advanced features, and what reference material should be included. This process is one of introspection by the instructional designers. Decisions are made typically on the basis of accumulated experience and intuition acquired primarily by trial and error. One way to proceed is to first determine the key terms in the application domain (which may be composed of one or more words, i.e., which may be phrasal units), the properties thereof, and the relations (i.e., actions) that can be performed on or with the objects defined by the key terms. For example, with reference to FIG. 1, the instructional design team may determine that the term "disk" shown highlighted at 105 in window 101 is important, and thus, should be a key term included in the help database. They may further determine that actions involving the disk such as preparing, ejecting, erasing (displayed in the right half of window 101 at 106) are sufficiently important to include and relate to the key term disk in the help database. Key terms, as well as relations and properties involving those key terms essentially define the domain, i.e., the topic or application, for which online assistance is being developed. These key terms, relations and properties may be cataloged and then expanded upon in creating the help database. A domain catalog (i.e., a catalog comprising key terms, properties thereof, and relations involving those key terms, which essentially define an application domain) from which the help database is created also provides the basis for a suitable index, list of subtopics, or other means by which a user can initiate an inquiry into the help database. This process of determining the content and index to the help database comprises a substantial, nontrivial component of the design and delivery of online assistance for user tasks. It should be noted that determining the content of the help database essentially comprises the steps of 1) determining the core of key terms, relations and properties involving the key terms, e.g., "disk", "ejecting a disk", and "name of disk", and 2) writing definitions for key terms and their relations, e.g., defining "disk" and describing the sequence for "ejecting a disk". As will be seen, it is the first step of the process of determining the content of the help database to which the present invention is directed.

The same difficulty in determining the content of a online help database to be accessed by an online user assistance facility occurs in other contexts as well. For example, in the publishing industry, determining the content of the index or glossary to a reference manual, textbook, or instructional guide involves the same arduous process of determining the key terms, relations, i.e., actions, and properties which are considered sufficiently important to place into the index or glossary.

In a computing environment, for example, the desktop computer environment referred to earlier, the same difficulty arises when providing online delivery of technical documentation, that is, online access to an electronic copy of the technical documentation itself, not a help database derived therefrom. To provide this feature, a facility must exist for mapping a user query onto the appropriate position in the text in the online documentation. This necessitates, in the very least, the creation of an index or catalog of the type discussed above that additionally possesses a mapping or linking of the key terms, relations and properties to the location, e.g., the chapter or section number, page number, paragraph, and potentially, the line number, in the online text document at which they occur.

In a programming environment where it is desired to exchange information or otherwise communicate in some manner between separate software programs or routines, e.g., a mail program and a calendar program, elicitation of the type and format of information operated on and derivation of the basic processes each application is capable of executing is necessary to develop a set of procedures for successful interapplication or interprocess communication. Here, too, software engineers must determine the key terms, relations and properties of each application in order to design appropriate software procedures for successful communication therebetween.

Finally, although this discussion is not intended to set forth an exhaustive list of the environments in which it is necessary to boil down the technical information to its key terms and relations, another environment to which the same process applies is that of information management involving a digital computer, e.g., a desktop computer. For example, a user has access to a file containing a short technical document. The filename or title associated with the file in which the document is stored may not readily convey its content. Furthermore, the content of the document may not be readily discernible without fully reading the document. A content stamp of the document, on the other hand, contains key terms, relations and properties such that it is clear what the document is generally about, without having to read it to determine its content. By content stamping documents then, one is able to more accurately and efficiently manage information accessible from the desktop, whether the documents reside, for example, on a local hard disk or a hard disk of a server accessible via a data network. However, creating a content stamp requires reading a document to pull out the key information which comprises the stamp.

From the foregoing discussion, it can be seen that it is desirable to develop a method of extracting pertinent information from technical documentation which does not require or rely on the discretion of, for example, a team of instructional designers, and which facilitates the creation of a domain catalog containing the information, i.e., the key terms, properties thereof, and relations (activities related to or involving key terms) of the domain. It is further apparent that this desire for another method of extracting and cataloging pertinent information from technical documentation exists regardless of how this cataloged information is put to use, whether it be to fashion the content of a help database for online user assistance, to create an index or glossary for a reference manual, textbook, or instructional guide, or some other use, including, for example, those uses discussed above.

As will be seen, given online technical documentation, the present invention overcomes the above mentioned difficulty in creating the domain catalog from which, for example, the content of a help database underlying an online assistance tool may be determined and generated.

SUMMARY OF THE INVENTION

Described herein is a method involving computer-mediated linguistic analysis of online technical documentation to extract and catalog from the documentation knowledge essential to, for example, creating a online help database useful in providing online assistance to users in performing a task.

An embodiment of the method for creating a catalog comprising key terms, properties thereof, relations involving those key terms for a given topic, i.e., for a given domain, comprises 1) translating an ASCII data file of online technical documentation having a proprietary internal representation for document structure to a standard internal representation for document structure, for example, a standard internal representation generally conforming with the standard general markup language (SGML), 2) generating a stream of straight ASCII text free of markup information by stripping and saving markup tags for later processing, 3) linguistically analyzing and annotating the ASCII text, including the steps of: a) lexically and morphologically analyzing each word of the text to determine its possible lexical and morphological features, b) disambiguating between two or more possible parts of speech that each word may take on within the context of the sentence or phrase in which the word appears, and syntactically analyzing and labeling each word of the text, 4) explicitly labeling the text and linguistic annotations of each word as such to facilitate subsequent mining, 5) combining the linguistically analyzed, annotated, and labeled text and the markup tags stripped in step 2 into a merged file, 6) mining the merged file for knowledge, including the steps of: a) identifying and creating a list of technical terminology (primarily multi-token key terms) and the frequency with which each key term occurs by searching for particular syntactic patterns or sequences, b) mining the merged file for manifestations of domain primitives, i.e., looking for terms, relations and properties that are syntactically related to key terms by searching for particular syntactic patterns and maintaining a list of such manifestations of domain primitives in an observations file, c) analyzing the discourse context of each sentence or phrase in the merged file to more accurately record in the observations file the list of manifestations of domain primitives and avoid incorrect analysis of linguistic observations, d) analyzing the frequency of manifestations of domain primitives in the observations file to determine those that are important and those that are not, e) expanding the list of key terms by searching for terms related to a domain primitive deemed important in the previous step by correlating particular syntactic patterns, and f) given the key terms and manifestations of domain primitives already identified in the previous steps, searching the merged file for larger relations by searching for particular lexico-syntactic patterns involving key terms and manifestations of domain primitives previously identified, and 7) structuring the knowledge thus mined, including the steps of: a) clustering key terms for similarity of use on the basis of repeated manifestations of domain primitives occurring in identical or at least similar syntactic contexts, b) clustering key terms on the basis of proximity in terms of their relative position in the text, and c) building the domain catalog by incorporating, for each key term, those observations which are deemed to be important on the basis of frequency of occurrence in the observations file.

By performing linguistic analysis upon online documentation, it is an object of the present invention to facilitate the arduous process of determining and generating the content of a help database useful in delivering online assistance or reference by automatically creating a domain catalog, that is, a list of what information is important to include in the help database, as indicated by the set of key terms, the relations they participate in, and the properties they display in the domain catalog.

Although an embodiment of the present invention, as it is set forth herein below, is described primarily with reference to, or in the context of determining the content of a help database that drives an online assistance tool such as Apple Guide, it should be noted that this context merely provides an illustration of an environment in which the method of the present invention may be applied.

Another object of the present invention is facilitate the process of developing a set of interprocess communication procedures. By applying the linguistic analyses and natural language technologies according to the method of the present invention to the task of determining the set of procedure calls, function calls, subroutines, data structures, variables, arguments, and other components of software routines or applications, it is possible to derive a software library containing a core set of data elements and procedures for exchanging information including such data elements which may be used to develop interapplication or interprocess communication between software routines. In facilitating the interprocess communication software development process, the present invention is able to linguistically analyze and mine for knowledge (i.e., variables, procedure calls, software routines, etc.) the source code of a software application in the same way it would linguistically analyze and mine for pertinent information in an online technical document. The aforementioned and further objects, features and advantages of the present invention will be apparent from the description and figures which follow.

BRIEF DESCRIPTION OF THE DRAWINGS

The present invention is illustrated by way of example and not limitation in the following figures:

FIG. 4 is an embodiment of a method step of the present invention.

FIG. 7 is a representative page of online technical documentation used by an embodiment of the present invention.

FIG. 9 is an embodiment of a method step of the present invention.

FIG. 11 is an embodiment of a method step of the present invention.

FIG. 12 is an embodiment of a method step of the present invention.

FIG. 13 is a diagram of syntactic patterns and data structure of an embodiment of a method step of the present invention.

Figure 1:
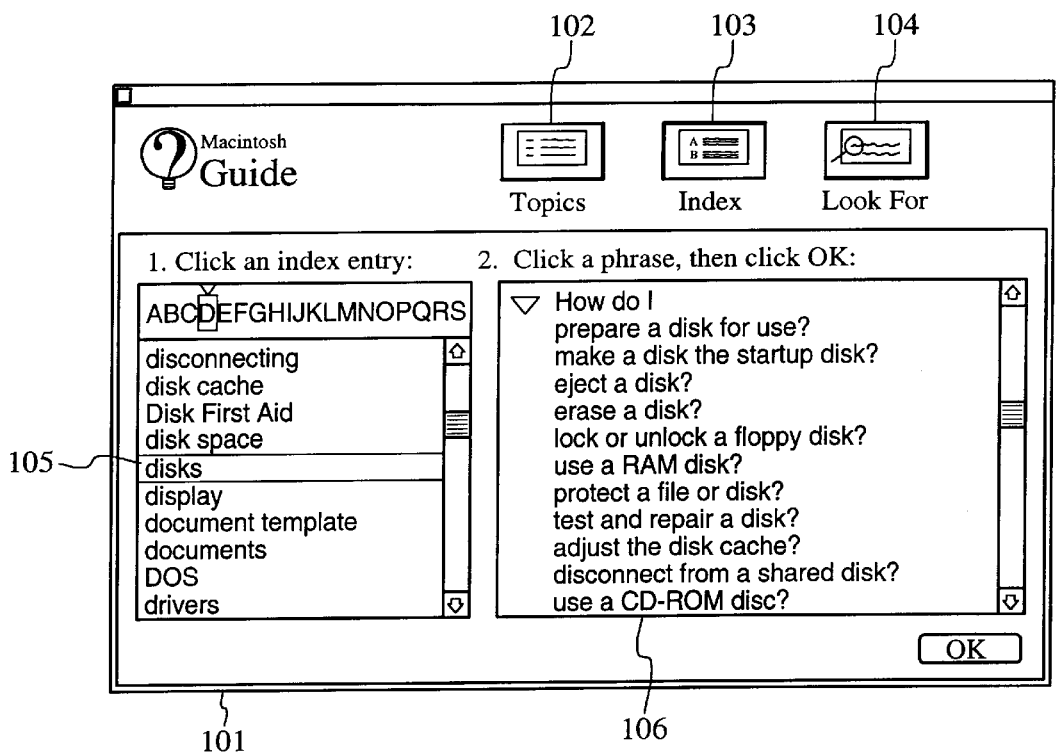
FIG. 1 is an example of a online help facility of the kind to which an embodiment of the present invention may be applied.
Figure 2:
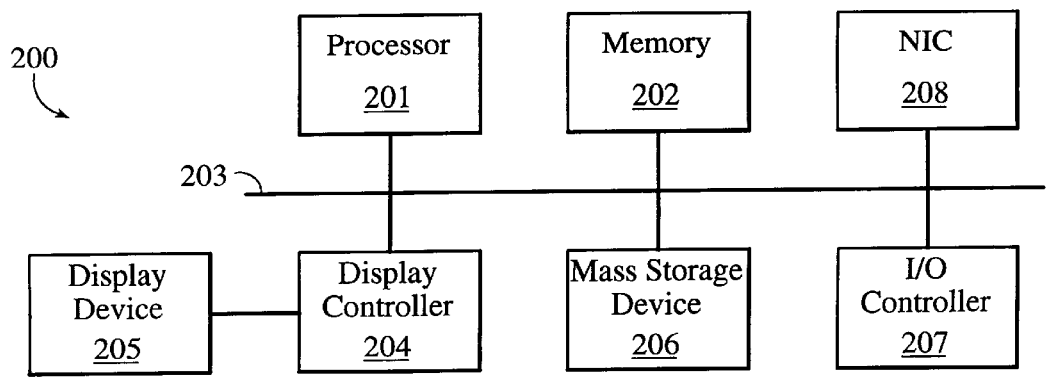
FIG. 2 is a block diagram of an embodiment of a digital computer system of the present invention.

Reference numerals in all of the accompanying drawings typically are in the form "figure number" followed by two digits, xx; for example, reference numerals on FIG. 1 may be numbered 1xx; on FIG. 2, reference numerals may be numbered 2xx. In certain cases, a reference numeral may be introduced on one drawing and the same reference numeral may be utilized on other drawings to refer to the same item.

DETAILED DESCRIPTION OF THE PRESENT INVENTION

Overview

The present invention describes a method involving computer-mediated linguistic analysis of online technical documentation for automatically generating a catalog of pertinent information defining, in a concise formal structure, the domain, i.e., the topic or application about which the online documentation provides detailed background information. In the following description, numerous specific details are set forth describing specific representations of data, specific processing steps, etc., in order to provide a thorough understanding of the present invention. However, it will be apparent to one of ordinary skill in the art to which the present invention pertains, or with which it is most nearly connected, that the present invention may be practiced without the specific details disclosed herein. In other instances, well known systems or processes have not been shown in detail in order not to unnecessarily obscure the present invention.

The present description includes material protected by copyrights, such as illustrations of graphical user interface images or text which the assignee of the present invention owns. The assignee hereby reserves its rights, including copyright, in these materials, and each such material should be regarded as bearing the following notice: Copyright Apple Computer, Inc. The copyright owner has no objection to the facsimile reproduction by anyone of the patent document or the patent disclosure, as it appears in the Patent and Trademark Office file or records, but otherwise reserves all copyrights whatsoever.

Referring now to FIG. 2, certain aspects of embodiments of the present invention may be performed by a data processing system, such as a digital computer system. FIG. 2 illustrates such a system. In particular, computer system 200 includes a processor 201 and a memory 202 which are interconnected by a system bus 203. A display controller 204 and a display device 205 such as a CRT, liquid crystal or plasma display device, are coupled to processor 201 via system bus 203. A mass storage device 206, depicted here as a local device which may be a hard disk that stores information in magnetic media or optical media, is coupled to processor 201 and memory 202 through system bus 203. Typically, a computer system includes input and output devices in addition to a display device. For example, an output device may be a hard copy printer. Numerous input devices are also well known such as keyboards, mice, trackballs, touchpads, and pens. These input devices communicate with processor 201 and memory 202 via a controller such as input/output (I/O) controller 207. Furthermore, computer system 200 may be linked to other computer systems in a data network via network interface controller 208 in order to transmit and receive information with other computer systems in the data network, for example, in a client/server computing environment.

In a typical embodiment, textual documents such as reference guides, user guides, scientific or technical documents, instructional manuals, etc., may be stored on mass storage device 206 of computer system 200 or another computer system in a data network to which computer system 200, participating as a client in the data network, may be coupled via network interface controller 208. This potentially rich source of online background information may be applied directly or indirectly to any one of a number of uses, including, for example, assisting a user in performing some task by allowing the user to access and display the information on display device 205 as directed by commands input by the user from an input device coupled to I/O controller 207. The documentation might provide the basis for creation of an online help database, thereby providing users with the flexibility to access, and query, the database for assistance.

As was discussed previously, to the extent online assistance is provided, it is generally with respect to the operation of some aspect of computer system 200 or application software installed thereon, e.g., a wordprocessor or spreadsheet application. In such a situation, the textual documents are comprised of computer operating system or application software reference material, e.g., a reference manual or user guide. However, it may be readily envisioned that online textual documentation may be wholly unrelated to the operation of the computer system of application software installed thereon. The technical documentation could provide information on conceivably any science or technology.

In a desktop publishing environment, technical documentation may be authored and formatted on computer system 200, in which case, an embodiment of the present invention may be utilized, for example, to create the index and/or glossary of terms at the back of the technical book.

Furthermore, the creation of a domain catalog, i.e., a formal structure of the key terms, relations and properties defining the domain or topic to which the documentation is directed, facilitates exploitation of the technical information by user assistance tasks which may somehow rely upon or require such a formal structure. For example, given a technical document available online, a corresponding domain catalog can be used to identify the sections in the document which may be appropriate, i.e., provide information pertaining to the answer of a free format user query. The domain catalog may further provide a direct mapping of the technical vocabulary in the catalog as well as an index to an online help database.

The major difficulty in deriving the content of the domain catalog from the technical documentation is the process of determining exactly what information is sufficiently representative of the technical documentation to comprise the essence, or gist, of the technical document and thus, be included in the catalog. Once this determination is made, the rest of the process of creating, for example, a online help database, is relatively straightforward. An instructional design team may, for each term in the domain catalog, create a definition, check the validity of automatically generated cross-references between related terms, possibly add more cross references, and create descriptions for the actions identified as being related to the terms.

It is the first step of the above process, that of constructing the domain catalog from which the information contained therein may be expanded upon or put to any number of uses, to which an embodiment of the present invention is directed. In bringing a computer-mediated process involving linguistic analysis to bear on the task of constructing a domain catalog, the process is thereby automated. By carrying out appropriate processing of text documenting a given application, a set of key terms and their properties, and actions involving those key terms may be identified. This information may serve as a prompting device, a kind of "crib sheet" to indicate to, for example, the author of a help database the span of topics that will need to be covered for effective online user assistance.

The focus here is on technical documentation because it lends itself well to the natural language technologies employed by the process involving linguistic analysis described herein. Moreover, as an embodiment of the present invention described herein is implemented in the form of a software application executed by a computer system such as computer system 200, the technical documentation necessarily resides online, that is, it may be retrieved from, for example, mass storage device 206 and provided as input to the software application.

Technical documents represent a well defined genre of text, sharing common features of style, form, content and presentation. As will be seen, acknowledging and accounting for such expository features found in such documentation allows for certain types of linguistic analysis to be applied in a particular way to map the text of a document onto a concise, formal structure of linguistic objects representative of the key terms and their properties, as well as the relations (i.e., actions) between them, found in the domain to which the documentation is directed.

The primary purpose of linguistic processing of an online technical document is to identify and extract important, or key, words or phrases, collectively referred to as key terms, in the text of the document. In an embodiment of the present invention, key terms deemed sufficiently representative of the text are incorporated into what is referred to herein as a lexical network corresponding to the essence of the document. A structure may then be imposed upon the lexical network such that it may be viewed as a conceptual map of the functionality of the domain, i.e., the topic or application, described in the original technical document.

Prior to describing various aspects of the present invention in detail, it should be understood that the present invention is constructed of a cascade of individual linguistic processing modules, so constructed with the goal of extracting from online, background technical documentation lexical knowledge which defines a conceptual map of a domain, as well as represents in a normalized form the functionality of an associated application. In other words, the linguistic processing modules, each of which individually perform a specific task (that in many cases is an analysis or refinement of the output recorded in a previous step of the cascade), collectively determine the key terms, their properties, and the actions related thereto.

Figure 3:
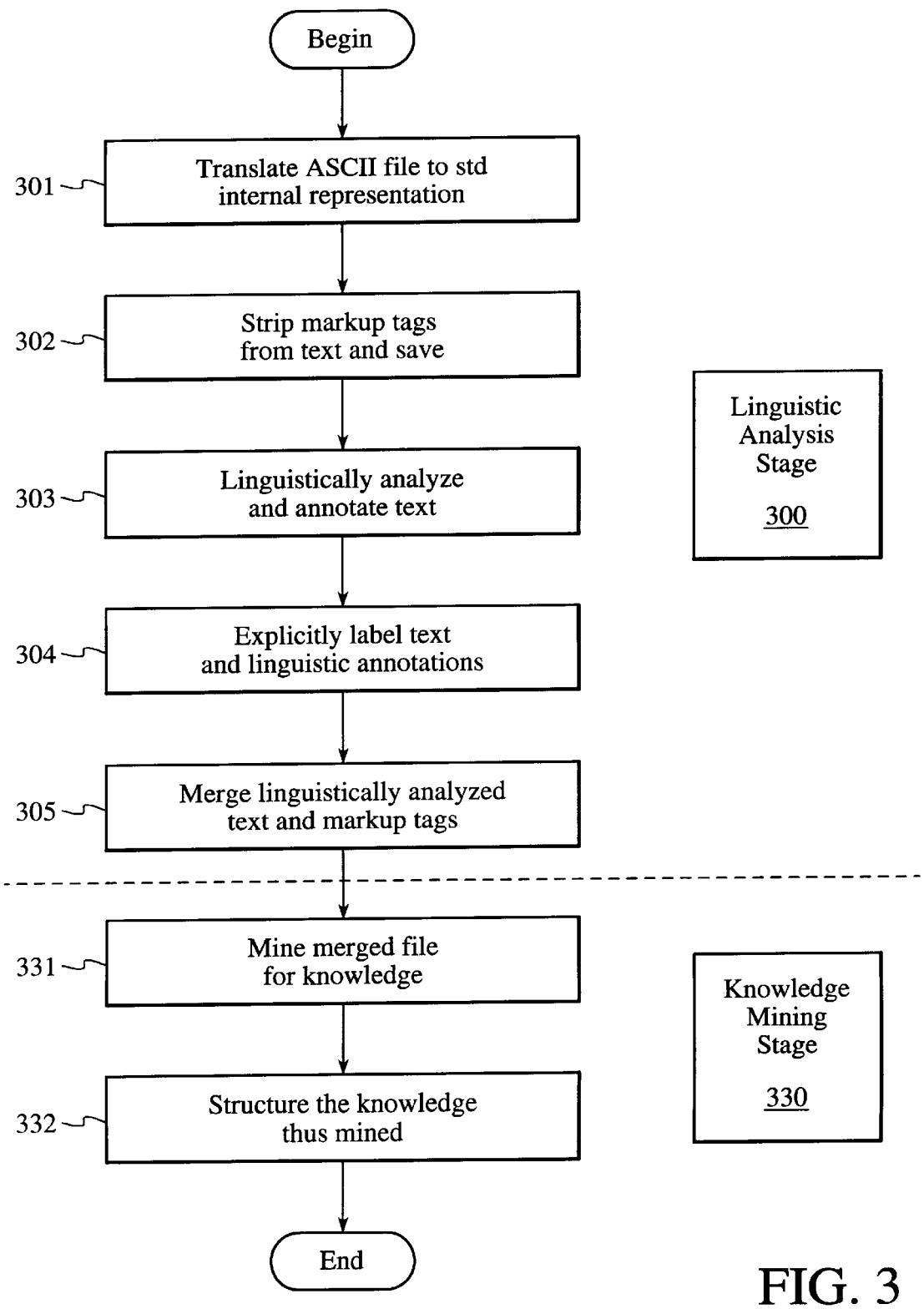
FIG. 3 is a flow diagram of an embodiment of a method of the present invention.

Moreover, the present invention involves a number of stages over which the linguistic processing modules span. With reference to FIG. 3, the stages may be loosely grouped into a linguistic analysis stage 300 followed by a knowledge mining stage 330. The linguistic analysis stage is generally concerned with identifying the parts of speech that make up each sentence or phrase in the online technical documentation, as well as the syntactic function that each word in the sentence is performing, a nontrivial task because of the context sensitive, inherently ambiguous nature of natural language. The knowledge mining stage generally determines what information should be extracted and stored in the domain catalog. By removing, to the extent possible, ambiguity of language in the text during the linguistic analysis stage, the knowledge mining stage has a linguistically rich base from which it can determine what information is to be extracted will relatively less difficulty.

It will be apparent from the following discussion of the present invention that, given online technical documentation, a domain catalog is constructed not by developing an understanding of what knowledge is contained in the document. Understanding the content of the technical documentation would require, inter alia, a level of robust language analysis beyond the power of natural language processing systems today, as well as the kinds of interpretation and reasoning systems still under development by those skilled in the art. Rather, the added value of the natural language technologies embodied in the present invention derives from processing the textual component of online technical documentation to the extent that lexically, syntactically, and otherwise structurally prominent characteristics of the documentation are able to be identified, extracted, and then incorporated by any of the aforesaid uses to which the present invention may be directed. (Importantly, as will be seen, the techniques employed by an embodiment of the present invention detect and exploit a correspondence between semantically important fragments in the domain and the way in which those fragments manifest themselves linguistically, e.g., as a particular syntactic structure with particular discourse properties.) Thus, most of the techniques and technologies described below depend on the availability of online technical documentation in text form. In what follows, an instance of such a piece of text will be simply referred to as a document.

Technological Background and Nomenclature

The following natural language technologies implemented in an embodiment of the present invention include the following linguistic capabilities: lexical access, morphological analysis, part-of-speech disambiguation analysis and syntactic function identification.

Lexical Access

Lexical access to a substantial core lexicon of English is necessary. A lexicon is a data structure containing a list of base forms of words for a given language, and inflections and derivations thereof. The lexicon should provide syntactic annotations for words (i.e., annotations regarding the way in which a word occurs in a phrase or sentence), at lease for part-of-speech, for example:

display: Noun, Verb use: Noun, Verb

Furthermore, the lexicon should provide subcategorization frames (i.e., knowledge about the syntactic environments in which a word can validly occur), for example:

display: Noun+Prep [of]; Verb+NP use: Noun+Prep [of, for]; Verb+NP

Additionally, the lexicon may be augmented with a robust part-of-speech guesser for those words outside the core lexical coverage. For example, even though there might be no explicit listing for "chooser" or "iconization", based on their endings, a reliable guess could be made that these are nouns.

Morphological Processor

A morphological processor looks at the formation of each word in the document and attempts to perform a mapping of an inflected word (i.e., a word modified from its base form to mark such distinctions as those of case, gender, number, tense, person, mood or voice) to its base form, for example:

---
uses -> use
ground -> ground
ground -> grind

---

A morphological processor further looks at the formation of each word in the document and attempts to perform a mapping of a derivational word (i.e., a word modified from its base form as by the addition of a noninflectional affix) to its base form, for example:

---
reinitialize -> initialize
reinitializing -> initialize

---

The ability to perform morphological processing enables the present invention to, for example, derive:

[initialize] [disk]

from "reinitializing the disk". The morphological processor further returns the possible part-of-speech tags for a word, for example:

```
uses -> use+[NounPlural]
uses -> use+[VerbPast]
ground -> ground+[Verb]
ground -> ground+[NounSingular]
ground -> grind+[VerbPast]
```

Part of Speech Tagger (For Lexical Disambiguation)

The primary function of such a component is to disambiguate among sets of parts-of-speech annotations, i.e., syntactic tags. For example, while every content word in the phrase, "to display files, view by size" would be lexically analyzed and marked both as a noun and a verb, local syntactic context is sufficient to disambiguate between the individual parts-of-speech:

to/[Inf]
display/[Verb]
files/[NounPlural]
view/[Verb]
by/[Prep]
size/[Noun]

Shallow Syntactic Analyzer

Syntactic analysis (parsing) is the process of resolving a sentence into component parts of speech, describing them grammatically, and identifying structural relationships between words and phrases in a sentence. For example, a noun phrase might be made up from a determiner followed by a noun; a verb phrase might be identified as a verb optionally followed by a noun phrase, and a possible sentence structure might be a noun phrase functioning as the subject, followed by a verb phrase, wherein the verb is the main verb of the sentence, and the noun phrase within the verb phrase is the object.

Presently, full syntactic analysis over real instances of text is not feasible due to a number of reasons, including the complexity of the parsing process, the high degree of lexical ambiguity, failure to cope robustly with unfamiliar input items, and inadequate coverage of existing grammatical descriptions of natural language. However, present technology does make it possible, on the basis of locally defined rules for syntactically allowed contexts, to perform a shallow form of syntactic analysis in which certain linguistic annotations of text are possible. Assuming part-of-speech disambiguation analysis has already been performed by, for example, the part-of-speech tagger described above, valid sequences of syntactic tags can be identified, for example, the grammatical sequence [[Det] [Adj]] is highly common, in contrast to [[Adj] [Det]]. Furthermore, it is possible to associate the words in a sentence with the syntactic functions they play within the particular context ("@Subject", "@Object", "@Complement-Modifier", etc.), as well as indicate the structural constraints between words. For example, the [Adj] proceeding a [Noun] is dominated by that noun; in a sequence of two or more [Noun]s, the rightmost one acts as the head; etc.

Shallow syntactic analysis differs from syntactic analysis in that a complete parse tree representation is not constructed—phrase boundaries are not identified, nor are relationships between phrases recovered. However, individual lexical items are assigned, where appropriate, syntactic functions. For example, as a result of processing the sentence, The application requires the use of a separate type of layout window for modifying user templates.

"application" would be analyzed as the main subject; "layout" would be tagged as a [Noun] and associated as a dependent (premodifier) to "window"; both "window" and "templates" would be identified as nouns in complement positions, with "use" and "modify" marked as the dominant heads to which, respectively, those nouns act as direct objects. The significance of being able to identify these relationships will be discussed below.

Thus, because natural language is highly complex and ambiguous, full syntactic analysis for an entire language is impossible given present technology. Shallow syntactic analysis, however, is possible. While not developing a complete parse tree, shallow syntactic analysis attempts to identify and generate a pointer to different structures in a sentence, including, but not limited to, for example, a subject, verb, object, complement, adjunct, etc.

DETAILED DESCRIPTION

Referring now to FIG. 3, a detailed description of an embodiment of the present invention follows.

Linguistic Analysis Stage

A data file stored on, for example, mass storage device 206 and containing technical documentation may have been created by any one of a number of commercially available desktop publishing or wordprocessing software applications. The internal representation of the data file is, for the most part, governed by the software application that created the file, e.g., Microsoft Word. Commonly, the various desktop publishing or wordprocessing software applications have their own proprietary internal data representation for keeping track of the various features of a document, e.g., the typographical, visual, and layout characteristics of the document. Natural language processing software cannot adequately deal with the arbitrary format of documents created by different software applications. Thus, the present invention assumes a uniform framework for representing, storing and accessing the document in a way which preserves the majority of typographical, visual and layout information in the data file containing the document. This is accomplished by mapping, or exporting, the document into a stream of ASCII text to which the natural language technologies of the present invention can be applied. This prerequisite is fulfilled according to application-specific means outside the scope of the present invention. Essentially, what this means is that wordprocessing or desktop publishing application software must create an ASCII-based representation of the internal data format. In doing so, typically all that occurs is the internal representation of the file is converted from binary format to ASCII format—markup tags providing information regarding document structure may still be in a proprietary format, e.g., Microsoft Word Rich Text Format (RTF).

Furthermore, in addition to extruding ASCII text from, e.g., a Microsoft Word file containing a document having a proprietary internal representation for document structure (a process which will yield a text corpus), it is essential when exporting the document, for reasons discussed below, that this text corpus retain the markup information contained therein concerning the logical and physical structure of the document. Not all markup information may be important. The key in retaining markup information is to strip formatting information that is not important but maintain that which is, along with the text to which it applies. Markup information is information in the form of tags interspersed throughout the document which is used to (conceptually) drive a typesetting machine. To the extent there is important textual information in a sentence, there is equally important information in the way the text is visually organized and presented on a page. As will be seen, the fact that a phrase appears in a subject or chapter heading makes it much more important than if it were embedded in the middle of a long paragraph of text, and thus, more likely that it merits incorporation in the domain catalog. Unlike prior art text processing technologies, the present invention seeks to appreciate the context, in linguistic, document layout and structure terms, in which a phrase, e.g., a noun phrase, appears, and thus, markup information should be maintained in the ASCII text stream.

At step 301 in the cascade of individual linguistic processing modules, the present invention translates the data file containing the ASCII text of a document having a proprietary internal representation for document structure (created by application software outside the scope of the present invention as discussed above) to a data file containing the ASCII text of a document having a standard internal representation for document structure, which may, for example, generally conform to SGML (standard general markup language). The purpose of this step is to provide a standard internal representation for document structure information (i.e., markup tags) in the file containing the document, one which is understood by the natural language processes of the present invention. Thus, subsequent modules in the cascade need only understand one standard file format.

An example of a standard file format is set forth below, hereinafter referred to as example A. It can be seen that markup tags containing information such as the beginning and ending of chapter headings, lists and the items listed therein, subsections, paragraphs, and different text typefaces, such as bold or italics, are interspersed throughout the ASCII text. The example is taken from a portion of an online copy of the Apple Macintosh Reference guide, Chapter 1. Additional references herein related to this text document represent output generated at various stages of the cascade of linguistic processing modules using the same source of technical documentation.

EXAMPLE A

As part of this translation process, visual characteristics of the text are mapped to the logical function that the characteristics perform, e.g., red text may indicate a chapter heading, bold text may mean a subsection heading, a string of 12-point Helvetica text may indicate a paragraph of text. This logical function information representing markup information is retained in the form of a tag at the beginning of each record in the data file. Maintaining such logical function information entails, for example, identification of chapter, section, subsection and other headings, as well as parsing of lists and sublists. To reiterate, the rationale behind this is not only that, for example, section and subsection headings are good places to identify technical terms, but more interestingly, the structure of a running discourse of technical text is itself quite revealing with respect to offering clues to information that describe the domain or application to which the content of the document is directed. For example, definitions of terms are typically found at the beginning of introductory paragraphs, section units typically are concerned with describing the functionality of closely related components, and phrases that are emphasized (e.g., by bold or italic font) are clearly important, etc.

As is step 301, step 302 is primarily a prepatory step in anticipation of step 303 and later steps in the cascade of linguistic processes. Linguistic analysis of text at step 303 assumes the document contains only ASCII text. The markup tags, therefore, must be stripped, as demonstrated in below in example B:

---

</chapter>Setting Up Your Programs </echapter>
</para> This chapter describes how to set up the programs that you use when you work with your computer. </epara>
</section> Installing your application programs </esection>
</para> Most application programs come on floppy disks, and you install them by copying them from the floppy disks to your hard disk. Some programs have special installation instructions. See the documentation that came with your programs. </epara>
</para> To use your programs most effectively: </epara>
</list>
</item> Put only one copy of each program on your hard disk. Having more than one copy can cause errors. </eitem>
</item> Whenever you copy a program disk to your hard disk, be careful not to copy a System Folder. Always check to see what you've copied, and drag any extra System Folders to the Trash. </eitem>
</item> If a program malfunctions consistently, try installing a fresh copy. If that does not help, find out from the software manufacturer whether your version of the program is compatible with the system software you're using. </eitem>
</item> Put frequently used programs (or aliases for those programs) in the Apple menu so you can open the programs more conveniently. See Chapter 5, "Adapting Your Computer to Your Own Use." </eitem>
</item> To open a program automatically each time you start up, you can put the program (or its alias) into the Startup Items folder. See Chapter 5, "Adapting Your Computer to Your Own Use." <(/eitem>
</elist>

Setting Up Your Programs **
This chapter describes how to set up the programs that you use when
you work with your computer.
Installing your application programs **
Most application programs come on floppy disks, and you install them
by copying them from the floppy disks to your hard disk. Some programs have
special installation instructions. See the documentation that came with your
programs.
To use your programs most effectively:
Put only one copy of each program on your hard disk. Having more than
one copy can cause errors.
Whenever you copy a program disk to your hard disk, be careful not to
copy a System Folder. Always check to see what you've copied, and drag any
extra System Folders to the Trash.
If a program malfunctions consistently, try installing a fresh copy.
If that does not help, find out from the software manufacturer whether your
version of the program is compatible with the system software you're using.
Put frequently used programs (or aliases for those programs) in the
Apple menu so you can open the programs more conveniently. See Chapter 5,
"Adapting Your Computer to Your Own Use."
To open a program automatically each time you start up, you can put
the program (or its alias) into the Startup Items folder. See Chapter 5,
"Adapting Your Computer to Your Own Use."

EXAMPLE B

However, as was previously mentioned, this information is subsequently used by the present invention, so it is not discarded, but saved in a temporary file and merged back into the text stream at a later step in the cascade, as will be discussed below.

The ASCII text free of markup information produced at step 302 is next analyzed with respect to its lexical and morphological content at step 303. Each word is annotated to include its lexical and morphological features, including a part-of-speech tag for each morphological context, and a possible syntactic label obtained by way of shallow syntactic analysis. For example, with reference to FIG. 4, text phrase 401, after analysis and annotation, appears as annotated phrase 400.

Below is an example, hereinafter referred to as example C, of such analysis and annotation as performed on the ASCII text provided in example B. For example, each record is comprised of a word of text and its annotations. Each word appears in its original form as used in the document and its base form, both in double quotes. Lexical annotations follow and are encapsulated by < >. The morphological annotation follows, in uppercase. Where more than one possible part-of-speech tag exists, each tag is shown annotated on a separate row. For example, the word "set" in the sentence "this chapter describes how to set up the programs that you use when you work with your computer", as set forth in the example below, has 6 possible part-of-speech tags: it may be interpreted as, among other things, a past tense verb in finite form (V PAST VFIN), a normal present tense, non third person singular finite verb (V PRES-SG3 VFIN), and a verb in its infinitive form (V INF), etc. The possible syntactic function is provided in the form of syntactic label, if present, and is the last annotation affixed to each word.

```
("<*setting>"
    ("set" <*> <SVOC/A> <SVO> <SVOO> <SV<P/on> PCP1 ))
("up" <*> PREP)
("up" <*> ADV ADVL (@ADVL)))
("<*yours>"
    ("you" <*> PRON PERS GEN SG2/PL2 (@GN> ) ))
("<*programs>"
    ("program" <*> <SVO> V PRES SG3 VFIN (@+FMAINV))
    ("program" <*> N NOM PL))
("<$HEAD>")
("<*this>"
    ("this" <*> DET CENTRAL DEM SG (@DN>))
    ("this" <*> ADV AD-A> (@AD-A>))
    ("this" <*> PRON DEM SG ))
("<chapter>"
    ("chapter" N NOM SG))
("<describes>"
    ("describe" <as/SVOC/A> <SVO> V PRES SG3 VFIN (@+FMAINV) ))
("<how>"
    ("how" <**CLB> ADV WH ))
("<to>"
    ("to" PREP)
    ("to" INFMARK> (@INFMARK>) ))
("<set>"
    ("set" <SVOC/A> <SVO> <SVOO> <SV> <P/on> PCP2)
    ("set" <SVOC/A> <SVO> <SVOO> <SV> <P/on> V PAST VFIN (@+FMAINV))
```

-continued

```
        ("set" <SVOC/A> <SVO> <SVOO> <SV> <P/on> V SUBJUNCTIVE VFIN (@+FMAINV))
        ("set" <SVOC/A> <SVO> <SVOO> <SV> <P/on> V IMP VFIN (@+FMAINV))
        ("set" <SVOC/A> <SVO> <SVOO> <SV> <P/on> V INF)
        ("set" <SVOC/A> <SVO> <SVOO> <SV> <P/on> V PRES -SG3 VFIN (@+FMAINV))
        ("set" N NOM SG))
("<up>"
        ("up" PREP)
        ("up" ADV ADVL (@ADVL)))
("<the>"
        ("the" <Def> DET CENTRAL ART SG/PL (@DN>) ))
("<programs>"
        ("program" <SVO> V PRES SG3 VFIN (@+FMAINV) )
        ("program" N NOM PL))
("<that>"
        ("that" <**CLB> CS (@CS) )
        ("that" DET CENTRAL DEM SG (@DN>) )
        ("that" ADV AD-A> (@AD-A>) )
        ("that" PRON DEM SG )
        ("that" <NonMod> <**CLB> <Rel> PRON SG/PL))
("<you>"
        ("you" <NonMod> PRON PERS NOM SG2/PL2)
        ("you" <NonMod> PRON PERS ACC SG2/PL2))
("<use>"
        ("use" N NOM SG)
        ("use" <as/SVOC/A> <SVO> <SV> V SUBJUNCTIVE VFIN (@+FMAINV) )
        ("use" <as/SVOC/A> <SVO> <SV> V IMP VFIN (@+FMAINV) )
        ("use" <as/SVOC/A> <SVO> <SV> V INF )
        ("use" <as/SVOC/A> <SVO> <SV> V PRES -SG3 VFIN (@+FMAINV) ))
("<when>"
        ("when" <**CLB> ADV WH (@ADVL) ))
("<you>"
        ("you" <NonMod> PRON PERS NOM SG2/PL2)
        ("you" <NonMod> PRON PERS ACC SG2/PL2))
("<work>"
        ("work" <SV> <SVO> <P/in> <P/on> V SUBJUNCTIVE VFIN (@+FMAINV) )
        ("work" <SV> <SVO> <P/in> <P/on> V IMP VFIN (@+FMAINV) )
        ("work" <SV> <SVO> <Plin> <P/on> V INF )
        ("work" <SV> <SVO> <P/in> <P/on> V PRES -SG3 VFIN (@+FMAINV) )
        ("work" N NOM SG ))
("<with>"
        ("with" PREP ))
("<your>"
        ("you" PRON PERS GEN SG2/PL2 (@GN>) ))
("<computer>"
        ("computer" <DER:er> N NOM SG ))
("<$.>")
("<*installing>"
        ("instal" <*> <SVO> PCP1 ))
("<your>"
        ("you" PRON PERS GEN SG2/PL2 (@GN>) ))
("<application>"
        ("application" N NOM SG ))
("<programs>"
        ("program" <SVO> V PRES SG3 VFIN (@+FMAINV) )
        ("program" N NOM PL ))
("<$HEAD>")
("<*most>"
        ("much" <*> ADV SUP)
        ("much" <*> <Quant> PRON SUP SG)
        ("much" <*> <Quant> DET POST SUP SG (@QN>))
        ("many" <*> <Quant> PRON SUP PL)
        ("many" <*> <Quant> DET POST SUP PL (@QN>)))
("<application>"
("application" N NOM SG ))
("<programs>"
        ("program" <SVO> V PRES SG3 VFIN (@+FMAINV) )
        ("program" N NOM PL ))
("<come>"
        ("come" <SVC/A> <SV> <P/for> PCP2)
        ("come" <SVC/A> <SV> <P/for> V SUBJUNCTIVE VFIN (@+FMAINV) )
        ("come" <SVC/A> <SV> <P/for> V IMP VFIN (@+FMAINV) )
        ("come" <SVC/A> <SV> <P/for> V INF)
        ("come" <SVC/A> <SV> <P/for> V PRES -SG3 VFIN (@+FMAINV) ))
("<on>"
        ("on" PREP)
        ("on" ADV ADVL (@ADVL ) ))
("<floppy_disks>"
        ("floppy_disk" N NOM PL ))
("<&\,>")
```

-continued

```
("<and>"
    ("and" CC (@CC ) ))
("<you>"
    ("you" <NonMod> PRON PERS NOM SG2/PL2 )
    ("you" <NonMod> PRON PERS ACC SG2/PL2 ))
("<install>"
    ("install" <SVO> V SUBJUNCTIVE VFIN (@+FMAINV) )
    ("install" <SVO> V IMP VFIN (@+FMAINV) )
    ("install" <SVO> V INF)
    ("install" <SVO> V PRES -SG3 VFIN (@+FMAINV) ))
("<them>"
    ("they" <NonMod> PRON PERS ACC PL3 ))
("<by>"
    ("by" PREP )
    ("by" ADV ADVL (@ADVL) ))
("<copying>"
    ("copy" <SVO> <SV> <P/of> PCP1 ))
("<them>"
    ("they" <NonMod> PRON PERS ACC PL3 ))
("<from>"
    ("from" PREP ))
("<the>"
    ("the" <Def> DET CENTRAL ART SG/PL (@DN>) ))
("<floppy_disks>"
    ("floppy_disk" N NOM PL ))
("<to>"
    ("to" PREP)
    ("to" INFMARK> (@INFMARK>) ))
("<your>"
    ("you" PRON PERS GEN SG2/PL2 (@GN>) ))
("<hard disk>"
    ("hard_disk" N NOM SG ))
("<$.>")
("<*some>"
("some" <*> <Quant> DET CENTRAL SG/PL (@QN>) )
("some" <*> ADV )
("some" <*> <NonMod> <Quant> PRON SG/PL ))
("<programs>"
    ("program" <SVO> V PRES SG3 VFIN (@+FMAINV) )
    ("program" N NOM PL ))
("<have>"
    ("have" <SVO> <SVOC/A> V SUBJUNCTIVE VFIN (@+FMAINV) )
    ("have" <SVO> <SVOC/A> V PRES -SG3 VFIN)
    ("have" <SVO> <SVOC/A> V INF )
    ("have" <SVO> <SVOC/A> V IMP VFIN (@+FMAINV) ))
("<special>"
    ("special" A ABS ))
("<installation>"
("installation" N NOM SG ))
("<instructions>"
    ("instruction" N NOM PL ))
("<$.>")
("<*see>"
    ("see" <*> <as/SVOC/A> <SVO> <SV> <InfComp> V SUBJUNCTIVE VFIN (@+FMAINV)
)
    ("see" <*> <as/SVOC/A> <SVO> <SV> <InfComp> V IMP VFIN (@+FMAINV) )
    ("see" <*> <as/SVOC/A> <SVO> <SV> <InfComp> V INF)
    ("see" <*> <as/SVOC/A> <SVO> <SV> <InfComp> V PRES -SG3 VFIN (@+FMAINV) ))
("<the>"
    ("the" <Def> DET CENTRAL ART SG/PL (@DN>) ))
("<documentation>"
    ("documentation" <-Indef> N NOM SG ))
("<that>"
    ("that" <**CLB> CS (@CS) )
    ("that" DET CENTRAL DEM SG (@DN>) )
    ("that" ADV AD-A> (@AD-A>) )
    ("that" PRON DEM SG )
    ("that" <NonMod> <**CLB> <Rel> PRON SG/PL ))
("<came>"
    ("come" <SVC/A> <SV> <P/for> V PAST VFIN (@+FMAINV) ))
("<with>"
    ("with" PREP ))
("<your>"
    ("you" PRON PERS GEN SG2/PL2 (@GN>) ))
("<programs>"
    ("program" <SVO> V PRES SG3 VFIN (@+FMAINV) )
    ("program" N NOM PL ))
("<$.>")
("<*to>"
```

-continued

```
        ("to" <*> PREP)
        ("to" <*> INFMARK> (@INFMARK>) ))
("<use>"
        ("use" N NOM SG)
        ("use" <as/SVOC/A> <SVO> <SV> V SUBJUNCTIVE VFIN (@+FMAINV) )
        ("use" <as/SVOC/A> <SVO> <SV> V IMP VFIN (@+FMAINV) )
        ("use" <as/SVOC/A> <SVO> <SV> V INF )
        ("use" <as/SVOC/A> <SVO> <SV> V PRES -SG3 VFIN (@+FMAINV) ))
("<your>"
        ("you" PRON PERS GEN SG2/PL2 (@GN>) ))
("<programs>"
        ("program" <SVO> V PRES SG3 VFIN (@+FMAINV) )
        ("program" N NOM PL ))
("<most>"
        ("much" ADV SUP )
        ("much" <Quant> PRON SUP SG )
        ("much" <Quant> DET POST SUP SG (@QN>) )
        ("many" <Quant> PRON SUP PL )
        ("many" <Quant> DET POST SUP PL (@QN>) ))
("<effectively>"
        ("effective" <DER:ive> <DER:ly> ADV ))
("<$\:>")
("<*put>"
        ("put" <*> <SVO> PCP2 )
        ("put" <*> <SVO> V PAST VFIN (@+FMAINV) )
        ("put" <*> <SVO> V SUBJUNCTIVE VFIN (@+FMAINV) )
        ("put" <*> <SVO> V IMP VFIN (@+FMAINV) )
        ("put" <*> <SVO> V INF )
        ("put" <*> <SVO> V PRES -SG3 VFIN (@+FMAINV) ))
("<only>"
        ("only" ADV)
        ("only" A ABS ))
("<one>"
        ("one" NUM CARD )
        ("one" PRON NOM SG ))
("<copy>"
        ("copy" <SVO> <SV> <P/of> V SUBJUNCTIVE VFIN (@+FMAINV) )
        ("copy" <SVO> <SV> <P/of> V IMP VFIN (@+FMAINV) )
        ("copy" <SVO> <SV> <P/of> V INF )
        ("copy" <SVO> <SV> <P/of> V PRES -SG3 VFIN (@+FMAINV) )
        ("copy" N NOM SG ))
("<of>"
        ("of" PREP ))
("<each>"
        ("each" <Quant> DET CENTRAL SG (@QN>))
        ("each" <NonMod> <Quant> PRON SG ))
("<program>"
        ("program" <SVO> V SUBJUNCTIVE VFIN (@+FMAINV) )
        ("program" <SVO> V IMP VFIN (@+FMAINV) )
        ("program" <SVO> V INF )
        ("program" <SVO> V PRES -SG3 VFIN (@+FMAINV) )
        ("program" N NOM SG ))
("<on>"
        ("on" PREP)
        ("on" ADV ADVL (@ADVL) ))
("<your>"
        ("you" PRON PERS GEN SG2/PL2 (@GN>) ))
("<hard disk>"
        ("hard_disk" N NOM SG ))
("<$.>")
("<*having>"
        ("have" <*> <SVO> <SVOC/A> PCP1 ))
("<more=than>"
        ("more=than" <CompPP> PREP )
        ("more=than" <**CLB> CS (@CS) )
        ("more=than" ADV ))
("<one>"
        ("one" NUM CARD)
        ("one" PRON NOM SG ))
("<copy>"
        ("copy" <SVO> <SV> <P/of> V SUBJUNCTIVE VFIN (@+FMAINV) )
        ("copy" <SVO> <SV> <P/of> V IMP VFIN (@+FMAINV) )
        ("copy" <SVO> <SV> <P/of> V INF)
        ("copy" <SVO> <SV> <P/of> V PRES -SG3 VFIN (@+FMAINV) )
        ("copy" N NOM SG ))
("<can>"
        ("can" N NOM SG)
        ("can" V AUXMOD VFIN (@+FAUXV ) ))
("<cause>"
```

-continued

```
    ("cause" N NOM SG)
    ("cause" <SVO> <SVOO> V SUBJUNCTIVE VFIN (@+FMAINV) )
    ("cause" <SVO> <SVOO> V IMP VFIN (@+FMAINV) )
    ("cause" <SVO> <SVOO> V INF )
    ("cause" <SVO> <SVOO> V PRES -SG3 VFIN (@+FMAINV) ))
    ("<errors>"
    ("error" N NOM PL ))
("<$.>")
("<*whenever>"
    ("whenever" <*> <**CLB> ADV WH (@ADVL) ))
("<you>"
    ("you" <NonMod> PRON PERS NOM SG2/PL2 )
    ("you" <NonMod> PRON PERS ACC SG2/PL2 ))
("<copy>"
    ("copy" <SVO> <SV> <P/of> V SUBJUNCTIVE VFIN (@+FMAINV) )
    ("copy" <SVO> <SV> <P/of> V IMP VFIN (@+FMAINV) )
    ("copy" <SVO> <SV> <P/of> V INF )
    ("copy" <SVO> <SV> <P/of> V PRES -SG3 VFIN (@+FMAINV) )
    ("copy" N NOM SG ))
("<a>"
    ("a" <Indef> DET CENTRAL ART SG (@DN>) ))
("<program>"
    ("program" <SVO> V SUBJUNCTIVE VFIN (@+FMAINV) )
    ("program" <SVO> V IMP VFIN (@+FMAINV) )
    ("program" <SVO> V INF )
    ("program" <SVO> V PRES -SG3 VFIN (@+FMAINV) )
    ("program" N NOM SG ))
("<disk>"
    ("disk" <SVO> <Rare> V IMP VFIN (@+FMAINV) )
    ("disk" <SVO> <Rare> V INF )
    ("disk" N NOM SG ))
("<to>"
    ("to" PREP )
    ("to" INFMARK> (@INFMARK>) ))
("<your>"
    ("you" PRON PERS GEN SG2/PL2 (@GN>) ))
("<hard_disk>"
    ("hard_disk" N NOM SG ))
("<$\.>")
("<be>"
    ("be" <SV> <SVC/N> <SVC/A> V SUBJUNCTIVE VFIN )
    ("be" <SV> <SVC/N> <SVC/A> V INF )
    ("be" <SV> <SVCIN> <SVC/A> V IMP VFIN (@+FMAINV) ))
("<careful>"
    ("careful" A ABS ))
("<not>"
    ("not" NEG-PART (@NEG ) ))
("<to>"
    ("to" PREP)
    ("to" INFMARK> (@INFMARK>) ))
("<copy>"
    ("copy" <SVO> <SV> <P/of> V SUBJUNCTIVE VFIN (@+FMAINV) )
    ("copy" <SVO> <SV> <P/of> V IMP VFIN (@+FMAINV) )
    ("copy" <SVO> <SV> <P/of> V INF )
    ("copy" <SVO> <SV> <P/of> V PRES -SG3 VFIN (@+FMAINV) )
    ("copy" N NOM SG ))
("<a>"
    ("a" <Indef> DET CENTRAL ART SG (@DN>) ))
("<*system>"
    ("system" <*> N NOM SG ))
("<*folder>"
    ("folder" <*> <DER:er> N NOM SG ))
("<$.>")
("<*always>"
    ("always" <*> ADV ADVL (@ADVL) ))
("<check>"
    ("check" <SVO> <SV> <P/for> <P/with> <P/on> V SUBJUNCTIVE VFIN (@+FMAINV) )
    ("check" <SVO> <SV> <P/for> <P/with> <P/on> V IMP VFIN (@+FMAINV) )
    ("check" <SVO> <SV> <P/for> <P/with> <P/on> V INF )
    ("check" <SVO> <SV> <P/for> <P|with> <P/on> V PRES -SG3 VFIN (@+FMAINV) )
    ("check" N NOM SG ))
("<to>"
    ("to" PREP )
    ("to" INFMARK> (@INFMARK>) ))
("<see>"
    ("see" <as/SVOC/A> <SVO> <SV> <InfComp> V SUBJUNCTIVE VFIN (@+FMAINV) )
    ("see" <as/SVOC/A> <SVO> <SV> <InfComp> V IMP VFIN (@+FMAINV) )
    ("see" <as/SVOC/A> <SVO> <SV> <InfComp> V INF )
    ("see" <as/SVOC/A> <SVO> <SV> <InfComp> V PRES -SG3 VFIN (@+FMAINV) ))
```

-continued

```
("<what>"
    ("what" <NonMod> <**CLB> PRON WH SG/PL )
    ("what" <**CLB> DET PRE WH SG/PL (@DN>) ))
("<you_>"
    ("you" <NonMod> PRON PERS NOM SG2/PL2 SUBJ (@SUBJ) ))
("<_'ve>"
    ("have" <SVO> V PRES -SG3VFIN ))
("<copied>"
    ("copy" <SVO> <SV> <P/of> PCP2 )
    ("copy" <SVO> <SV> <P/of> V PAST VFIN (@+FMAINV) ))
("<$\,>")
("<and>"
    ("and" CC (@CC ) ))
("<drag>"
    ("drag" <SVO> <SV> V SUBJUNCTIVE VFIN (@+FMAINV) )
    ("drag" <SVO> <SV> V IMP VFIN (@+FMAINV) )
    ("drag" <SVO> <SV> V INF )
    ("drag" <SVO> <SV> V PRES -SG3 VFIN (@+FMAINV) )
    ("drag" N NOM SG ))
("<any>"
    ("any" <Quant> DET CENTRAL SG/PL (@QN>) )
    ("any" ADV AD-A> (@AD-A>) )
    ("any" <NonMod> <Quant> PRON SG/PL ))
("<extra>"
    ("extra" A ABS ))
("<*system>"
    ("system" <*> N NOM SG ))
("<*folders>"
    ("folder" <*> <DER:er> N NOM PL ))
("<to>"
    ("to" PREP)
    ("to" INFMARK> (@INFMARK>) ))
("<the>"
    ("the" <Def> DET CENTRAL ART SG/PL (@DN>) ))
("<*trash>"
    ("trash" <*> <SVO> V SUBJUNCTIVE VFIN (@+FMAINV) )
    ("trash" <*> <SVO> V IMP VFIN (@+FMAINV) )
    ("trash" <*> <SVO> V INF )
    ("trash" <*> <SVO> V PRES -SG3 VFIN (@+FMAINV) )
    ("trash" <*> <-Indef> N NOM SG ))
("<$.>")
("<*if>"
    ("if" <*> <**CLB> CS (@CS) ))
("<a>"
    ("a" <Indef> DET CENTRAL ART SG (@DN>) ))
("<program>"
    ("program" <SVO> V SUBJUNCTIVE VFIN (@+FMAINV) )
    ("program" <SVO> V IMP VFIN (@+FMAINV) )
    ("program" <SVO> V INF )
    ("program" <SVO> V PRES -SG3 VFIN (@+FMAINV) )
    ("program" N NOM SG ))
("<malfunctions>"
    ("malfunction" <SV> V PRES SG3 VFIN (@+FMAINV) ))
("<consistently>"
    ("consistent" <DER:ly> ADV ))
("<$\,>")
("<try>"
    ("try" <SVO> <SV> <P/for> V SUBJUNCTIVE VFIN (@+FMAINV) )
    ("try" <SVO> <SV> <P/for> V IMP VFIN (@+FMAINV) )
    ("try" <SVO> <SV> <P/for> V INF )
    ("try" <SVO> <SV> <P/for> V PRES -SG3 VFIN (@+FMAINV) )
    ("try" N NOM SG ))
("<installing>"
    ("instal" <SVO> PCP1 ))
("<a>"
    ("a" <Indef> DET CENTRAL ART SG (@DN>) ))
("<fresh>"
    ("fresh" A ABS ))
("<copy>"
    ("copy" <SVO> <SV> <P/of> V SUBJUNCTIVE VFIN (@+FMAINV) )
    ("copy" <SVO> <SV> <P/of> V IMP VFIN (@+FMAINV) )
    ("copy" <SVO> <SV> <P/of> V INF )
    ("copy" <SVO> <SV> <P/of> V PRES -SG3 VFIN (@+FMAINV) )
    ("copy" N NOM SG ))
("<$.>")
("<*if>"
    ("if" <*> <**CLB> CS (@CS) ))
("<that>"
    ("that" <**CLB> CS (@CS) )
```

-continued

```
    ("that" DET CENTRAL DEM SG (@DN>) )
    ("that" ADV AD-A> (@AD-A>) )
    ("that" PRON DEM SG )
    ("that" <NonMod> <**CLB> <Rel> PRON SG/PL ))
    ("<does>"
    ("do" <SVO> <SVOO> <SV> V PRES SG3 VFIN ))
("<not>"
    ("not" NEG-PART (@NEG ) ))
("<help>"
    ("help" <SVO> <SV> <InfComp> <P/with> V SUBJUNCTIVE VFIN (@+FMAINV) )
    ("help" <SVO> <SV> <InfComp> <P/with> V IMP VFIN (@+FMAINV) )
    ("help" <SVO> <SV> <InfComp> <P/with> V INF )
    ("help" <SVO> <SV> <InfComp> <P/with> V PRES -SG3 VFIN (@+FMAINV) )
    ("help" N NOM SG ))
("<$\.>")
("<find>"
    ("find" <SVOO> <SVOC/N> <SVOC/A> <SVO> <SV> <P/for> V SUBJUNCTIVE VFIN
(@+FMAINV) )
    ("find" <SVOO> <SVOC/N> <SVOC/A> <SVO> <SV> <P/for> V IMP VFIN (@+FMAINV) )
    ("find" <SVOO> <SVOC/N> <SVOC/A> <SVO> <SV> <P/for> V INF )
    ("find" <SVOO> <SVOC/N> <SVOC/A> <SVO> <SV> <P/for> V PRES -SG3 VFIN
(@+FMAINV) )
    ("find" N NOM SG ))
("<out>"
    ("out" ADV ADVL (@ADVL ) ))
("<from>"
    ("from" PREP ))
("<the>"
    ("the" <Def> DET CENTRAL ART SG/PL (@DN>) ))
("<software>"
    ("software" <-Indef> N NOM SG ))
("<manufacturer>"
    ("manufacturer" <DER:er> N NOM SG ))
("<whether>"
    ("whether" <**CLB> CS(@CS ) ))
("<your>"
    ("you" PRON PERS GEN SG2/PL2 (@GN>) ))
("<version>"
    ("version" N NOM SG ))
("<of>"
    ("of" PREP ))
("<the>"
    ("the" <Def> DET CENTRAL ART SG/PL (@DN>) ))
("<program>"
    ("program" <SVO> V SUBJUNCTIVE VFIN (@+FMAINV) )
    ("program" <SVO> V IMP VFIN (@+FMAINV) )
    ("program" <SVO> V INF )
    ("program" <SVO> V PRES -SG3 VFIN (@+FMAINV) )
    ("program" N NOM SG ) )
("<is>"
    ("be" <SV> <SVC/N> <SVC/A> V PRES SG3 VFIN ))
("<compatible>"
    ("compatible" <DER:ble> A ABS ))
("<with>"
    ("with" PREP ))
("<the>"
    ("the" <Def> DET CENTRAL ART SG/PL (@DN>) ))
("<system>"
    ("system" N NOM SG ))
("<software>"
    ("software" <-Indef> N NOM SG ))
("<you_>"
    ("you_" <NonMod> PRON PERS NOM SG2/PL2 SUBJ (@SUBJ ) ))
("<_'re>"
    ("be" <SV> <SVC/N> <SVC/A> V PRES -SG1,3 VFIN ))
("<using>"
    ("use" <as/SVOC/A> <SVO> <SV> PCP1 ))
("<$.>")
("<*put>"
    ("put" <*> <SVO> PCP2 )
    ("put" <*> <SVO> V PAST VFIN (@+FMAINV) )
    ("put" <*> <SVO> V SUBJUNCTIVE VFIN (@+FMAINV) )
    ("put" <*> <SVO> V IMP VFIN (@+FMAINV) )
    ("put" <*> <SVO> V INF )
    ("put" <*> <SVO> V PRES -SG3 VFIN (@+FMAINV) ))
("<frequently>"
    ("frequent" <DER:ly> ADV ))
("<used>"
    ("use" <as/SVOC/A> <SVO> <SV> PCP2 )
```

```
    ("use" <as/SVOC/A> <SVO> <SV> V PAST VFIN (@+FMAINV) ))
("<programs>"
    ("program" <SVO> V PRES SG3 VFIN (@+FMAINV) )
    ("program" N NOM PL ))
("<$\(>")
("<or>"
    ("or" CC (@CC ) ))
("<aliases>"
    ("alias" N NOM PL ))
("<for>"
    ("for" PREP)
    ("for" <**CLB> CS (@CS ) ))
("<those>"
    ("that" DET CENTRAL DEM PL (@DN>) )
    ("that" PRON DEM PL ))
("<programs>"
    ("program" <SVO> V PRES SG3 VFIN (@+FMAINV) )
    ("program" N NOM PL ))
("<$\)>")
("<in>"
    ("in" PREP )
    ("in" ADV ADVL (@ADVL ) ))
("<the>"
    ("the" <Def> DET CENTRAL ART SG/PL (@DN>) ))
("<*apple>"
    ("apple" <*> N NOM SG ))
("<menu>"
    ("menu" N NOM SG ))
("<so>"
    ("so" <**CLB> CS (@CS) )
    ("so" ADV ))
("<you>"
    ("you" <NonMod> PRON PERS NOM SG2/PL2 )
    ("you" <NonMod> PRON PERS ACC SG2/PL2 ))
("<can>"
    ("can" N NOM SG )
    ("can" V AUXMOD VFIN (@+FAUXV) ))
("<open>"
    ("open" <SVO> <SV> V SUBJUNCTIVE VFIN (@+FMAINV) )
    ("open" <SVO> <SV> V IMP VFIN (@+FMAINV) )
    ("open" <SVO> <SV> V INF )
    ("open" <SVO> <SV> V PRES -SG3 VFIN (@+FMAINV) )
    ("open" A ABS ))
("<the>"
    ("the" <Def> DET CENTRAL ART SG/PL (@DN>) ))
("<programs>"
    ("program" <SVO> V PRES SG3 VFIN (@+FMAINV) )
    ("program" N NOM PL ))
("<more>"
    ("much" ADV CMP )
    ("much" <Quant> PRON CMP SG )
    ("much" <Quant> DET POST CMP SG (@QN>) )
    ("many" <Quant> PRON CMP PL )
    ("many" <Quant> DET POST CMP PL (@QN>) ))
("<conveniently>"
    ("convenient" <DER:ly> ADV ))
("<$.>")
("<*see>"
    ("see" <*> <as/SVOC/A> <SVO> <SV> <InfComp> V SUBJUNCTIVE VFIN (@+FMAINV)
)
    ("see" <*> <as/SVOC/A> <SVO> <SV> <InfComp> V IMP VFIN (@+FMAINV) )
    ("see" <*> <as/SVOC/A> <SVO> <SV> <InfComp> V INF )
    ("see" <*> <as/SVOC/A> <SVO> <SV> <InfComp> V PRES -SG3 VFIN (@+FMAINV ) ))
("<*chapter>"
    ("chapter" <*> N NOM SG ))
("<5>"
    ("5" NUM CARD )
    ("5" NUM CARD ))
("<$\,>")
("<$\">")
("<*adapting>"
    ("adapt" <*> <SVO> <SV> <P/for> PCP1 ))
("<*your>"
    ("you" <*> PRON PERS GEN SG2/PL2 (@GN>) ))
("<*computer>"
    ("computer" <*> <DER:er> N NOM SG ))
("<to>"
    ("to" PREP)
    ("to" INFMARK> (@INFMARK>) ))
```

-continued

```
("<*your>"
    ("you" <*> PRON PERS GEN SG2/PL2 (@GN>) ))
("<*own>"
    ("own" <*> <SVO> <SV> V SUBJUNCTIVE VFIN (@+FMAINV) )
    ("own" <*> <SVO> <SV> V IMP VFIN (@+FMAINV) )
    ("own" <*> <SVO> <SV> VINF )
    ("own" <*> <SVO> <SV> V PRES -SG3 VFIN (@+FMAINV) )
    ("own" <*> A ABS ))
("<*use>"
    ("use" <*> N NOM SG )
    ("use" <*> <as/SVOC/A> <SVO> <SV> V SUBJUNCTIVE VFIN (@+FMAINV) )
    ("use" <*> <as/SVOC/A> <SVO> <SV> V IMP VFIN (@+FMAINV) )
    ("use" <*> <as/SVOC/A> <SVO> <SV> V INF )
    ("use" <*> <as/SVOC/A> <SVO> <SV> V PRES -SG3 VFIN (@+FMAINV) ))
("<$.>")
("<$\">")
("<*to>")
    ("to" <*> PREP )
    ("to" <*> INFMARK> (@INFMARK>) ))
("<open>"
    ("open" <SVO> <SV> V SUBJUNCTIVE VFIN (@+FMAINV) )
    ("open" <SVO> <SV> V IMP VFIN (@+FMAINV) )
    ("open" <SVO> <SV> V INF )
    ("open" <SVO> <SV> V PRES -SG3 VFIN (@+FMAINV) )
    ("open" A ABS ))
("<a>"
    ("a" <Indef> DET CENTRAL ART SG (@DN>) ))
("<program>"
    ("program" <SVO> V SUBJUNCTIVE VFIN (@+FMAINV) )
    ("program" <SVO> V IMP VFIN (@+FMAINV) )
    ("program" <SVO> V INF )
    ("program" <SVO> V PRES -SG3 VFIN (@+FMAINV) )
    ("program" N NOM SG ))
("<automatically>"
    ("automatical" <DER:ic> <DER:al> <DER:ly> ADV ))
("<each>"
    ("each" <Quant> DET CENTRAL SG (@QN>))
    ("each" <NonMod> <Quant> PRON SG ))
("<time>"
    ("time" N NOM SG )
    ("time" <SVO> <Rare> V IMP VFIN (@+FMAINV) )
    ("time" <SVO> <Rare> V INF )
)
("<you>"
    ("you" <NonMod> PRON PERS NOM SG2/PL2 )
    ("you" <NonMod> PRON PERS ACC SG2/PL2 ))
("<start>"
    ("start" <SV> <SVO> <P/on> V SUBJUNCTIVE VFIN (@+FMAINV) )
    ("start" <SV> <SVO> <P/on> V IMP VFIN (@+FMAINV) )
    ("start" <SV> <SVO> <P/on> V INF )
    ("start" <SV> <SVO> <P/on> V PRES -SG3 VFIN (@+FMAINV) )
    ("start" N NOM SG ))
("<up>"
    ("up" PREP)
    ("up" ADV ADVL (@ADVL) ))
("<$\,>")
("<you>"
    ("you" <NonMod> PRON PERS NOM SG2/PL2 )
    ("you" <NonMod> PRON PERS ACC SG2/PL2 ))
("<can>"
    ("can" N NOM SG)
    ("can" V AUXMOD VFIN (@+FAUXV) ))
("<put>"
    ("put" <SVO> PCP2 )
    ("put" <SVO> V PAST VFIN (@+FMAINV) )
    ("put" <SVO> V SUBJUNCTIVE VFIN (@+FMAINV) )
    ("put" <SVO> V IMP VFIN (@+FMAINV) )
    ("put" <SVO> V INF )
    ("put" <SVO> V PRES -SG3 VFIN (@+FMAINV) ))
("<the>"
    ("the" <Def> DET CENTRAL ART SG/PL (@DN>) ))
("<program>"
    ("program" <SVO> V SUBJUNCTIVE VFIN (@+FMAINV) )
    ("program" <SVO> V IMP VFIN (@+FMAINV) )
    ("program" <SVO> V INF )
    ("program" <SVO> V PRES -SG3 VFIN (@+FMAINV) )
    ("program" N NOM SG ))
("<$\(>")
("<or>"
```

```
    ("or" CC (@CC) ))
("<its>"
    ("it" PRON GEN SG3 ))
("<alias>"
    ("alias" <Rare> V IMP VFIN (@+FMAINV) )
    ("alias" <Rare> V INF )
    ("alias" N NOM SG ))
("<$\)>")
("<into>"
    ("into" PREP ))
("<the>"
    ("the" <Def> DET CENTRAL ART SG/PL (@DN>) ))
("<*startup>"
    ("startup" <*> N NOM SG ))
("<*items>"
    ("item" <*> N NOM PL ))
("<folder>"
    ("folder" <DER:er> N NOM SG ))
    ("see" <*> <as/SVOC/A> <SVO> <SV> <InfComp> V SUBJUNCTIVE VFIN (@+FMAINV)
)
    ("see" <*> <as/SVOC/A> <SVO> <SV> <InfComp> V IMP VFIN (@+FMAINV) )
    ("see" <*> <as(SVOC/A> <SVO> <SV> <InfComp> V INF )
    ("see" <*> <as/SVOC/A> <SVO> <SV> <lnfComp> V PRES -SG3 VFIN (@+FMAINV) ))
("<*chapter>"
    ("chapter" <*> N NOM SG ))
("<5>"
    ("5" NUM CARD )
    ("5" NUM CARD ))
("<$\,>")
("<$\">")
("<*adapting>"
    ("adapt" <*> <SVO> <SV> <P/for> PCP1 ))
("<*your>"
    ("you" <*> PRON PERS GEN SG2/PL2 (@GN>) ))
("<*computer>"
    ("computer" <*> <DER:er> N NOM SG ))
("<to>"
    ("to" PREP )
    ("to" INFMARK> (@INFMARK>) ))
("<*your>"
    ("you" <*> PRON PERS GEN SG2/PL2 (@GN>) ))
("<*own>"
    ("own"<*> <SVO> <SV> V SUBJUNCTIVE VFIN (@+FMAINV) )
    ("own" <*> <SVO> <SV> V IMP VFIN (@+FMAINV) )
    ("own" <*> <SVO> <SV> V INF )
    ("own" <*> <SVO> <SV> V PRES -SG3 VFIN (@+FMAINV) )
    ("own" <*> A ABS ))
("<*use>"
    ("use" <*> N NOM SG )
    ("use" <*> <as/SVOC/A> <SVO> <SV> V SUBJUNCTIVE VFIN (@+FMAINV) )
    ("use" <*> <as/SVOC/A> <SVO> <SV> V IMP VFIN (@+FMAINV) )
    ("use" <*> <as/SVOC/A> <SVO> <SV> V INF )
    ("use" <*> <as/SVOC/A> <SVO> <SV> V#PRES -SG3 VFIN (@+FMAINV) ))
("<$.>"
```

EXAMPLE C

Each word of text is further analyzed to disambiguate, if appropriate, between the part-of-speech possibilities, and determine the syntactic function of each word, as set forth in the example below, hereinafter referred to as example D (wherein part-of-speech disambiguation analysis is accomplished). Each of the linguistic processes is discussed in turn below.

| | |
|---|---|
| "<*setting>" | "set" <*> <SVOC/A><SVO><SVOO><SV><P/on>PCP1 |
| "<*up>" | "up" <*> ADV ADVL @ADVL |
| "<*your>" | "you" <*> PRON PERS GEN SG2/PL2 @GN> |
| "<*program<" | "program" <*> N NOM PL |
| "<$HEAD>" | |
| "<*this>" | "this" <*> DET CENTRAL DEM SG @DN> |
| "<chapter>" | "chapter" N NOM SG |
| "<describes>" | "describe" <as/SVOC/A><SVO> V PRES SG3 VFIN @+FMAINV |
| "<how>" | "how" <**CLB> ADV WH |
| "<to> " | "to" INFMARK> @INFMARK> |
| "<set> " | "set" <SVOC/A> <SVO> <SVOO> <SV> <P/on> V INF |
| "<up> " | "up" ADV ADVL @ADVL |

-continued

| | |
|---|---|
| "<the> " | "the" <Def> DET CENTRAL ART SG/PL @DN> |
| "<programs> " | "programt" N NOM PL |
| "<that> " | "that" <CLB> CS @CS    "that" <NonMod> <CLB> <Rel> PRON SG/PL |
| "<you> " | "you"<NonMod> PRON PERS NOM SG2/PL2 |
| "<use> " | "use" N NOM SG    "use" <as/SVOC/A> <SVO> <SV> V PRES -SG3 VFIN @+FMAINV |
| "<when> " | "when" <**CLB> ADV WH @ADVL |
| "<your> " | "you" <NonMod> PRON PERS NOM SG2/PL2 |
| "<work> " | "work" <SV> <SVO> <P/in> <P/on> V PRES -SG3 VFIN @+FMAINV |
| "<with> " | "with" PREP |
| "<your> " | "you" PRON PERS GEN SG2/PL2 @GN> |
| "<computer> " | "computer" <DER:er> N NOM SG |
| "<$.> " | |
| "<installing> " | "instal" <*> <SVO> PCP1 |
| "<your> " | "you" PRON PERS GEN SG2/PL2 @GN> |
| "<application> " | "application" N NOM SG |
| "<programs> " | "program" N NOM PL |
| "<$HEAD> " | |
| "<*most> " | "much" <*> <Quant> DET POST SUP SG @QN>   "many" <*> <Quant> DET POST SUP PL @QN> |
| "<appiication> " | "application" N NOM SG |
| "<programs> " | "program" N NOM PL |
| "<come> " | "come" <SVC/A> <SV> <P/for> V PRES -SG3 VFIN @+FMAINV |
| "<on> " | "on" PREP    "on" ADV ADVL @ADVL |
| "<floppy_disks> " | "floppy_disk" N NOM PL |
| "<$,> " | |
| "<and> " | "and" CC @CC |
| "<you> " | "you" <NonMod> PRON PERS NOM.SG2/PL2 |
| "<install> " | "install" <SVO> V PRES -SG3 VFIN @+FMAINV |
| "<them> " | "they" <NonMod> PRON PERS ACC PL3 |
| "<by> " | "by" PREP |
| "<copying> " | "copy" <SVO> <SV> <P/of> PCP1 |
| "<them> " | "they" <NonMod> PRON PERS ACC PL3 |
| "<from> " | "from" PREP |
| "<the>" | "the" <Def> DET CENTRAL ART SG/PL @DN> |
| "<floppy_disks>" | "floppy_disk" N NOM PL |
| "<to>" | "to" PREP |
| "<your>" | "you" PRON PERS GEN SG2/PL2 @GN> |
| "<hard_disk>" | "hard_disk" N NOM SG |
| "<$.>" | |
| "<*some>" | "some" <*> <Quant> DET CENTRAL SG/PL @QN> |
| "<programs>" | "program" N NOM PL |
| "<have>" | "have" <SVO> <SVOC/A> V PRES -SG3 VFIN |
| "<special>" | "special" A ABS |
| "<installation>" | "installation" N NOM SG |
| "<instructions>" | "instruction" N NOM PL |
| "<$.>" | |
| "<*see>" | "see" <*> <as/SVOC/A> <SVO> <SV> <InfComp> V IMP VFIN @+FMAINV |
| "<the>" | "the" <Def> DET CENTRAL ART SG/PL @DN> |
| "<documentation>" | "documentation" <-Indef> N NOM SG |
| "<that>" | "that" <NonMod> <**CLB> <Rel> PRON SG/PL |
| "<came>" | "come" <SVC/A> <SV> <P/for> V PAST VFIN @+FMAINV |
| "<with>" | "with" PREP |
| "<your>" | "you" PRON PERS GEN SG2/PL2 @GN> |
| "<programs>" | "program" N NOM PL |
| "<$.>" | |
| "<to>" | "to" <*> INFMARK> @INFMARK> |
| "<use>" | "use" <as/SVOC/A> <SVO> <SV> V INF |
| "<your>" | "you" PRON PERS GEN SG2/PL2 @GN> |
| "<programs>" | "program" N NOM PL |
| "<most>" | "much" ADV SUP "much" <Quant> PRON SUP SG "many" <Quant> PRON SUP PL |
| "<effectively>" | "effective" <DER:ive> <DER:ly> ADV |
| "<$:>" | |
| "<*put>" | "put" <*> <SVO> PCP2 |
| "<only>" | "only" ADV |
| "<one>" | "one" NUM CARD |
| "<copy>" | "copy" N NOM SG |
| "<of>" | "of" PREP |
| "<each>" | "each" <Quant> DET CENTRAL SG @QN> |
| "<prcgram>" | "program" N NOM SG |
| "<on>" | "on" PREP |
| "<your>" | "you" PRON PERS GEN SG2/PL2 @GN> |
| "<hard_disk>" | "hard_disk" N NOM SG |
| "<$>" | |
| "<*having>" | "have" <*> <SVO> <SVOC/A> PCP1 |
| "<more=than>" | "more=than" ADV |
| "<one>" | "one" NUM CARD |
| "<copy>" | "copy" N NOM SG |

-continued

| | |
|---|---|
| "<can>" | "can" V AUXMOD VFIN @+FAUXV |
| "<cause>" | "cause" <SVO> <SVOO> V INF |
| "<errors>" | "error" N NOM PL |
| "<$.>" | |
| "<*whenever>" | "whenever" <*> <**CLB> ADV WH @ADVL |
| "<you>" | "you" <NonMod> PRON PERS NOM SG2/PL2 |
| "<copy>" | "copy" <SVO> <SV> <P/of> V PRES -SG3 VFIN @+FMAINV |
| "<a>" | "a" <Ind.ef> DET CENTRAL ART SG @DN> |
| "<program>" | "program" N NOM SG |
| "<disk>" | "disk" N NOM SG |
| "<to>" | "to" PREP |
| "<your>" | "you" PRON PERS GEN SG2/PL2 @GN> |
| "<hard_disk>" | "hard_disk" N NOM SG |
| "<$,>" | |
| "<be>" | "be" <SV> <SVCIN> <SVC/A> V SUBJUNCTIVE VFIN |
| "<careful>" | "careful" A ABS |
| "<not>" | "not" NEG-PART @NEG |
| "to>" | "to" INFMARK> @INFMARK> |
| "<copy>" | "copy" <SVO> <SV> <P/of> V INF |
| "<a>" | "a" <Indef> DET CENTRAL ART SG @DN> |
| "<*system>" | "system" <*> N NOM SG |
| "<*folder>" | "folder" <*> <DER:er> N NOM SG |
| "<$.>" | |
| "<*always>" | "always" <*> ADV ADVL @ADVL |
| "<check>" | "check" <SVO> <SV> <P/for> <P/with> <P/on> V IMP VFIN @+FMAINV "check" N NOM SG |
| "<to>" | "to" INFMARK> @INFMARK> |
| "<see>" | "see" <as/SVOC/A> <SVO> <SV> <infComp> V INF |
| "<what>" | "what" <NonMod> <**CLB> PRON WH SG/PL |
| "<you_>" | "you_" <NonMod> PRON PERS NOM SG2/PL2 SUBJ @SUBJ |
| "<_'ve>" | "have" <SVO> V PRES -SG3 VFIN |
| "<copied>" | "copy" <SVO> <SV> <P/of> PCP2 |
| "<$,>" | |
| "<and>" | "and" CC @CC |
| "<drag>" | "drag" <SVO> <SV> V IMP VFIN @+FMAINV "drag" <SVO> <SV> V INF "drag" <SVO> <SV> V PRES -SG3 VFIN @+FMAINV |
| "<any>" | "any" <Quant> DET CENTRAL SG/PL @QN> |
| "<extra>" | "extra" A ABS |
| "<*system>" | "system" <*> N NOM SG |
| "<*folders>" | "folder" <*> <DER:er> N NOM PL |
| "<to>" | "to" PREP |
| "<the>" | "the" <Def> DET CENTRAL ART SG/PL @DN> |
| "<*trash>" | "trash" <*> <-Indef> N NOM SG |
| "<$.>" | |
| "<*if>" | "if" <*> <**CLB> CS @CS |
| "<a>" | "a" <Indef> DET CENTRAL ART SG @DN> |
| "<program>" | "program" N NOM SG |
| "<malfunctions>" | "malfunction" <SV> V PRES SG3 VFIN @+FMAINV |
| "<consistently>" | "consistent" <DER:ly> ADV |
| "<$,>" | |
| "<try>" | "try" <SVO> <SV> <P/for> V IMP VFIN @+FMAINV "try" N NOM SG |
| "<installing>" | "instal" <SVO> PCP1 |
| "<a>" | "a" <Indef> DET CENTRAL ART SG @DN> |
| "<fresh>" | "fresh" A ABS |
| "<copy>" | "copy" N NOM SG |
| "<$.>" | |
| "<if>" | "if" <*> <**CLB> CS @CS |
| "<that>" | "that" PRON DEM SG |
| "<does>" | "do" <SVO> <SVOO> <SV> V PRES SG3 VFIN |
| "<not>" | "not" NEG-PART @NEG |
| "<help>" | "help" <SVO> <SV> <InfComp> <P/with> V INF |
| "<$,>" | |
| "<find>" | "find" <SVOO> <SVOC/N> <SVOC/A> <SVO> <SV> <P/for> V IMP VFIN |
| "@+FMAINV | "find" <SVOO> <SVOCIN> <SVOC/A> <SVO> <SV> <P/for> V INF |
| "<out>" | "out" ADV ADVL @ADVL |
| "<from>" | "from" PREP |
| "<the>" | "the" <Def> DET CENTRAL ART SG/PL @DN> |
| "<software>" | "software" <-Indef> N NOM SG |
| "<manufacturer>" | "manufacturer" <DER:er> N NOM SG |
| "<whether>" | "whether" <**CLB> CS @CS |
| "<your>" | "you" PRON PERS GEN SG2/PL2 @GN> |
| "<version>" | "version" N NOM SG |
| "<of>" | "of" PREP |
| "<the>" | "the" <Def> DET CENTRAL ART SG/PL @DN> |
| "<program>" | "program" N NOM SG |
| "<is>" | "be" <SV> <SVC/N> <SVC/A> V PRES SG3 VFIN |
| "<compatible>" | "compatible" <DER:ble> A ABS |
| "<with>" | "with" PREP |
| "<the>" | "the" <Def> DET CENTRAL ART SG/PL @DN> |

-continued

| | |
|---|---|
| "\<system>" | "system" N NOM SG |
| "\<software>" | "software" <-Indef> N NOM SG |
| "\<you_>" | "you_" <NonMod> PRON PERS NOM SG2/PL2 SUBJ @SUBJ |
| "<_'re>" | "be" <SV> <SVCIN> <SVC/A> V PRES -SG1 ,3 VFIN |
| "\<using>" | "use" <as/SVOC/A> <SVO> <SV> PCP1 |
| "\<$.>" | |
| "\<*put>" | "put" <*> <SVO> PCP2 "put" <*> <SVO> V IMP VFIN @+FMAINV |
| "\<frequently>" | "frequent" <DER:ly> ADV |
| "\<used>" | "use" <as/SVOC/A> <SVO> <SV> PCP2 |
| "\<programs>" | "program" N NOM PL |
| "\<$(>" | |
| "\<or>" | "or" CC @CC |
| "\<aliases>" | "alias" N NOM PL |
| "\<for>" | "for" PREP |
| "\<those>" | "that" DET CENTRAL DEM PL @DN> |
| "\<programs>" | "program" N NOM PL |
| "\<$)>" | |
| "\<in>" | "in" PREP |
| "\<the>" | "the" <Def> DET CENTRAL ART SG/PL @DN> |
| "\<*apple>" | "apple" <*> N NOM SG |
| "\<menu>" | "menu" N NOM SG |
| "\<so>" | "so" <**CLB> CS @CS |
| "\<you>" | "you" <NonMod> PRON PERS NOM SG2/PL2 |
| "\<can>" | "can" V AUXMOD VFIN @+FAUXV |
| "\<open>" | "open" <SVO> <SV> V INF |
| "\<the>" | "the" <Def> DET CENTRAL ART SG/PL @DN> |
| "\<programs>" | "program" N NOM PL |
| "\<more>" | "much" ADV CMP |
| "\<conveniently>" | "convenient" <DER:ly> ADV |
| "\<$.>" | |
| "\<*see>" | "see" <*> <as/SVOC/A> <SVO> <SV> <InfComp> V IMP VFIN @+FMAINV |
| "\<*chapter>" | "chapter" <*> N NOM SG |
| "\<5>" | "5" NUM CARD |
| "\<$,>" | |
| "\<$">" | |
| "\<*adapting>" | "adapt" <*> <SVO> <SV> <P/for> PCP1 |
| "\<*your>" | "you" <*> PRON PERS GEN SG2/PL2 @GN> |
| "\<*computer>" | "computer" <*> <DER:er> N NOM SG |
| "\<to>" | "to" PREP |
| "\<*your>" | "you" <*> PRON PERS GEN SG2/PL2 @GN> |
| "\<*own>" | "own" <*> A ABS |
| "\<*use>" | "use" <*> N NOM SG |
| "\<$.>" | |
| "\<$.>" | |
| "\<*to>" | "to" <*> INFMARK> @INFMARK> |
| "\<open>" | "open" <SVO> <SV> V INF |
| "\<a>" | "a" <Indef> DET CENTRAL ART SG @DN> |
| "\<program>" | "program" N NOM SG |
| "\<automatically>" | "automatical" <DER:ic> <DER:al> <DER:ly> ADV |
| "\<each>" | "each" <Quant> DET CENTRAL SG @QN> |
| "\<time>" | "time" N NOM SG |
| "\<you>" | "you" <NonMod> PRON PERS NOM SG2/PL2 |
| "\<start>" | "start" <SV> <SVO> <P/on> V PRES -SG3 VFIN @+FMAINV |
| "\<up>" | "up" ADV ADVL @ADVL |
| "\<$,>" | |
| "\<you>" | "you" <NonMod> PRON PERS NOM SG2/PL2 |
| "\<can>" | "can" V AUXMOD VFIN @+FAUXV |
| "\<put>" | "put" <SVO> V INF |
| "\<the>" | "the" <Def> DET CENTRAL ART SG/PL@DN> |
| "\<program>" | "program" N NOM SG |
| "\<$(>" | |
| "\<or>" | "or" CC @CC |
| "\<its>" | "it" PRON GEN SG3 |
| "\<alias>" | "alias" N NOM SG |
| "\<$)>" | |
| "\<into>" | "into" PREP |
| "\<the>" | "the" <Def> DET CENTRAL ART SG/PL @DN> |
| "\<*startup>" | "startup" <*> N NOM SG |
| "\<*items>" | "item" <*> N NOM PL |
| "\<folder>" | "folder" <DER:er> N NOM SG |
| "\<$.>" | |
| "\<*see>" | "see" <*> <as/SVOC/A> <SVO> <SV> <InfComp> V IMP VFIN @+FMAINV |
| "\<*chapter>" | "chapter" <*> N NOM SG |
| "\<5>" | "5" NUM CARD |
| "\<$,>" | |
| "\<$">" | |
| "\<*adapting>" | "adapt" <*> <SVO> <SV> <P/for> PCP1 |
| "\<*your>" | "you" <*> PRON PERS GEN SG2/PL2 @GN> |
| "\<*computer>" | "computer" <*> <DER:er> N NOM SG |

-continued

| | |
|---|---|
| "<to>" | "to" PREP |
| "<*your>" | "you" <*> PRON PERS GEN SG2/PL2 @GN> |
| "<*own>" | "own" <*> A ABS |
| "<*use>" | "use" <*> N NOM SG |
| "<$,>" | |

EXAMPLE D

At step 303, the linguistic analysis begins by morphologically and lexically analyzing each word of the text to determine its possible morphological and lexical features. Morphological analysis involves, among other things, mapping a word to its base form. Morphological analysis takes each word and, either through derivation (e.g., "re-initialize" maps to "initialize") or inflection (e.g., "initializing" maps to "initialize"), reduces it to its base form. For example, with reference to FIG. 4, a lookup in the lexicon of the word "initializing" 403 is performed by lexical analysis and fails. Morphological analysis reduces the word to its base form "initialize" by stripping the "ing" ending and adding "e", as indicated by annotation 402 ("</base "initialize">"). Using this base form of the word, lexical analysis then performs a successful lookup in the lexicon to determine the lexical features of the word. Lexical analysis determines the word is a verb. More specifically, lexical analysis determines the word's part-of-speech is a verb present participle, as indicated by part-of-speech annotation 405 ("</pos PCP1>"); it also determined the word participates in a subject-verb-object construction, as indicated by lexical features annotation 404 ("</Ifeats><SVO>>"). Furthermore, the morphological features, e.g., part-of-speech, are determined. Morphological features provide an inference of the linguistic properties of a word (e.g., tense, person, mood) based on how the word is used in a particular context. In the case of the word "initializing" 403, there are no morphological features as indicated by an empty morphological features annotation 406. However, morphological features may be inferred from the fact that lexical analysis has identified the word as a present participle (due to the ing ending) as is indicated by part-of-speech annotation 405. Finally, it should be noted that since lexical analysis determined "initialize" is a verb in a subject-verb-object construction, it will search for an object following the verb. In this way, syntactic labeling is possible, at least to the extent that an association of the words in a sentence with the syntactic functions they play within the particular context ("@Subject", "@Object") may be determined.

As another example, "use" 407 may be a noun, as indicated by part-of-speech annotation 408 ("</pos N>"), in which case it takes on the morphological features of NOM (nominal) and SG (singular, as opposed to plural in the case of "uses"), as indicated by morphological features annotation 409 ("</mfeats NOM SG>"). However, "use" 407 may also be a verb, as indicated by part-of-speech annotation 410 ("</pos V>"), in which case it has the morphological features of an imperative (IMP), i.e., "you use", and a finite verb (VFIN), as indicated by morphological features annotation 411 ("</mfeats IMP VFIN>"). "[U]se" may also be used as a normal present tense, non third person singular finite verb, i.e., "they use", as indicated by morphological features annotation 412 ("</mfeats PRES-SG3 VFIN>"). Thus, "use" 407 has three possible uses: it may be a noun or either of two verb readings.

As will be seen, it is important to identify the correct use of each word in order to perform knowledge mining. For example, knowledge mining attempts to identify technical terms to be included in the domain catalog by searching for particular syntactic patterns representative of technical terms, e.g., a noun phrase. If it sees that "disk", "repair" and "program" in phrase 401 are nouns, then it recognizes the three nouns as constituting a noun phrase, and thus, potentially a technical term. However, "repair" and "program" can also be verbs, so lexical analysis must first determine that the words are, in this context, nouns. Notice, however, with reference to FIG. 4, that "repair" has a noun analysis, as indicated by part-of-speech annotation 413 ("</pos N>"). "[P]rogram" has a verb and a noun analysis, as indicated by part-of-speech annotations 414 and 415, respectively. What has happened here already is a certain amount of part-of-speech disambiguation analysis, i.e., the lexical and morphological analyses have together determined on the basis of local constraints and knowledge about how combinations of words are formed, the proper part-of-speech for certain terms. Using phrase 401 as an example, the analysis, at a certain level of abstraction, proceeds as follows: the first occurrence of "disk" is unambiguously a noun; "program", however, can be a noun or a verb, but because it precedes a preposition ("for") and follows a verb sequence ("use" "commercial"), it is very likely a noun; if "disk" is a noun and "program" is a noun, then "repair" is most likely a noun as well.

The linguistic analysis performed at step 303 does not generate a complete syntactic analysis of the sentence, but it is able to, in some instances, identify components of sentence structure, e.g., subject, verb, and object. In this way, extraction of semantically important terms and conceptually interesting data from the document is possible on the basis of their syntactic identity without requiring full syntactic analysis.

The lexical, morphological, part-of-speech disambiguation and syntactic label processing performed in the linguistic analysis stage are not concurrent processes, nor do they function sequentially with respect to each other. Lexical analysis and morphological analysis are performed essentially in parallel. Part-of-speech disambiguation is coupled closely to morphological analysis. Determination of syntactic functions and syntactic labeling follows closely behind part-of-speech disambiguation.

Part-of-speech disambiguation decides between two or more possible analyses of a word. For example, with reference to example C, as a result of lexical and morphological analysis, the word "up" in the sentence "this chapter describes how to set up the programs that you use when you work with your computer" is determined to be either a preposition (PREP) or an adverb (ADV ADVL). A syntactic label of adverbial (@ADVL) is affixed to the latter possibility. Given the context of the sentence in which the word appears, part-of-speech disambiguation analysis is able to determine "up" functions as an adverbial. Thus, as set forth in example D, the part-of-speech which "up" functions as is unambiguously that of an adverb.

Thus, while lexical and morphological analysis generally operate at the word level, part-of-speech disambiguation analysis is concerned with a phrase or sentence, and reduces, to the extent possible, each word of the phrase or sentence to a single, and therefore, unambiguous analysis. Part-of-speech disambiguation analysis looks at a string of words, and on the basis of certain knowledge about the construction of some of those words (namely, that knowledge acquired through lexical and morphological analysis), and the order in which they occur in the sentence, infers likely construction of other words in the sentence. For example, given the sequence of three words "disk repair program" found in phrase 401, once it has been determined that "disk" is a noun and that "program" is a noun, part-of-speech disambiguation analysis recognizes "repair" must also be a noun. Once part-of-speech disambiguation is completed, syntactic analysis determines and labels each word of text with an appropriate syntactic function.

In an embodiment of the present invention, implementation of the foregoing linguistic analyses and annotations, including lexical and morphological analysis, part-of-speech disambiguation analysis and syntactic labeling, may be accomplished by way of commercially available application software from, for example, LingSoft, Incorporated, of Helsinki, Finland.

As can be seen with reference to example D, each record of linguistically analyzed, annotated and disambiguated text, i.e., each word of the text and its associated linguistic annotations, comprise an arbitrary number of tokens. In some cases, a certain annotation may be missing altogether, e.g., morphological features may not be discerned or present for a particular word. Furthermore, any one field of the record may further comprise an arbitrary number of tokens, e.g., it is not uncommon for lexical analysis to generate an annotation comprising anywhere from zero to five tokens. Thus, at step 304, the linguistically analyzed, annotated and disambiguated text, as well as the annotations themselves, are explicitly labeled to indicate which tokens refer to which annotations, thereby facilitating subsequent mining. Referring to the example below, hereinafter referred to as example E, the annotations to which the tokens belong is more readily discernible than in the case of example D.

```
Setting </base "set"> </lfeats <*> <SVOC/A> <SVO> <SVOO> <SV> <P/on>> </pos PCP1>
</mfeats > <(syn @NPHR @-FMAINV>
Up </base "up"> </lfeats <*>> </pos ADV> </mfeats ADVL> <lsyn @ADVL>
Your </base "you"> </lfeats <*>> </pos PRON> </mfeats PERS GEN SG2/PL2> </syn @NPHR @OBJ>
Programs </base "program"> </lfeats <*>> </pos N> </mfeats NOM PL> </syn @NPHR @OBJ>
HEAD
This </base "this"> </lfeats <*>> </pos DET> </mfeats CENTRAL DEM SG> </syn @DN>>
chapter </base "chapter"> </lfeats > </pos N> </mfeats NOM SG> </syn @SUBJ>
describes </base "describe"> </lfeats <as/SVOC/A> <SVO>> </pos V> </mfeats PRES SG3
VFIN> </syn @+FMAINV>
how </base "how"> </lfeats <**CLB>> </pos ADV> </mfeats WH> </syn @ADVL>
to </base "to"> </lfeats > </pos INFMARK>> </mfeats > </syn @INFMARK>>
set </base "set"> </lfeats <SVOC/A> <SVO> <SVOO> <SV> <P/on>> </pos V> </mfeats INF>
</syn @-FMAINV>
up </base "up"> </lfeats > </pos ADV> </mfeats ADVL> </syn @ADVL>
the </base "the"> </lfeats <Def>> </pos DET> </mfeats CENTRAL ART SG/PL> </syn @DN>>
programs </base "program"> </lfeats > </pos N> </mfeats NOM PL> </syn @OBJ @I-OBJ>
that </base "that"> </lfeats <**CLB>> </pos CS> </mfeats > </syn @CS> </base "that"> </lfeats
<NonMod> <**CLB> <Rel>> </pos PRON> </mfeats SG/PL> </syn @SUBJ @OBJ @I-OBJ
@PCOMPL-O>
you </base "you"> </lfeats <NonMod> </pos PRON> </mfeats PERS NON SG2/PL2> </syn
@SUBJ>
use </base "use"> </lfeats > </pos N> </mfeats NOM SG> </syn @OBJ> </base "use"> </lfeats
<as/SVOC/A> <SVO> <SV>> </pos V> </mfeats PRES -SG3 VFIN> </syn @+FMAINV>
when </base "when"> </lfeats <**CLB>> </pos ADV> </mfeats WH> </syn @ADVL>
you </base "you"> </lfeats <NonMod>> </pos PRON> </mfeats PERS NOM SG2/PL2> </syn
@SUBJ>
work </base "work"> </lfeats <SV> <SVO> <P/in> <P/on>> </pos V> </mfeats PRES -SG3 VFIN>
</syn @+FMAINV>
with </base "with"> </lfeats > </pos PREP> </mfeats > </syn @ADVL>
your </base "you"> </lfeats > </pos PRON> </mfeats PERS GEN SG2/PL2> </syn @GN>>
computer </base "computer"> </lfeats <DER:er>> </pos N> </mfeats NOM SG> </syn @<P>
.
Installing </base "instal"> </lfeats <*> <SVO>> </pos PCP1> </mfeats > </syn @NPHR @-
FMAINV>
your </base "you"> </lfeats > </pos PRON> </mfeats PERS GEN SG2/P#> </syn @GN>>
application </base "application"> </lfeats > </pos N> </mfeats NOM SG> </syn @NPHR @NN>>
programs </base "program"> </lfeats > </pos N> </mfeats NOM PL> </syn @NPHR @OBJ>
HEAD
Most </base "much"> </lfeats <*> <Quant>> </pos DET> </mfeats POST SUP SG> </syn
@QN>> </base "many"> </lfeats <*> <Quant>> </pos DET> </mfeats POST SUP PL> </syn
@QN>>
application </base "application"> </lfeats > </pos N> </mfeats NOM SG> </syn @NN>>
programs </base "program"> </lfeats> </pos N> </mfeats NOM PL> </syn @SUBJ>
come </base "come"> <llfeats <SVC/A> <SV> <P/for>> </pos V> </mfeats PRES -SG3 VFIN>
</syn @+FMAINV>
on </base "on"> </lfeats > </pos PREP> </mfeats > </syn @ADVL> </base "on"> </lfeats > </pos
ADV> </mfeats ADVL> </syn @ADVL>
floppy_disks </base "floppy_disk"> </lfeats > </pos N> </mfeats NOM PL> </syn @<P>
,
and </base "and"> </lfeats > </pos CC> </mfeats> </syn @CC>
you </base "you"> </lfeats <NonMod>> </pos PRON> </mfeats PERS NOM SG2/PL2> </syn
@SUBJ>
```

-continued install </base "install"> </lfeats <SVO>> </pos V> </mfeats PRES -SG3 VFIN> </syn @+FMAINV>
them </base "they"> </lfeats <NonMod>> </pos PRON> </mfeats PERS ACC PL3> </syn @OBJ>
by </base "by"> </lfeats> </pos PREP> </mfeats > </syn @ADVL>
copying </base "copy"> </lfeats <SVO> <SV> <P/of>> </pos PCP1> </mfeats > </syn @<P-FMAINV>
them </base "they"> </lfeats <NonMod>> </pos PRON> </mfeats PERS ACC PL3> </syn @OBJ>
from </base "from"> </lfeats > </pos PREP> </mfeats > </syn @ADVL>
the </base "the"> </lfeats <Def>> </pos DET> </mfeats CENTRAL ART SG/PL> </syn @DN>>
floppy_disks </base "floppy_disk"> </lfeats > </pos N> </mfeats NOM PL> </syn @<P>
to </base "to"> </lfeats > </pos PREP> </mfeats> </syn @<NOM @ADVL>
your </base "you"> </lfeats > </pos PRON> </mfeats PERS GEN SG2/PL2> </syn @GN>>
hard_disk </base "hard_disk"> </lfeats > </pos N> </mfeats NOM SG> </syn @<P>
.
Some </base "some"> </lfeats <*> <Quant>> </pos DET> </mfeats CENTRAL SG/PL> </syn @QN>>
programs </base "program"> </lfeats> </pos N> </mfeats NOM PL> </syn @SUBJ>
have </base "have"> </lfeats <SVO> <SVOC/A>> </pos V> </mfeats PRES -SG3 VFIN> </syn @+FMAINV>
special </base "special"> </lfeats > </pos A> </mfeats ABS> </syn @AN>>
installation </base "installation"> </lfeats > </pos N> </mfeats NOM SG> </syn @OBJ @NN>>
instructions </base "instruction"> </lfeats > </pos N> </mfeats NOM PL> </syn @OBJ>
.
See </base "see"> </lfeats <*> <as/SVOC/A> <SVO> <SV> <InfComp>> </pos V> </mfeats IMP VFIN> </syn @+FMAINV>
the </base "the"> </lfeats <Def>> </pos DET> </mfeats CENTRAL ART SG/PL> </syn @DN>>
documentation </base "documentation"> </lfeats <-Indef>> </pos N> </mfeats NOM SG> </syn @OBJ>
that </base "that"> <"/lfeats <NonMod> <**CLB> <Rel>> </pos PRON> </mfeats SG/PL> </syn @SUBJ>
came </base "come"> </lfeats <SVC/A> <SV> <P/for>> </pos V> </mfeats PAST VFIN> </syn @+FMAINV>
with </base "with"> </lfeats > </pos PREP> </mfeats> </syn @ADVL>
your </base "you"> </lfeats > </pos PRON> </mfeats PERS GEN SG2/PL2> </syn @GN>>
programs </base "program"> </lfeats > </pos N> </mfeats NOM PL> </syn @<P>
.
To </base "to"> </lfeats <*>> </pos INFMARK>> </mfeats > </syn @INFMARK>>
use </base "use"> </lfeats <as/SVOC/A> <SVO> <SV[00af]> </pos V> </mfeats INF> </syn @-FMAINV>
your </base "you"> </lfeats > </pos PRON> </mfeats PERS GEN SG2/PL2> </syn @GN>>
programs </base "program"> </lfeats > </pos N> </mfeats NOM PL> </syn @OBJ>
most </base "much"> </lfeats > </pos ADV> </mfeats SUP> </syn @ADVL @AD-A>> </base "much"> </lfeats <Quant>> </pos PRON> </mfeats SUP SG> </syn @OBJ @PCOMPL-O>
</base "many"> </lfeats <Quant>> </pos PRON> </mfeats SUP PL> </Syn @OBJ @PCOMPL-O>
effectively </base "effective"> </lfeats <DER:ive> <DER:ly>> </pos ADV> </mfeats > </syn @ADVL>
:
Put </base "put"> </lfeats <*> <SVO>> </pos PCP2> </mfeats > </syn @NPHR @PCOMPL-O>
only </base "only"> </lfeats > </pos ADV> </mfeats > </syn @AD-A>>
one </base "one"> </lfeats > </pos NUM> </mfeats CARD> </syn @QN>>
copy </base "copy"> </lfeats > </pos N> </mfeats NOM SG> </syn @NPHR @OBJ>
of </base "of"> </lfeats> </pos PREP> </mfeats > </syn @<NOM-OF>
each </base "each"> </lfeats <Quant>> </pos DET> </mfeats CENTRAL SG> </syn @QN>>
program </base "program"> </lfeats > </pos N> </mfeats NOM SG> </syn @<P>
on </base "on"> </lfeats > </pos PREP> </mfeats> </syn @<NOM @ADVL>
your </base "you"> </lfeats > </pos PRON> </mfeats PERS GEN SG2/PL2> </syn @GN>>
hard_disk </base "hard_disk"> </lfeats > </pos N> </mfeats NOM SG> </syn @<P>
.
Having </base "have"> </lfeats <*> <SVO> <SVOC/A>> </pos PCP1> </mfeats > </syn @-FMAINV>
more=than </base "more=than"> </lfeats > </pos ADV> </mfeats > </syn @ADVL @AD-A>>
one </base "one"> </lfeats > </pos NUM> </mfeats CARD> </syn @QN>>
copy </base "copy"> </lfeats > </pos N> </mfeats NOM SG> </syn @SUBJ>
can </base "can"> </lfeats > </pos V> </mfeats AUXMOD VFIN> </syn @+FAUXV>
cause </base "cause"> </lfeats <SVO> <SVOO>> </pos V> </mfeats INF> </syn @-FMAINV>
errors </base "error"> </lfeats> </pos N> </mfeats NOM PL> </syn @OBJ>
.
Whenever </base "whenever"> </lfeats <*> <**CLB>> </pos ADV> </mfeats WH> <lSyn @ADVL>
you </base "you"> </lfeats <NonMod>> </pos PRON> </mfeats PERS NOM SG2/PL2> </syn @SUBJ>
copy </base "copy"> </lfeats <SVO> <SV> <P/of>> </pos V> </mfeats PRES -SG3 VFIN> </syn @+FMAINV>
a </base "a"> </lfeats <Indef>> </pos DET> </mfeats CENTRAL ART SG> </syn @DN>>
program </base "program"> </lfeats > </pos N> </mfeats NOM SG> </syn @NN>>
disk </base "disk"> </lfeats> </pos N> </mfeats NOM SG> </syn @OBJ>
to </base "to"> </lfeats > </pos PREP> </mfeats > </syn @<NOM @ADVL>

-continued your </base "you"> </lfeats > </pos PRON> </mfeats PERS GEN SG2/PL2> </syn @GN>>
hard_disk </base "hard_disk"> </lfeats> </pos N> </mfeats NOM SG> </syn @<P>
,
be </base "be"> </lfeats <SV> <SVCIN> <SVC/A>> </pos V> </mfeats SUBJUNCTIVE VFIN>
</syn @+FMAINV>
careful </base "careful"> </lfeats > </pos A> </mfeats ABS> </syn @PCOMPL-S>
not </base "not"> </lfeats > </pos NEG-PART> </mfeats > </syn @NEG>
to </base "to"> </lfeats > </pos INFMARK>> </mfeats > </syn @INFMARK>>
copy </base "copy"> </lfeats <SVO> <SV> <P/of>> </pos V> </mfeats INF> </syn @-FMAINV>
a </base "a"> </lfeats <indef>> </pos DET> </mfeats CENTRAL ART SG> </syn @DN>'
System </base "system"> </lfeats <*>> </pos N> </mfeats NOM SG> </syn @NN>>
Folder </base "folder"> </lfeats <*> <DER:er>> </pos N> </mfeats NOM SG> </syn @OBJ>
.
Always </base "always" > </lfeats <*>> </pos ADV> </mfeats ADVL> </syn @ADVL>
check </base "check"> </lfeats <SVO> <SV> <P/for> <P/with> <P/on>> </pos V> </mfeats IMP
VFIN> </syn @+FMAINV> </base "check"> </lfeats > </pos N> </mfeats NOM SG> </syn
@SUBJ>
to </base "to"> </lfeats > </pos INFMARK>> </mfeats > </syn @INFMARK>>
see </base "see"> </lfeats <as/SVOC/A> <SVO> <SV> <InfComp>> </pos V> </mfeats INF>
</syn @-FMAINV @<NOM-FMAINV>
what </base "what"> </lfeats <NonMod> <**CLB>> </pos PRON> </mfeats WH SG/PL> </syn
@SUBJ @OBJ>
you </base "you_"> </lfeats <NonMod>> </pos PRON> </mfeats PERS NOM SG2/PL2 SUBJ>
</syn @SUBJ>
've </base "have"> </lfeats <SVO>> </pos V> </mfeats PRES -SG3 VFIN> </syn @+FAUXV>
copied </base "copy"> </lfeats <SVO> <SV> <P/of>> </pos PCP2> </mfeats > </syn @-
FMAINV>
,
and </base "and"> </lfeats > </pos CC> </mfeats > </syn @CC>
drag </base "drag"> </lfeats <SVO> <SV>> </pos V> </mfeats IMP VFIN> </syn @+FMAINV>
</base "drag"> </lfeats <SVO> <SV>> </pos V> </mfeats INF> </syn @-FMAINV> </base "drag">
</lfeats <SVO> <SV>> </pos V> </mfeats PRES -SG3 VFIN> </syn @+FMAINV>
any </base "any"> </lfeats <Quant>> </pos DET> </mfeats CENTRAL SG/PL> </syn @QN>>
extra </base "extra"> </lfeats > </pos A> </mfeats ABS> </syn @AN>>
System </base "system"> </lfeats <*>> </po5 N> </mfeats NOM SG> </syn @OBJ @APP
@NN>>
Folders </base "folder"> </lfeats <*> <DER:er>> </pos N> </mfeats NOM PL> </syn @SUBJ
@OBJ @APP>
to </base "to"> </lfeats > </pos PREP> </mfeats > </syn @<NOM @ADVL>
the </base "the"> </lfeats <Def>> </pos DET> </mfeats CENTRAL ART SG/PL> </syn @DN>>
Trash </base "trash"> </lfeats <*> <-Indef>> </pos N> </mfeats NOM SG> </syn @<P>
.
if </base "if"> </lfeats <*> <**CLB>> </pos CS> </mfeats > </syn @CS>
a </base "a"> </lfeats <Indef>> </pos DET> </mfeats CENTRAL ART SG> </syn @DN>>
program </base "program"> </lfeats > </pos N> </mfeats NOM SG> </syn @SUBJ>
malfunctions </base "malfunction"> </lfeats <SV>> </pos V> </mfeats PRES SG3 VFIN> </syn
@+FMAINV>
consistently </base "consistent"> </lfeats <DER:ly>> </pos ADV> </mfeats > </syn @ADVL>
,
try </base "try"> </lfeats <SVO> <SV> <P/for>> </pos V> </mfeats IMP VFIN> </syn
@+FMAINV> </base "try"> </lfeats> </pos N> </mfeats NOM SG> </syn @APP @NN>>
installing </base "instal"> </lfeats <SVO>> </pos PCP1> </mfeats > </syn @OBJ @APP
@<NOM-FMAINV @-FMAINV>
a </base "a"> </lfeats <Indef>> </pos DET> </mfeats CENTRAL ART SG> </syn @DN>>
fresh </base "fresh"> </lfeats> </pos A> </mfeats ABS> </syn @AN>>
copy </base "copy"> </lfeats > </pos N> </mfeats NOM SG> </syn @OBJ>
.
If </base "if"> </lfeats <*> <**CLB>> </pos CS> </mfeats > </syn @CS>
that </base "that"> </lfeats > </pos PRON> </mfeats DEM SG> </syn @SUBJ>
does </base "do"> </lfeats <SVO> <SVOO> <SV>> </pos V> </mfeats PRES SG3 VFIN> </syn
@+FAUXV>
not </base "not"> </lfeats > </pos NEG-PART> </mfeats> </syn @NEG>
help </base "help"> </lfeats <SVO> <SV> <infComp> <P/with>> </pos V> </mfeats INF> </syn
@-FMAINV>
,
find </base "find"> </lfeats <SVOO> <SVOCIN> <SVOC/A> <SVO> <SV> <P/for>> </pos V>
</mfeats IMP VFIN> </syn @+FMAINV> </base "find"> </lfeats <SVOO> <SVOC/N> <SVOC/A>
<SVO> <SV> <P/for>> </pos V> </mfeats INF> </syn @-FMAINV>
out </base "out"> </lfeats > </pos ADV> </mfeats ADVL> </syn @ADVL>
from </base "from"> </lfeats > </pos PREP> </mfeats > </syn @ADVL>
the </base "the"> </lfeats <Def>> </pos DET> </mfeats CENTRAL ART SG/PL> </syn @DN>>
software </base "software"> </lfeats <-Indef>> </pos N> </mfeats NOM SG> </syn @NN>>
manufacturer </base "manufacturer"> </lfeats <DER:er>> </pos N> </mfeats NOM SG> </syn
@<P>
whether </base "whether"> </lfeats <**CLB>> </pos CS> </mfeats > </syn @CS>
your </base "you"> </lfeats > </pos PRON> </mfeats PERS GEN SG2/PL2> </syn @GN>>
version </base "version"> </lfeats > </pos N> </mfeats NOM SG> </syn @SUBJ>
of </base "of"> </lfeats > </pos PREP> </mfeats> </syn @<NOM-OF>
the </base "the"> </lfeats <Def>> </pos DET> </mfeats CENTRAL ART SG/PL> </syn @DN>>

-continued

```
program </base "program"> </lfeats > </pos N> </mfeats NOM SG> </syn @<P>
is </base "be"> </lfeats <SV> <SVC/N> <SVC/A>> </pos V> </mfeats PRES SG3 VFIN> </syn
@+FMAINV>
compatible </base "compatible"> </lfeats <DER:ble>> </pos A> </mfeats ABS> </syn
@PCOMPL-S>
with </base "with"> </lfeats > </pos PREP> </mfeats > </syn @<NOM @ADVL>
the </base "the"> </lfeats <Def>> </pos DET> </mfeats CENTRAL ART SG/PL> </syn @DN>>
system </base "system"> </lfeats > </pos N> </mfeats NOM SG> </syn @NN>>
software </base "software"> </lfeats <-Indef>> </pos N> </mfeats NOM SG> </syn @<P>
you </base "you_"> </lfeats <NonMod>> </pos PRON> </mfeats PERS NOM SG2/PL2 SUBJ>
</Syn @SUBJ>
're </base "be"> </lfeats <SV> <SVC/N> <SVC/A>> </pos V> </mfeats PRES -SG1,3 VFIN>
</syn @+FMAINV @+FAUXV>
using </base "use"> </lfeats <as/SVOC/A> <SVO> <SV>> </pos PCP1> </mfeats > </syn @-
FMAINV>
.
Put </base "put"> </lfeats <*> <SVO>> </pos PCP2> </mfeats > </syn @<P-FMAINV> </base
"put"> </lfeats <*> <SVO>> </pos V> </mfeats IMP VFIN> </syn @+FMAINV>
frequently </base "frequent"> </lfeats <DER:ly>> </pos ADV> </mfeats> </Syn @ADVL @AD-
A>>
used </base "use"> </lfeats <as/SVOC/A> <SVO> <SV>> </pos PCP2> </mfeats > </syn @AN>>
programs </base "program"> </lfeats > </pos N> </mfeats NOM PL> </syn @SUBJ @OBJ>
(
or </base "or"> </lfeats> </pos CC> </mfeats> </syn @CC>
aliases </base "alias"> </lfeats > </pos N> </mfeats NOM PL> </syn @SUBJ @OBJ @APP>
for </base "for"> </lfeats > </pos PREP> </mfeats> </syn @<NOM @ADVL>
those </base "that"> </lfeats > </pos DET> </mfeats CENTRAL DEM PL> </syn @DN>>
programs </base "program"> </lfeats > </pos N> </mfeats NOM PL> </syn @<P>
)
in </base "in"> </lfeats> </pos PREP> </mfeats > </syn @ADVL>
the </base "the"> </lfeats <Def>> </pos DET> </mfeats CENTRAL ART SG/PL> </syn @DN>>
Apple </base "apple"> </lfeats <*>> </pos N> </mfeats NOM SG> </syn @NN>>
menu </base "menu"> </lfeats > </pos N> </mfeats NOM SG> </syn @<P>
so </base "so"> </lfeats <**CLB>> </pos CS> </mfeats > </syn @CS>
you </base "you"> </lfeats <NonMod>> </pos PRON> </mfeats PERS NOM SG2/PL2 > </syn
@SUBJ>
can </base "can"> </lfeats > </pos V> </mfeats AUXMOD VFIN> </syn @+FAUXV>
open </base "open"> </lfeats <SVO> <SV>> </pos V> </mfeats INF> </syn @-FMAINV>
the </base "the"> </lfeats <Def>> </pos DET> </mfeats CENTRAL ART SG/PL> </syn @DN>>
programs </base "program"> </lfeats > </pos N> </mfeats NOM PL> </syn @OBJ>
more </base "much"> </lfeats > </pos ADV> </mfeats CMP> </syn @ADVL @AD-A>>
conveniently </base "convenient"> </lfeats <DER:ly>> </pos ADV> </mfeats > </syn @ADVL>
.
See </base "see"> </lfeats <*> <as/SVOC/A> <SVO> <SV> <InfComp>> </pos V> </mfeats IMP
VFIN> </syn @+FMAINV>
Chapter </base "chapter"> </lfeats <*>> </pos N> </mfeats NOM SG> </syn @OBJ @NN>>
5 </base "5"> </lfeats > </pos NUM> </mfeats CARD> </syn @OBJ @PCOMPL-0 @QN>
@<NOM @ADVL>
,
"
Adapting </base "adapt"> </lfeats <*> <SVO> <SV> <P/for>> </pos PCP1> </mfeats > </syn
@OBJ @PCOMPL-S @PCOMPL-O @APP @-FMAINV @AN>>
Your </base "you"> </lfeats <*>> </pos PRON> </mfeats PERS GEN SG2/PL2> </syn @GN>>
Computer </base "computer"> </lfeats <*> <DER:er>> </pos N> </mfeats NOM SG> </syn
@OBJ>
to </base "to"> </lfeats > </pos PREP> </mfeats > </syn @<NOM @ADVL>
Your </base "you"> </lfeats <*>> </pos PRON> </mfeats PERS GEN SG2/PL2 > </syn @GN>>
Own </base "own"> </lfeats <*>> </pos A> </mfeats ABS> </syn @AN>>
Use </base "use"> </lfeats <*>> </pos N> </mfeats NOM SG> </syn @<P>
"
To </base "to"> </lfeats <*>> </pos INFMARK>> </mfeats > </syn @INFMARK>>
open </base "open"> </lfeats <SVO> <SV>> <tpos V> </mfeats INF> </syn @-FMAINV>
a </base "a"> </lfeats <Indef>> </pos DET> </mfeats CENTRAL ART SG> </syn @DN>>
program </base "program"> </lfeats > </pos N> </mfeats NOM SG> </syn @OBJ>
automatically </base "automatical"> </lfeats <DER:ic> <DER:al> <DER:ly </pos ADV> </mfeats
> </syn @ADVL @AD-A>>
each </base "each"> </lfeats <Quant>> </pos DET> </mfeats CENTRAL SG> </syn @QN>>
time </base "time"> </lfeats > </pos N> </mfeats NOM SG> </syn @OBJ @ADVL>
you </base "you"> </lfeats <NonMod>> </pos PRON> </mfeats PERS NOM SG2/PL2> </syn
@SUBJ>
start </base "start"> </lfeats <SV> <SVO> <P/on>> </pos V> </mfeats PRES -SG3 VFIN> </syn
@+FMAINV>
up </base "up"> </lfeats> </pos ADV> </mfeats ADVL> </syn @ADVL>
,
you </base "you"> </lfeats <NonMod>> </pos PRON> </mfeats PERS NOM SG2/PL2 > </syn
@SUBJ>
can </base "can"> </lfeats > </pos V> </mfeats AUXMOD VFIN> </syn @+FAUXV>
put </base "put"> </lfeats <SVO>> </pos V> </mfeats INF> </syn @-FMAINV>
the </base "the"> </lfeats <Def>> </pos DET> </mfeats CENTRAL ART SG/PL> </syn @DN>>
```

-continued

```
program </base "program"> </lfeats > </pos N> </mfeats NOM SG> </syn @OBJ>
(
or </base "or"> </lfeats > </pos CC> </mfeats > </syn @CC>
its </base "it"> </lfeats > </pos PRON> </mfeats GEN SG3> </syn @GN>>
alias </base "alias"> </lfeats > </pos N> </mfeats NOM SG> </syn @SUBJ @OBJ>
)
into </base "into"> </lfeats > </pos PREP> </mfeats > </syn @ADVL>
the </base "the"> </lfeats <Def>> </pos DET> </mfeats CENTRAL ART SG/PL> </syn @DN>>
Startup </base "startup"> </lfeats <*>> </pos N> </mfeats NOM SG> </syn @NN>>
Items </base "item"> </lfeats <*>> </pos N> </mfeats NOM PL> </syn @NN>>
folder </base "folder"> </lfeats <DER:er>> </pos N> </mfeats NOM SG> </syn @<P>

See </base "see"> </lfeats <*> <as/SVOC/A> <SVO> <SV> <InfComp>> </pos V> </mfeats IMP
VFIN> </syn @+FMA:NV>
Chapter </base "chapter"> </lfeats <*>> </pos N> </mfeats NOM SG> </syn @OBJ @NN>>
5 </base "5"> </lfeats > </pos NUM> </mfeats CARD> </syn @OBJ @PCOMPL-O @QN>
@<NOM @ADVL>
,
"
Adapting </base "adapt"> </lfeats <*> <SVO> <SV> <P/for>> </pos PCP1> </mfeats > </syn
@OBJ @PCOMPL-S @PCOMPL-O @APP @-FMA:NV @AN>>
Your </base "you"> </lfeats <*>> </pos PRON> </mfeats PERS GEN SG2/PL2> </syn @GN>>
Computer </base "computer"> </lfeats <*> <DER:er>> </pos N> </mfeats NOM SG> </syn
@OBJ>
to </base "to"> </lfeats > </pos PREP> </mfeats > </syn @<NOM @ADVL>
Your </base "you"> </lfeats <*>> </pos PRON> </mfeats PERS GEN SG2/PL2 > </syn @GN>>
Own </base "own"> </lfeats <*>> </pos A> </mfeats ABS> </syn @AN>>
Use </base "use"> </lfeats <*>> </pos N> </mfeats NOM SG> </syn @<P>
.
```

EXAMPLE E

Referring to FIG. 4 or example E, in an embodiment of the present invention the labels take the form of "</keyword>", where keyword may be one of "base", "lfeats", "pos", "mfeats", or "syn", specifying that the token(s) which follow the keyword comprise, respectively, the base form, lexical features, part-of-speech tag, morphological features, and syntactic label associated with each word.

Referring to the below example, hereinafter referred to as example F, at step 305, markup tags that were stripped at step 302 (e.g., from the text in example A) are merged with the linguistically annotated and explicitly labeled text (e.g., of example E) yielding a stream of tokens, some of which are words of text from the document, some of which are linguistic annotations about a word of text, and some of which are markup tags associated with a string of tokens representing a phrase or sentence from the document.

```
</chapter> Setting </base "set"> </lfeats <*> <SVOC/A> <SVO> <SVOO> <SV> <P/on>> </pos
PCP1> </mfeats > </syn @NPHR @-FMAINV> Up </base "up"> </lfeats <*>> </pos ADV>
</mfeats ADVL> </syn @ADVL> Your </base "you > </lfeats <*>> </pos PRON> </mfeats PERS
GEN SG2/PL2 > </syn @GN>> Programs </base "program"> </lfeats <*>> </pos N> </mfeats
NOM PL> </syn @NPHR @OBJ> </echapter>
</para>
This </base "this"> </lfeats <*>> </pos DET> </mfeats CENTRAL DEM SG> </syn @DN>>
chapter </base "chapter"> </lfeats > </pos N> </mfeats NOM SG> </syn @SUBJ> describes
</base "describe"> </lfeats <as/SVOC/A> <SVO>> </pos V> </mfeats PRES SG3 VFIN> </syn
@+FMAINV> how </base "how"> </lfeats <**CLB>> </pos ADV> </mfeats WH> </syn @ADVL>
to </base "to"> </lfeats > </pos INFMARK>> </mfeats> </syn @INFMARK>> set </base "set">
</lfeats <SVOC/A> <SVO> <SVOO> <SV> <P/on>> </pos V> </mfeats INF> </syn @-FMAINV>
up </base "up"> </lfeats> </pos ADV> </mfeats ADVL> </syn @ADVL> the </base "the"> </lfeats
<Def>> </pos DET> </mfeats CENTRAL ART SG/PL> </syn @DN>> programs </base
"program"> </lfeats > </pos N> </mfeats NOM PL> </syn @OBJ @I-OBJ> that </base "that">
</lfeats <CLB>> </pos CS> </mfeats > </syn @CS> </base "that"> </lfeats <NonMod> <CLB>
<Rel>> </pos PRON> </mfeats SG/PL> </syn @SUBJ @OBJ @I-OBJ @PCOMPL-O> you
</base "you"> </lfeats <NonMod>> </pos PRON> </mfeats PERS NOM SG2/PL2> </syn
@SUBJ> use </base "use"> </lfeats> </pos N> </mfeats NOM SG> </syn @OBJ> </base "use">
</lfeats <as/SVOC/A> <SVO> <SV>> </pos V> </mfeats PRES -SG3 VFIN> </syn @+FMAINV>
when </base "when"> </lfeats <**CLB>> </pos ADV> </mfeats WH> </syn @ADVL> you </base
"you"> </lfeats <NonMod>> </pos PRON> </mfeats PERS NOM SG2/PL2> </syn @SUBJ> work
</base "work"> </lfeats <SV> <SVO> <Plin> <P/on>> </pos V> </mfeats PRES -SG3 VFI N>
</syn @+FMAINV> with </base "with"> </lfeats > </pos PREP> </mfeats > </syn @ADVL> your
</base "you"> </lfeats > </pos PRON> </mfeats PERS GEN SG2/PL2> </syn @GN>> computer
</base "computer"> </lfeats <DER:er>> </pos N> </mfeats NOM SG> </syn @<P>
</epara>
</section>
Installing </base "instal"> </lfeats <*> <SVO>> </pos PCP1> </mfeats> </syn @NPHR @-
FMAINV> your </base "you"> </lfeats > </pos PRON> </mfeats PERS GEN SG2/PL2> </syn
@GN>> application </base "application"> </lfeats> </pos N> </mfeats NOM SG> </syn @NPHR
```

-continued

@NN>> programs </base "program"> </lfeats > </pos N> </mfeats NOM PL> </syn @NPHR @OBJ>
</esection>
</para>
Most </base "much"> </lfeats <*> <Quant>> </pos DET> </mfeats POST SUP SG> </syn @QN>> </base "many"> </lfeats <*> <Quant>> </pos DET> </mfeats POST SUP PL> </syn @QN>> application </base "application"> </lfeats > </pos N> </mfeats NOM SG> </syn @NN>> programs </base "program"> </lfeats > </pos N> </mfeats NCM PL> </syn @SUBJ> come </base "come"> </lfeats <SVC/A> <SV> <P/for>> </pos V> </mfeats PRES -SG3 VFIN> </syn @+FMAINV> on </base "on"> </lfeats > </pos PREP> </mfeats > </syn @ADVL> </base "on"> </lfeats > </pos ADV> </mfeats ADVL> </syn @ADVL> floppy_disks </base "floppy_disk"> </lfeats > </pcs N> </mfeats NOM PL> </syn @<P> ,and </base "and"> </lfeats > </pos CC> </mfeats > </syn @CC> you </base "you"> </lfeats <NonMod>> </pos PRON> </mfeats PERS NOM SG2/PL2> </syn @SUBJ> install </base "install"> </lfeats <SVO>> </pos V> </mfeats PRES -SG3 VFIN> </syn @+FMAINV> them </base "they"> </lfeats <NonMod>> </pos PRON> </mfeats PERS ACC PL3> </syn @OBJ> by </base "by"> </lfeats > </pos PREP> </mfeats> </syn @ADVL> copying </base "copy"> </lfeats <SVO> <SV> <P/of>> </pos PCP1> </mfeats> </syn @<P-FMAINV> them </base "they"> </lfeats <NonMod>> </pos PRON> </mfeats PERS ACC PL3> </syn @OBJ> from </base "from"> </lfeats > </pos PREP> </mfeats > </syn @ADVL> the </base "the"> </lfeats <Def>> </pos DET> </mfeats CENTRAL ART SG/PL> </syn @DN>> floppy_disks </base "floppy_disk"> </lfeats > </pos N> </mfeats NOM PL> </syn @<P> to </base "to"> </lfeats > </pos PREP> </mfeats> </syn @<NOM @ADVL> your </base "you"> </lfeats> </pcs PRON> </mfeats PERS GEN SG2/PL2> </syn @GN>> hard_disk </base "hard disk"> </lfeats > </pos N> </mfeats NOM SG> </syn @<P> .
Some </base "some"> </lfeats <*> <Quant>> </pos DET> </mfeats CENTRAL SG/PL> </syn @QN>> programs </base "program"> </lfeats> </pos N> </mfeats NOM PL> </syn @SUBJ> have </base "have"> </lfeats <SVO> <SVOC/A>> </pos V> </mfeats PRES -SG3 VFIN> </syn @+FMAINV> special </base "special"> </lfeats> </pos A> </mfeats ABS> </syn @AN>> installation </base "installation"> </lfeats > </pos N> </mfeats NOM SG> </syn @OBJ @NN>> instructions </base "instruction"> </lfeats > </pos N> </mfeats NOM PL> </syn @OBJ> .
See </base "see"> </lfeats <*> <as/SVOC/A> <SVO> <SV> <InfComp>> </pcs V> </mfeats IMP VFIN> </syn @+FMAINV> the </base t,the"> </lfeats <Def>> </pos DET> </mfeats CENTRAL ART SG/PL> </syn @DN>> documentation </base "documentation"> </lfeats <-Indef>> </pos N> </mfeats NOM SG> </syn @OBJ> that </base "that"> </lfeats <NonMod> <**CLB> <Rel>> </pos PRON> </mfeats SG/PL> </syn @SUBJ> came </base "come"> </lfeats <SVC/A> <SV> <P/for>> </pos V> </mfeats PAST VFIN> </syn @+FMAINV> with </base "with"> </lfeats > </pos PREP> </mfeats > </syn @ADVL> your </base "you"> </lfeats> </pos PRON> </mfeats PERS GEN SG2/PL2> </syn @GN>> programs </base "program"> </lfeats > </pos N> </mfeats NOM PL> </syn @<P> .
</epara>
</para>
To </base "to"> </lfeats <*>> </pos INFMARK>> </mfeats > </syn @INFMARK>> use </base "use"> </lfeats <as/SVOC/A> <SVO> <SV>> </pos V> </mfeats INF> </syn @-FMAINV> your </base "you"> </lfeats > </pos PRON> </mfeats PERS GEN SG2/PL2> </syn @GN>> programs </base program > </lfeats > </pos N> </mfeats NOM PL> </syn @OBJ> most </base "much"> </lfeats > </pos ADV> </mfeats SUP> </syn @ADVL @AD-A>> </base "much"> </lfeats <Quant>> </pos PRON> </mfeats SUP SG> </syn @OBJ @PCOMPL-O> </base "many"> </lfeats <Quant>> </pcs PRON> </mfeats SUP PL> </syn @OBJ @PCOMPL-O> effectively </base "effective"> </lfeats <DER:ive> <DER:ly>> </pos ADV> </mfeats > </syn @ADVL> :
</epara>
</list>
</item> Put </base "put"> </lfeats <*> <SVO>> </pos PCP2> </mfeats > </syn @NPHR @PCOMPL-O> only </base "only"> </lfeats > </pos ADV> </mfeats> </syn @AD-A>> one </base "one"> </lfeats > </pos NUM> </mfeats CARD> </syn @QN>> copy </base "copy"> </lfeats> </pos N> </mfeats NOM SG> </syn @NPHR @OBJ> of </base "of"> </lfeats > </pos PREP> </mfeats > </syn @<NOM-OF> each </base "each"> </lfeats <Quant>> </pos DET> </mfeats CENTRAL SG> </syn @QN>> program </base "program"> </lfeats > </pos N> </mfeats NOM SG> </syn @<P> on </base "on"> </lfeats > </pos PREP> </mfeats > </syn @<NOM @ADVL> your </base "you"> </lfeats > </pos PRON> </mfeats PERS GEN SG2/PL2 > </syn @GN>> hard disk </base "hard disk"> </lfeats > </pos N> </mfeats NOM SG> </syn @<P>
Having </base "have"> </lfeats <*> <SVO> <SVOC/A>> </pos PCP1> </mfeats > </syn @-FMAINV> more=than </base "more=than"> </lfeats > </pos ADV> </mfeats > </syn @ADVL @AD-A>> one </base "one"> </lfeats > </pos NUM> </mfeats CARD> </syn @QN>> copy </base "copy"> </lfeats > </pos N> </mfeats NOM SG> </syn @SUBJ> can </base "can"> </lfeats> </pos V> </mfeats AUXMOD VFIN> </syn @+FAUXV> cause </base "cause"> </lfeats <SVO> <SVOO>> </pos V> </mfeats INF> </syn @-FMAINV> errors </base "error"> </lfeats> </pos N> </mfeats NOM PL> </syn @OBJ>
</eitem>
</item> Whenever </base "whenever"> </lfeats <*> <**CLB>> </pos ADV> </mfeats WH> </syn @ADVL> you </base "you"> </lfeats <NonMod>> </pos PRON> </mfeats PERS NOM SG2/PL2 > </syn @SUBJ> copy </base "copy"> </lfeats <SVO> <SV> <P/of>> </pos V> </mfeats PRES -SG3 VFIN> </syn @+FMAINV> a </base "a"> </lfeats <Indef>> </pos DET> </mfeats CENTRAL ART SG> </syn @DN>> program </base "program"> </lfeats> </pos N> </mfeats NOM SG> </syn @NN>> disk </base "disk"> </lfeats> </pos N> </mfeats NOM SG> </syn @OBJ> to </base "to"> </lfeats > </pos PREP> </mfeats > </syn @<NOM @ ADVL> your </base "you"> </lfeats > </pos PRON> </mfeats PERS GEN SG2/PL2> </syn @GN>> hard_disk </base "hard disk"> </lfeats > </pos N> </mfeats NOM SG> </syn @<P> , be </base "be"> </lfeats <SV> <SVC7N> <SVC/A>> </pos V> </mfeats SUBJUNCTIVE VFIN> </syn @+FMAINV> careful </base "careful"> </lfeats> </pos A> </mfeats ABS> </syn @PCOMPL-S> not </base "not">

-continued

</lfeats > </pos NEG-PART> </mfeats > </syn @NEG> to </base "to"> </lfeats > </pos INFMARK>> </mfeats> </syn @INFMARK>> copy </base "copy"> </lfeats <SVO> <SV> <P/of>> </pos V> </mfeats INF> </syn @-FMAINV> a </base "a"> </lfeats <Indef>> </pos DET> </mfeats CENTRAL ART SG> </syn @DN>> System </base "system"> </lfeats <*>> </pos N> </mfeats NOM SG> </syn @NN>> Folder </base "folder"> </lfeats <*> <DER:er>> </pos N> </mfeats NOM SG> </syn @OBJ>.
Always </base "always"> </lfeats <*>> </pos ADV> </mfeats ADVL> </syn @ADVL> check </base "check"> </lfeats <SVO> <SV> <P/for> <P/with> <P/on>> </pos V> </mfeats IMP VFIN> </syn @+FMAINV> </base "check"> </lfeats > </pos N> </mfeats NOM SG> </syn @SUBJ> to </base "to"> </lfeats > </pos INFMARK>> </mfeats > </syn @INFMARK>> see </base "see"> </lfeats <as/SVOC/A> <SVO> <SV> <InfComp>> </pos V> </mfeats INF> </syn @-FMAINV @<NOM-FMAINV> what </base "what"> </lfeats <NonMod> <**CLB>> </pos PRON> </mfeats WH SG/PL> </syn @SUBJ @OBJ> you </base "you_"> </lfeats <NonMod>> </pos PRON> </mfeats PERS NOM SG2/PL2 SUBJ> </syn @SUBJ> 've </base "have"> </lfeats <SVO>> </pos V> </mfeats PRES -SG3 VFIN> </syn @+FAUXV> copied </base "copy"> </lfeats <SVO> <SV> <P/of>> </pos PCP2> </mfeats > </syn @-FMAINV> and </base "and"> </lfeats > </pos CC> </mfeats > </syn @CC> drag </base "drag"> </lfeats <SVO> <SV>> </pos V> </mfeats IMP VFIN> </syn @+FMAINV> </base "drag"> </lfeats <SVO> <SV>> </pos V> </mfeats INF> </syn @-FMAINV> </base "drag"> </lfeats <SVO> <SV>> </pos V> </mfeats PRES -SG3 VFIN> </syn @+FMAINV> any </base "any"> </lfeats <Quant>> </pos DET> </mfeats CENTRAL SG/PL> </syn @QN>> extra </base "extra"> </lfeats > </pos A> </mfeats ABS> </syn @AN>> System </base "system"> </lfeats <*>> </pos N> </mfeats NOM SG> </syn @OBJ @APP @NN>> Folders </base "folder"> </lfeats <*> <DER:er>> </pos N> </mfeats NOM PL> </syn @SUBJ @OBJ @APP> to </base "to"> </lfeats > </pos PREP> </mfeats > </syn @<NOM @ADVL> the </base "the"> </lfeats <Def>> </pos DET> </mfeats CENTRAL ART SG/PL> </syn @DN>> Trash </base "trash"> </lfeats <*> <-Indef>> </pos N> </mfeats NOM SG> </syn @<P>
</eitem>
</item> if </base "if"> </lfeats <*> <**CLB>> </pos CS> </mfeats > </syn @CS> a </base "a"> </lfeats <Indef>> </pos DET> </mfeats CENTRAL ART SG> </syn @DN>> program </base "program"> </lfeats > </pos N> </mfeats NOM SG> </syn @SUBJ> malfunctions </base "malfunction"> </lfeats <SV>> </pos V> </mfeats PRES SG3 VFIN> </syn @+FMAINV> consistently </base "consistent"> </lfeats <DER:ly>> </pos ADV> </mfeats > </syn @ADVL> ,try </base "try"> </lfeats <SVO> <SV> <P/for>> </pos V> </mfeats IMP VFIN> </syn @+FMAINV> </base "try"> </lfeats > </pos N> </mfeats NOM SG> </syn @APP @NN>> installing </base "instal"> </lfeats <SVO>> </pos PCP1> </mfeats > </syn @OBJ @APP @<NOM-FMAINV @-FMAINV> a </base "a"> </lfeats <Indef>> </pos DET> </mfeats CENTRAL ART SG> </syn @DN>> fresh </base "fresh"> </lfeats > </pos A> </mfeats ABS> </syn @AN>> copy </base "copy"> </lfeats > </pos N> </mfeats NCM SG> </syn @OBJ>.
if </base "if"> </lfeats <*> <CLB>> </pQs CS> </mfeats > </syn @CS> that </base "that"> </lfeats > </pos PRON> </mfeats DEM SG> </syn @SUBJ> does </base "do"> </lfeats <SVO> <SVOO> <SV>> </pos V> </mfeats PRES SG3 VFIN> </syn @+FAUXV> not </base "not"> </lfeats> </pos NEG-PART> </mfeats> </syn @NEG> heip </base "help"> </lfeats <SVO> <SV> <InfComp> <P/with>> </pos V> </mfeats INF> </syn @-FMAINV> ,find </base "find"> </lfeats <SVOO> <SVOC/N> <SVOC/A> <SVO> <SV> <P/for>> </pos V> </mfeats IMP VFIN> </syn @+FMAINV> </base "find"> </lfeats <SVOO> <SVOC/N> <SVOC/A> <SVO> <SV> <P/for>> </pos V> </mfeats INF> </syn @-FMAINV> put </base "out"> </lfeats> </pos ADV> </mfeats ADVL> </syn @ADVL> from </base "from"> </lfeats > </pos PREP> </mfeats > </syn @ADVL> the </base "the"> </lfeats <Def>> </pos DET> </mfeats CENTRAL ART SG/PL> </syn @DN>> software </base "software"> </lfeats <-Indef>> </pos N> </mfeats NOM SG> </syn @NN>> manufacturer </base "manufacturer"> </lfeats <DER:er>> </pos N> </mfeats NOM SG> </syn @<P> whether </base "whether"> </lfeats <CLB>> </pos CS> </mfeats > </syn @CS> your </base "you"> </lfeats> </pos PRON> </mfeats PERS GEN SG2/PL2> </syn @GN>> version </base "version"> </lfeats > </pos N> </mfeats NOM SG> </syn @SUBJ> of </base "of"> </lfeats > </pos PREP> </mfeats > </syn @<NOM-OF> the </base "the"> </lfeats <Def>> </pos DET> </mfeats CENTRAL ART SG/PL> </syn @DN>> program </base "program"> </lfeats > </pos N> </mfeats NOM SG> </syn @<P> is </base "be"> </lfeats <SV> <SVC/N> <SVC/A>> </pos V> </mfeats PRES SG3 VFIN> </syn @+FMAINV> compatible </base "compatible"> </lfeats <DER:ble>> </pos A> </mfeats ABS> </syn @PCOMPL-S> with </base "with"> </lfeats > </pos PREP> </mfeats> </syn @<NOM @ADVL> the </base "the"> </lfeats <Def>> </pos DET> </mfeats CENTRAL ART SG/PL> </syn @DN>> system </base "system"> </lfeats > </pos N> </mfeats NOM SG> </syn @NN>> software </base "software"> </lfeats <-Indef>> </pos N> </mfeats NOM SG> </syn @<P> you </base "you_"> </lfeats <NonMod>> </pos PRON> </mfeats PERS NOM SG2/PL2 SUBJ> </syn @SUBJ> 're </base "be"> </lfeats <SV> <SVC/N> <SVC/A>> </pos V> </mfeats PRES -SG1 ,3 VFIN> </syn @+FMAINV @+FAUXV> using </base "use"> </lfeats <as/SVOC/A> <SVO> <SV>> </pos PCP1> </mfeats > </syn @-FMAINV> .
</eitem>
</item> Put </base "put"> </lfeats <*> <SVO>> </pos PCP2> </mfeats > </syn @<P-FMAINV> </base "put"> </lfeats <*> <SVO>> </pos V> </mfeats IMP VFIN> </syn @+FMAINV> frequently </base "frequent"> </lfeats <DER:ly>> </pos ADV> </mfeats > </syn @ADVL @AD-A>> used </base "use"> </lfeats <as/SVOC/A> <SVO> <SV>> </pos PCP2> </mfeats> </syn @AN>> programs </base "program"> </lfeats > </pos N> </mfeats NOM PL> </syn @SUBJ @OBJ> /or </base "or"> </lfeats > </pos CC> </mfeats > </syn @CC> aliases </base "alias"> </lfeats > </pos N> </mfeats NOM PL> </syn @SUBJ @OBJ @APP> for </base "for"> </lfeats > </pos PREP> </mfeats > </syn @<NOM @ADVL> those </base "that"> </lfeats > </pos DET> </mfeats CENTRAL DEM PL> </syn @DN>> programs </base "program"> </lfeats > </pos N> </mfeats NOM PL> </syn @<P> ) in </base "in"> </lfeats> </pos PREP> </mfeats > </syn @ADVL> the </base "the"> </lfeats <Def>> </pos DET> </mfeats CENTRAL ART SG/PL> </syn @DN>> Apple </base "apple"> </lfeats <*>> </pos N> </mfeats NOM SG> </syn @NN> menu </base "menu"> </lfeats > </pos N> </mfeats NOM SG> </syn @<P> so </base "so"> </lfeats <**CLB>> </pos -continued

```
CS> </mfeats> </syn @CS> you </base "you"> </lfeats <NonMod>> </pos PRON> </mfeats
PERS NOM SG2/PL2 > </syn @SUBJ> can </base "can"> </lfeats > </pos V> </mfeats AUXMOD
VFIN> </syn @+FAUXV> open </base "open"> </lfeats <SVO> <SV>> </pos V> </mfeats INF>
</syn @-FMAINV> the </base "the"> </lfeats <Def>> </pos DET> </mfeats CENTRAL ART
SG/PL> </syn @DN>> programs </base "program"> </lfeats > </pos N> </mfeats NOM PL>
</syn @OBJ> more </base "much"> </lfeats> </pos ADV> </mfeats CMP> </syn @ADVL @AD-
A>> conveniently </base "convenient"> </lfeats <DER:ly>> </pos ADV> </mfeats > </syn
@ADVL>.
See </base "see"> </lfeats <*> <as/SVOC/A> <SVO> <SV> <InfComp>> </pos V> </mfeats IMP
VFIN> </syn @+FMAINV> Chapter </base "chapter"> </lfeats <*>> </pos N> </mfeats NOM SG>
</syn @OBJ @NN>> 5 </base "5"> </lfeats > </pos NUM> </mfeats CARD> </syn @OBJ
@PCOMPL-O @QN> @<NOM @ADVL> ,"Adapting </base "adapt"> </lfeats <*> <SVO> <SV>
<P/for>> </pos PCP1> </mfeats > </syn @OBJ@PCOMPL-S @PCOMPL-O @APP @-FMAINV
@AN>> Your </base "you"> </lfeats <*>> </pos PRON> </mfeats PERS GEN SG2/PL2> </syn
@GN>> Computer </base"computer"> </lfeats <*> <DER:er>> </pos N> </mfeats NOM SG>
</syn @OBJ> to </base "to"> </lfeats > </pos PREP> </mfeats> </syn @<NOM @ADVL> Your
</base "you"> </lfeats <*>> </pos PRON> </mfeats PERS GEN SG2/PL2> </syn @GN>> Own
</base "own"> </lfeats <*>> </pos A> </mfeats ABS> </syn @AN>> Use </base "use"> </lfeats
<*>> </pos N> </mfeats NOM SG> </syn @<P>.
</eitem>
</item> To </base "to"> </lfeats <*>> </pos INFMARK>> </mfeats > </syn @INFMARK>> open
</base "open"> </lfeats <SVO> <SV>> </pos V> </mfeats INF> </syn @-FMAINV> a </base "a">
</lfeats <Indef>> </pos DET> </mfeats CENTRAL ART SG> </syn @DN>> program </base
"program"> </lfeats > </pos N> </mfeats NOM SG> </syn @OBJ> automatically </base
"automatical"> </lfeats <DER:ic> <DER:al> <DER:ly>> </pos ADV> </mfeats> </syn @ADVL
@AD-A>> each </base "each"> </lfeats <Quant>> </pos DET> </mfeats CENTRAL SG> </syn
@QN>> time </base "time"> </lfeats > </pos N> </mfeats NOM SG> </syn @OBJ @ADVL> you
</base "you"> </lfeats <NonMod>> </pos PRON> </mfeats PERS NOM SG2/PL2> </syn
@SUBJ> start </base "start"> </lfeats <SV> <SVO> <P/on>> </pos V> </mfeats PRES -SG3
VFIN> </syn @+FMAINV> up </base "up"> </lfeats > </pos ADV> </mfeats ADVL> </syn
@ADVL> ,you </base "you"> </lfeats <NonMod>> </pos PRON> </mfeats PERS NOM
SG2/PL2> </syn @SUBJ> can </base "can"> </lfeats> </pos V> </mfeats AUXMOD VFIN> </syn
@+FAUXV> put </base "put"> </lfeats <SVO>> </pos V> </mfeats INF> </syn @-FMAINV> the
</base "the"> </lfeats <Def>> </pos DET> </mfeats CENTRAL ART SG/PL> </syn @DN>>
program </base "program"> </lfeats > </pos N> </mfeats NOM SG> </syn @OBJ> /or </base
"or"> </lfeats > </pos CC> </mfeats> </syn @CC> its </base "it"> </lfeats> </pos PRON>
</mfeats GEN SG3> </syn @GN>> alias </base "alias"> </lfeats > </pos N> </mfeats NOM SG>
</syn @SUBJ @OBJ> ) into </base "into"> </lfeats > </pos PREP> </mfeats > </syn @ADVL>
the </base "the"> </lfeats <Def>> </pos DET> </mfeats CENTRAL ART SG/PL> </syn @DN>>
Startup </base "startup"> </lfeats <*>> </pos N> </mfeats NOM SG> </syn @NN>> Items </base
"item"> </lfeats <*>> </pos N> </mfeats NOM PL> </syn @NN>> folder </base "folder"> </lfeats
<DER:er>> </pos N> </mfeats NOM SG> </syn @<P> .
See </base "see"> </lfeats <*> <as/SVOC/A> <SVO> <SV> <InfComp>> </pos V> </mfeats IMP
VFIN> </syn @+FMAINV> Chapter </base "chapter"> </lfeats <*>> </pos N> </mfeats NOM SG>
</syn @OBJ @NN>> 5 </base "5"> </lfeats > </pos NUM> </mfeats CARD> </syn @OBJ
@PCOMPL-O @QN> @<NOM @ADVL> "Adapting </base "adapt"> </lfeats <*> <SVO> <SV>
<P/for>> </pos PCP1> </mfeats > </syn @OBJ @PCOMPL-S @PCOMPL-O @APP @-FMAINV
@AN>> Your </base "you"> </lfeats <*>> </pos PRON> </mfeats PERS GEN SG2/PL2 > </syn
@GN>> Computer </base "computer"> </Jfeats <*> <DER:er>> </pos N> </mfeats NOM SG>
</syn @OBJ> to </base "to"> </lfeats > </pos PREP> </mfeats > </syn @<NOM @ADVL> Your
</base "you"> </lfeats <*>> </pos PRON> </mfeats PERS GEN SG2/PL2 > </syn @GN>> Own
</base "own"> </lfeats <*>> </pos A> </mfeats ABS> </syn @AN>> Use </base "use"> </lfeats
<*>> </pos N> </mfeats NOM SG> </syn @<P> .
"
</eitem>
</elist>
```

EXAMPLE F

Knowledge Mining Stage

As was discussed earlier, an object of the present invention is to automatically derive a domain catalog from an online technical document. The primary task of step 331 is to identify and extract important words or phrases deemed sufficiently representative of the domain to which the documentation is directed and incorporate these into the domain catalog. The underlying apparatus for accomplishing that task is a pattern matching engine. Given a merged file containing linguistically annotated ASCII text and markup information as provided by steps in linguistic analysis stage 300, the pattern matching engine of the present invention searches at step 331 for instances of particular syntactic patterns to identify information sufficiently representative of the domain, that is, the pattern matching engine mines for knowledge by searching for selected syntactic patterns in the text. Importantly, there is no semantic analysis, per se, of the text of the document. Although there is identification of semantically close units, the present invention does not use such information for sentence interpretation.

Beginning with the proposition that a document describes a domain, it may be said that what is used in this description are the key terms in the domain, the kind of relations, i.e., actions in which the key terms participate, the kind of structures or groupings that subsets of these key terms form, the kind of properties which are associated with these key terms, and the kind of associations that exist between key terms and between relations in the domain. Therefore, it is these kinds of domain characteristics that are sought out in the knowledge mining stage, and incorporated into the domain catalog.

Figure 5:
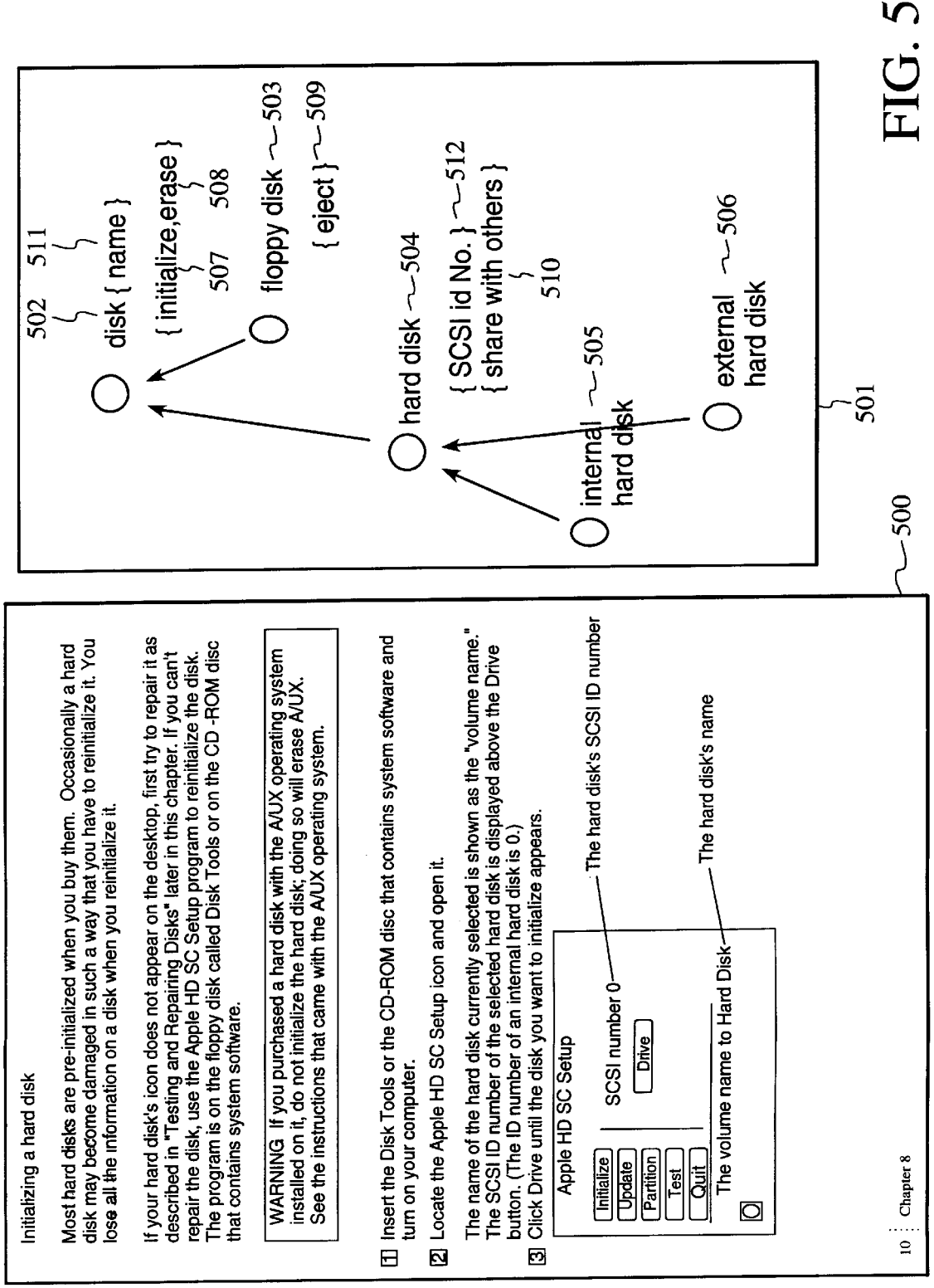
FIG. 5 is an embodiment of a data structure of the present invention.

To illustrate with reference to FIG. 5, a page of text 500 representative of a page of text from a technical document is shown. In this particular illustration, page 500 is taken from an online copy of the Apple Macintosh Reference guide, Chapter 2. The domain, or topic, to which the document is generally directed could be said to be "disks", as is apparent from the repeated occurrence of that term in the text. The key terms in the domain are shown as nodes in a lexical network 501 (i.e., a domain catalog), and are comprised of "disk" 502, "floppy disk" 503, "hard disk" 504, "internal hard disk" 505 and "external hard disk" 506. The kind of relations in which the key terms participate, reduced to their morphological base forms, are "initialize" 507 and "erase" 508, applicable to all disks, "eject" 509, applicable only to floppy disks, and "share with others" 510, applicable to hard disks, either internal or external. Thus, a relationship can be thought of as a verb, and the key terms to which it applies can be thought of as noun phrases in argument positions to it.

The structure imposed on the key terms can be characterized as forming a hierarchical tree, in which internal hard disk and external hard disk are subsets of hard disk, which, in turn, along with floppy disk, is a subset of disk. The properties with which the key terms are associated are "name" 511, associated with disk, and "SCSI id No." associated with hard disk. At first glance, properties may appear no different than a key term in the domain. Both key terms and properties are noun phrases. However, a property is generally a noun phrase related to or associated with a noun phrase that is a key term. Additionally, a property could be, for example, a predicate adjective, e.g., "disks came preinitialized". A property occurs less frequently than a key term within the document, and does not have the same discourse behavior, i.e., it does not appear in the same position of syntactical patterns as do key terms.

It will be seen that a lexical network of the kind illustrated in FIG. 5 may be derived from the merged file (containing text and markup information, an example of which is found in example F) passed to knowledge mining stage 330 from linguistic analysis stage 300.

The model for this to happen is that certain semantically prominent or important terms, relations, and properties repeatedly manifest themselves as syntactic structures or patterns. The pattern matching engine can thus be used as a mining tool to obtain, via syntactic structure, the semantic relation underlying the structure. For example, generally, a key term in the domain typically maps onto a noun phrase; an activity between two key terms in the domain might map onto a subject-verb-object phrase or, generally, a verb with arguments construction. Thus, the pattern matching engine of the present invention searches for such syntactic structures or patterns in order to locate the key terms, relations and properties of the domain. Linguistic analysis stage 300 provides in annotated form the linguistic information needed to successfully search for the syntactic patterns underlying the text of the document.

In the context of technical documentation, the most representative information of such text is its set of technical terms. The key terms of a domain are generally comprised of the technical terms of the domain. Moreover, in technical documentation, technical terms consist primarily of noun phrases, as is indicated by the key terms illustrated in FIG. 5. Thus, referring to FIG. 6, in constructing the domain catalog, the pattern matching engine of the present invention may begin knowledge mining at step 601 by first searching for, as an example, noun phrases indicative of technical terminology. It should be understood that the complete set of technical terms are not defined in terms of their syntactic structure according to any rigid set of rules. There are, obviously, a number of syntactical patterns, or variations on patterns provided in the examples that follow, which, depending on the type or content of the technical documentation, would similarly represent common syntactic structures of technical terminology.

Referring now to FIG. 7, the page of text 500 representative of a page of text from the Apple Reference guide that ships with every Apple Macintosh computer is shown. In identifying technical terminology, the syntactic pattern matching engine of the present invention searches the document, looking for a predefined syntactic pattern such as pattern 800 in FIG. 8. Pattern 800 identifies a noun phrase consisting of any number of adjectives or nouns followed by a noun and, optionally followed by a trailing prepositional phrase beginning with the preposition "of". By applying pattern 800 to the page of text 500 of FIG. 7, the technical terms highlighted in FIG. 9 are discovered. This pattern discovers multi-token terms, for example, "hard disk" 901, or "floppy disk" 902. Furthermore, even though the pattern may find a term with a prepositional trailing prepositional phrase, the prepositional phrase is not considered or identified as part of the technical term proper.

Figure 8:
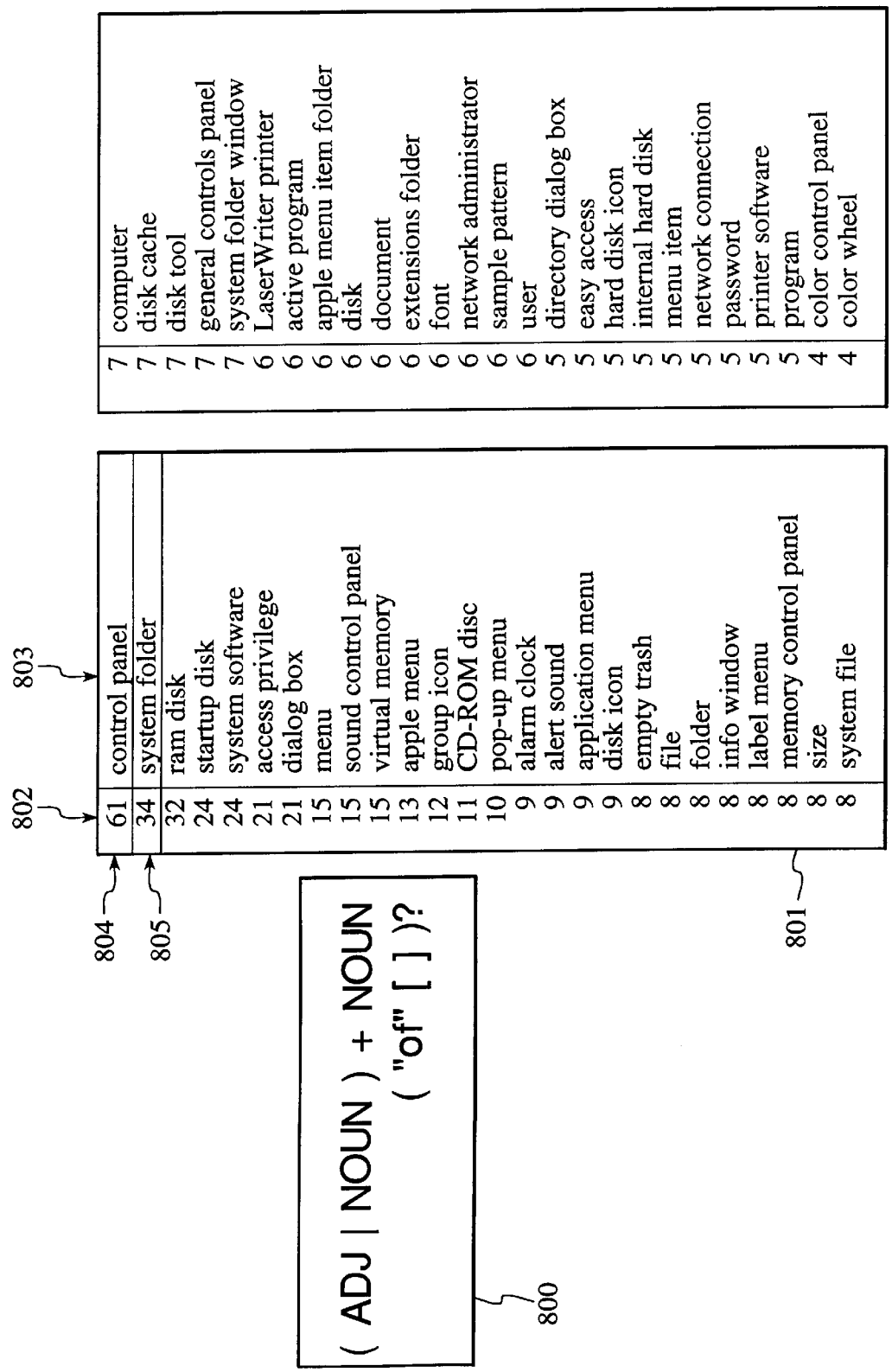
FIG. 8 is a diagram of a syntactic pattern and data structure of an embodiment of a method step of the present invention.

Those terms that are found by the pattern, matching engine as matching syntactic pattern 800 are maintained in a list of technical terms such as list 801 of FIG. 8. List 801 is a representation of the topmost portion of a list of technical terms found in the Apple Macintosh Reference guide as matching pattern 800. Two columns of information are present in list 801. The first column 802 contains numbers indicating the frequency with which technical terms in column 803 occur. For example, in mining for technical terms, the term "control panel" in row 804 was detected in the document 61 times, whereas "system folder" in row 805 was detected 34 times.

Earlier it was stated that pattern 800 discovers primarily multi-token terms, yet one may observe a number of single token terms in list 801, e.g., "menu", "file", and "disk". This is because neutral premodifiers, i.e., adjectives or nouns that are common in the language, are discarded. Thus, for example, the pattern "another menu" matches pattern 800, but the modifier "another" simply acts as linguistic glue, it is not a component of the key term "menu." Neutral modifiers are stripped, thus, "another menu" reduces to "menu".

Importantly, the pattern matching engine scans the merged file containing both linguistically annotated text and markup information, as illustrated in example F, when searching for technical terminology. In so doing, the present invention takes into account the markup information when determining the importance of identified technical terminology. If for example, a technical term is identified in a chapter, section, subsection or other structurally prominent location within a page of a document, the present invention adjusts the weight of importance of the technical term so identified by incrementing the frequency of occurrence for the given technical term. As will be seen later, frequency of occurrence of a technical term is a factor in determining whether it is considered key and thus, incorporated into the domain catalog. Thus, the list of technical terminology forms the basis for the key terms to be incorporated into the domain catalog.

Figure 6:
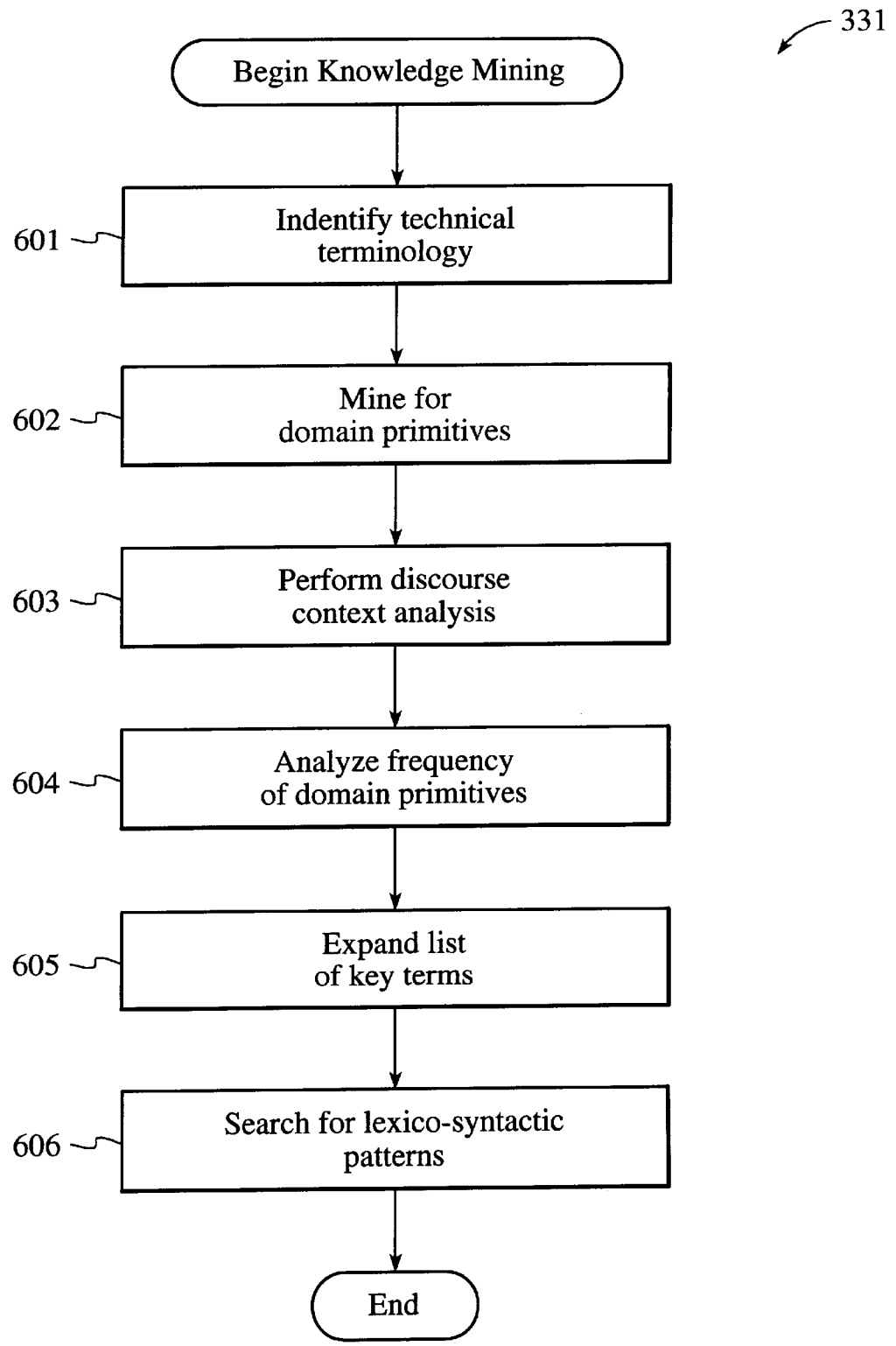
FIG. 6 is a flow diagram of an embodiment of a method step of the present invention.

Referring now to FIG. 6, the next step (step 602) in mining the merged file for knowledge involves mining for manifestations of domain primitives. A domain primitive is a primary information structuring device in a domain, typically involving, for example, key terms, an action related to or involving a key term, or a property associated with a key term.

Importantly, while key terms are generally noun phrases, not every noun phrase is a key term. As will be seen, once having found key term candidates (or the technical terms deemed to be key terms based on the frequency of their occurrence or their proximity to markup information in the text) via the pattern matching engine, a subsequent step is to search for other syntactic patterns to identify actions related to or involving key terms, for example, a syntactic pattern in which a verb is followed by an object.

(It should be noted here that an object does not have to "follow" a verb in a contiguous sense to have a valid verb-object phrase. Rather, the verb and the object need only compose, i.e., go together. Thus, the phrase, "hard disks are preinitialized" is as valid as the phrase "initialize hard disks" notwithstanding the fact that the object precedes the verb.)

If the pattern matching engine detects a verb-object phrase in which the object is simply a noun phrase and not a key term, the result may not be important in terms of identifying relations involving key terms, because it is possible the noun phrase was not identified as a technical term according to the syntactic pattern used for identifying technical terms. Thus, the pattern matching engine must identify not only particular syntactic patterns, but patterns in which, for example, the object in a verb-object phrase is a key term, as previously identified in step 601. It is for that reason that there is a separation in the steps of identification of technical terminology at step 601 and mining for manifestations of domain primitives (e.g., occurrences of relations and properties) at step 602.

Thus, importantly, the pattern matching engine of the present invention does not just search for a particular syntactic pattern defined in terms of linguistic categories alone (e.g., a verb-object phrase when searching for an action, or a noun phrase followed by the preposition "of", followed by another noun phrase when searching for a property). Rather, the pattern matching engine searches for a particular syntactic pattern sanctioned by membership of its arguments in the list of already identified key terms, for example, a verb-object phrase where the object (or a possible contraction or variation of one) is a key term. As another example, the pattern matching engine searches for a noun phrase followed by the preposition "of", followed by another noun phrase where the second noun phrase is a key term and preferably, the first noun phrase is a key term as well.

Figure 10:
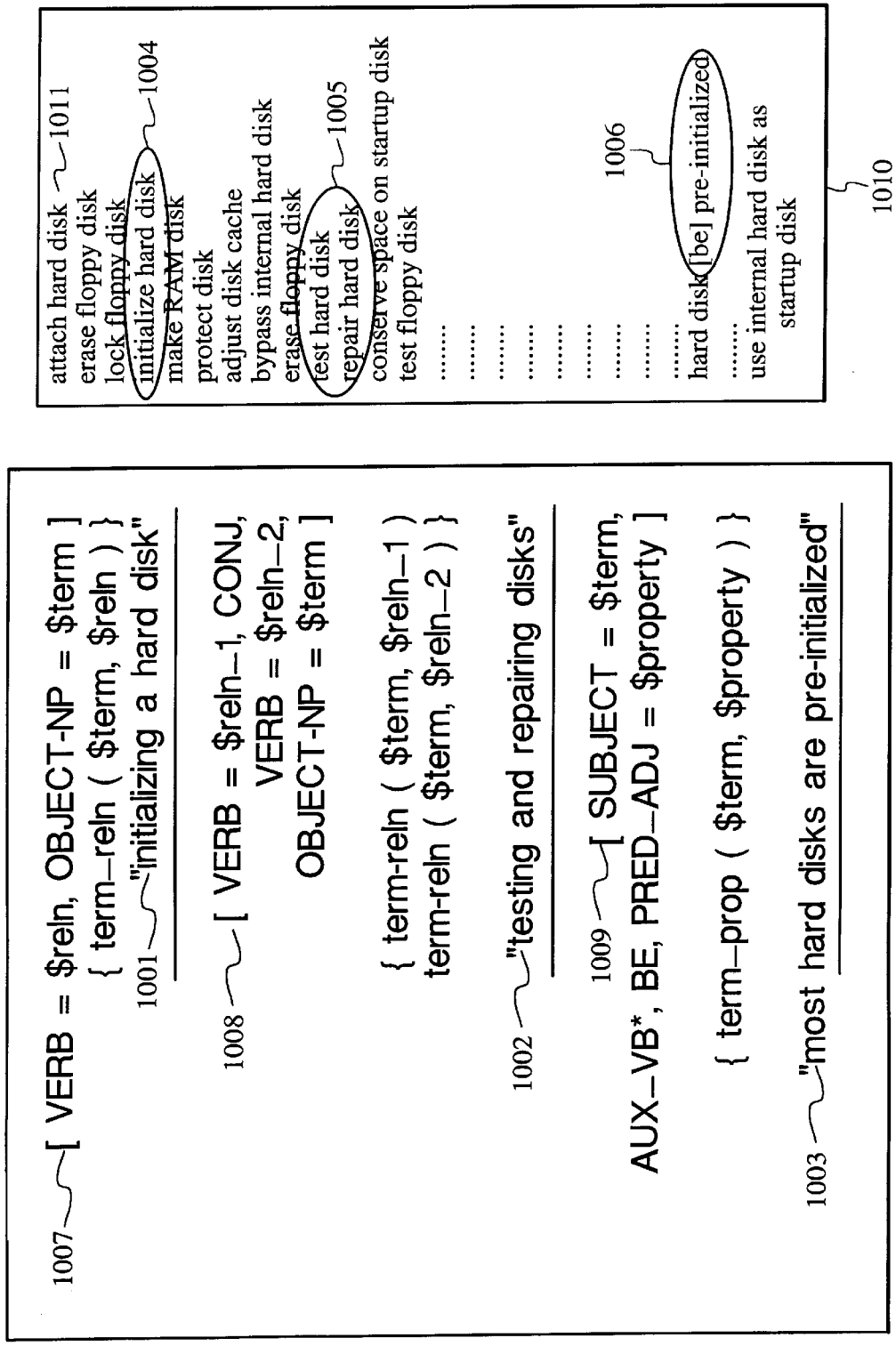
FIG. 10 is a diagram of syntactic patterns and data structure of an embodiment of a method step of the present invention.

Referring to FIG. 10, representative examples of the types of syntactic patterns involving key terms used to locate relations and properties associated with key terms are shown. In identifying relations, the syntactic pattern matching engine of the present invention searches the document looking for, as an example, syntactic pattern 1007. Pattern 1007 identifies a verb-object phrase in which the object is a noun phrase identified as a key term. By applying pattern 1007 to the page of text 500 of FIG. 7, the relation 1001 "initializing a hard disk" is located. It is then stored in an observations file 1010 as observation 1004 "initialize hard disk". (The present participle "initializing" has already been reduced to its morphological base form "initialize".) Referring to FIG. 11, verb "Initializing" 1101 is circled to indicate a relation with a key term, in this example, "hard disk" 901, has been identified.

Yet another relation may be identified by looking for, as an example, syntactic pattern 1008. Pattern 1008 identifies a syntactic pattern comprising a verb followed by a conjunction and a verb-object phrase in which the object is a noun phrase identified as a key term. By applying pattern 1008 to the page of text 500 of FIG. 7, the relation 1002 "testing and repairing disks" is located. It is stored in observations file 1010 as two separate relations at observation 1005, "test hard disk" and "repair hard disk". As in the previous example, the present participles "testing" and "repairing" are reduced to their morphological base forms "test" and "repair". Referring to FIG. 11, verbs "Testing" 1102 and "Repairing" 1103 are circled indicating a relation with a key term has been located.

The last example presented in FIG. 10 identifies a property. The pattern looks for a post-nominal modification of a noun phrase (a subject noun phrase) by an adjective. The adjective is called the "property" of the term in the subject noun phrase position. If such a pattern is found, the pattern matching engine of the present invention identifies a property. By applying pattern 1009 to the page of text 500, the property 1003 "most hard disks are pre-initialized" is found. It is stored in observations file 1010 as observation 1006 "hard disk [be] pre-initialized". Referring to FIG. 11, the adjective "pre-initialized" is circled indicating it is a property of the key term "hard disks" 1105.

FIG. 12 provides further examples of mining for manifestations of domain primitives, in this example, involving identification of properties, e.g., property 1201 is found by searching for a possessive form of a key term followed by a noun. Properties 1202, 1203, and 1204 are identifiable by a syntactic pattern comprising a noun phrase followed by a prepositional phrase beginning with the preposition "of" and ending with a noun phrase in which the noun phrase is identified as a key term.

In summary, the notion of mining for manifestations of domain primitives is to first identify technical terminology as discussed above with reference to step 601. Then, at step 602, rather than blindly search for further pertinent information to be incorporated into the domain catalog, i.e., manifestations of relations and properties, use the key terms as a reference, or anchor points, for further mining expeditions. For example, a manifestation of a relation can be assumed to be much more important if it has been sanctioned by a key term, in the sense that there are multiple occurrences of a key term, e.g., "hard disk" and a relation it participates in, e.g., "initialize" (or derivatives and inflections thereof as a result of morphological analysis) in the same document. The more often there is a syntactic collocation, i.e., a repeated occurrence in identical syntactic roles between a term and a manifestation of a relation or property, the more important the manifestation. Thus, the importance of a manifestation of a domain primitive is defined by its frequency of co-occurrence with a key term in like syntactic roles. In order to make that observation, linguistic analysis must first determine, for example, that "disk" is a noun and it is in object position with respect to the verb "initialize".

At this point in knowledge mining step 331, it is unknown which of the observed and recorded manifestations of relations and properties with respect to key terms are important. The observations file might contain, for example, "purchase hard disk"—all that has been identified at this point is a manifestation of a relation with a key term. Thus, the observations file can become very large. However, as will be seen, frequency analysis of manifestations of domain primitives is carried out at step 604. At that step, a decision is made to retain manifestations of domain primitives of sufficient prominence, such as the relation "initialize hard disk", but discard manifestations of domain primitives such as the relation "purchase hard disk", on the basis of frequency of occurrence in the observations file.

Importantly, this observation by the present invention of collocation with respect to the syntactic structure of a sentence does not require semantic analysis or even full syntactic analysis. The output of the shallow syntactic analyzer at step 303 provides sufficient information to detect the presence of, for example, a subject-verb-object or verb-object phrase, and thus, trigger the knowledge mining process. It is immaterial that there may be 25 words between the verb and the object—collocation of syntactic roles is unaffected.

Referring to FIG. 6, at step 603, the discourse context of each sentence or phrase in the merged file is analyzed to more accurately record in the observations file the list of manifestations of domain primitives and avoid incomplete recording of linguistic observations. This analysis is done on the output of the pattern matching engine, rather than on all of the text prior to the pattern matching. Discourse analysis takes into consideration the way in which text is written. For example, it is common to substitute a pronoun for a technical term, or to contract a term. Discourse analysis performs such functions as expanding contractions and substituting pronouns with their antecedent form. Take, for example, the two sentences beginning at 1106 in FIG. 11, which state, "If your hard disk does not appear on the desktop, first try to repair it . . . If you can't repair the disk, use the . . . to reinitialize the disk." If the pattern matching engine of the present invention only performs syntactic pattern matching, and it is attempting to sanction the occurrence of patterns where "hard disk" appears in the object position of a noun phrase, it will locate phrases such as "initializing a hard disk" and "hard disk is erased". However, in the example provided, while the pattern matching engine will locate a verb-object phrase ("repair" and "it"), it will not do anything with the phrase because the object "it" is not a term itself, even though as a pronoun "it" has a valid antecedent basis, i.e., the pronoun "it" refers back to the term "hard disk". Likewise, the pattern matching engine will fail to locate the relation "reinitialize the disk" because "disk" is not "hard disk", but a contraction thereof. Thus, even though one may readily observe "it" refers to "hard disk" and "the disk" is a contraction of "hard disk", the pattern matching engine, without discourse analysis, will fail to appropriately react to these common uses of language.

Having performed discourse analysis at step 603 to, for example, resolve pronoun references to their antecedent basis or to expand phrase contractions to their full form as they have been introduced in the discourse earlier, it is "repair hard disk" that gets recorded as a manifestation of a verb-object relation with "hard disk" in the object position, not simply the pronoun "it". Likewise, "reinitialize the disk" is recognized as "reinitialize the hard disk". As a result of discourse analysis, relation 1002 in FIG. 10 resolves to "testing and repairing hard disks". The observations recorded in the observations file at 1005 reflect this analysis. A further observation made at this point is the use of the conjunction "and" which distributes the object "hard disk" to both "testing" and "repairing", thus, the two entries in the observations file at 1005: "test hard disk" and "repair hard disk".

Referring again to FIG. 6, the next step, step 604, analyzes the frequency of manifestations of domain primitives to determine on that basis those relations and properties which are important and representative of the domain and those that are not. Those manifestations that are not important nor representative of the domain, e.g., "purchase a hard disk", are discarded.

Step 605 contemplates expanding the list of key terms by finding terms that are closely related in the domain to a term already known as important, i.e., a key term. The list of key terms is expanded upon, essentially by attempting to find terms that failed to be located up to this point in the process of mining. For example, the technical terminology identification analysis at step 601 required that the length of a noun phrase be at least two tokens in length, i.e., either an adjective or noun, followed by another noun. Terms of one token in length, therefore, were not located. Expanding the list of key terms involves first scanning the observations file to locate a relation which has been deemed important because of its discourse context and frequency of occurrence as determined at steps 603 and 604, respectively. Then, the observations file is searched to locate tokens, e.g., nouns, that are closely related to a domain primitive already deemed important. In this way, the pattern matching engine leverages off all the analysis performed up to this point (including identifying technical terms and domain primitives, and performing discourse and frequency analysis) and stored in the observations file. For example, assume the domain primitive "attaching a hard disk" (in observations file 1010 in its morphological base form "attach hard disk" at 1011) is followed by the prepositional phrase "to printer" in the merged file. The pattern matching engine did not locate the term "printer" during the search for technical terminology identification at step 601 because "printer" is a single token. However, the phrase "attach hard disk to printer" was located in mining for domain primitives at step 602 and placed in the observations file because there is a general pattern (verb-object-complement). Assuming the function "attaching a hard disk" is an important relation in the domain, then, arguably, so are its adjuncts. Thus, the analysis performed on the observations file at this step will add "printer" to the list of key terms.

Expanding the list of key terms, i.e., searching for single tokens in the observations file, is performed at step 605, well after identifying technical terminology at step 601, primarily because it is not driven by matching patterns in the merged file. This step makes use of the observations file as input, which is not created until step 602 (mining for domain primitives) and which is further modified at steps 603 (discourse analysis) and 604 (frequency analysis of domain primitives).

Step 606 involves scanning the merged file yet again for larger relations by searching for particular lexico-syntactic patterns involving key terms from the list of key terms 801 and domain primitives from the observations file 1010. The notion is that the pattern matching engine may well have already found, for example, "hard disk" and "attach hard disk to a printer", but there are certain patterns better defined in terms of such larger phrased units. For example, in addition to finding domain primitives, e.g., properties of a term and relations between terms, a higher order relation might be a definition of a key term as a textual or phrasal unit. Because an attempt is made to locate phrases incorporating terms, this step is performed after first locating as many terms as possible. Thus technical terms are identified, manifestations of domain primitives are located, discourse analysis is performed and expansion of the list of key term is completed before the search for lexico-syntactic patterns is undertaken. Furthermore, because this step uses as input the merged file, it leverages off not just the sentence structure but the document structure as well, i.e., the markup information. For example, if an introduction to a term relation is located, e.g., "adjust memory size" in an infinitive form, and markup information indicating a sequence of six phrasal units conforming to a particular format immediately follows the relation, then a sequence of steps which instruct the user how to adjust memory size has been located and identified. This is an example of a much larger relation in the domain which relates to an already identified relation, i.e., the verb-object phrase "adjust memory size" in the observations file.

Referring to FIG. 13, an example of the type of lexico-syntactic pattern that might be searched for includes pattern 1301 beginning with the phrase, "if you can't . . . ". If a pattern such as text string 1302 is found, a relation 1310 is created in the observations file which ultimately will be incorporated into domain catalog 1300 under key term "hard disk" 1311. (It should be noted that observation 1310 is not complete as shown. It should further include an answer to the questions, "What if I can't: repair [self] or initialize [self]", such as "Use Apple HD Setup Program to reinitialize disk".) As another example, pattern 1303 searches for the verb "use" followed by a noun phrase which is a key term, followed by a verb phrase introduced by the infinitival marker "to." If a pattern such as text string 1304 is found, a relation 1308 is ultimately created in domain catalog 1300 under key term "Apple HD SC Setup program" 1307, defining a "used for" relation for that term. As a final example, pattern 1305 indicates a search for a noun phrase which is a key term, followed by a hyphen ("-"), a noun, either the word "which" or "that", further followed by a verb phrase, and finally followed by a matching (closing) hyphen. If a pattern such as text string 1306 is located, a key word "virus" 1309 is created, as well as a relation (i.e., its definition) 1312 in domain catalog 1300 thereunder.

Information Structuring

Figure 14:
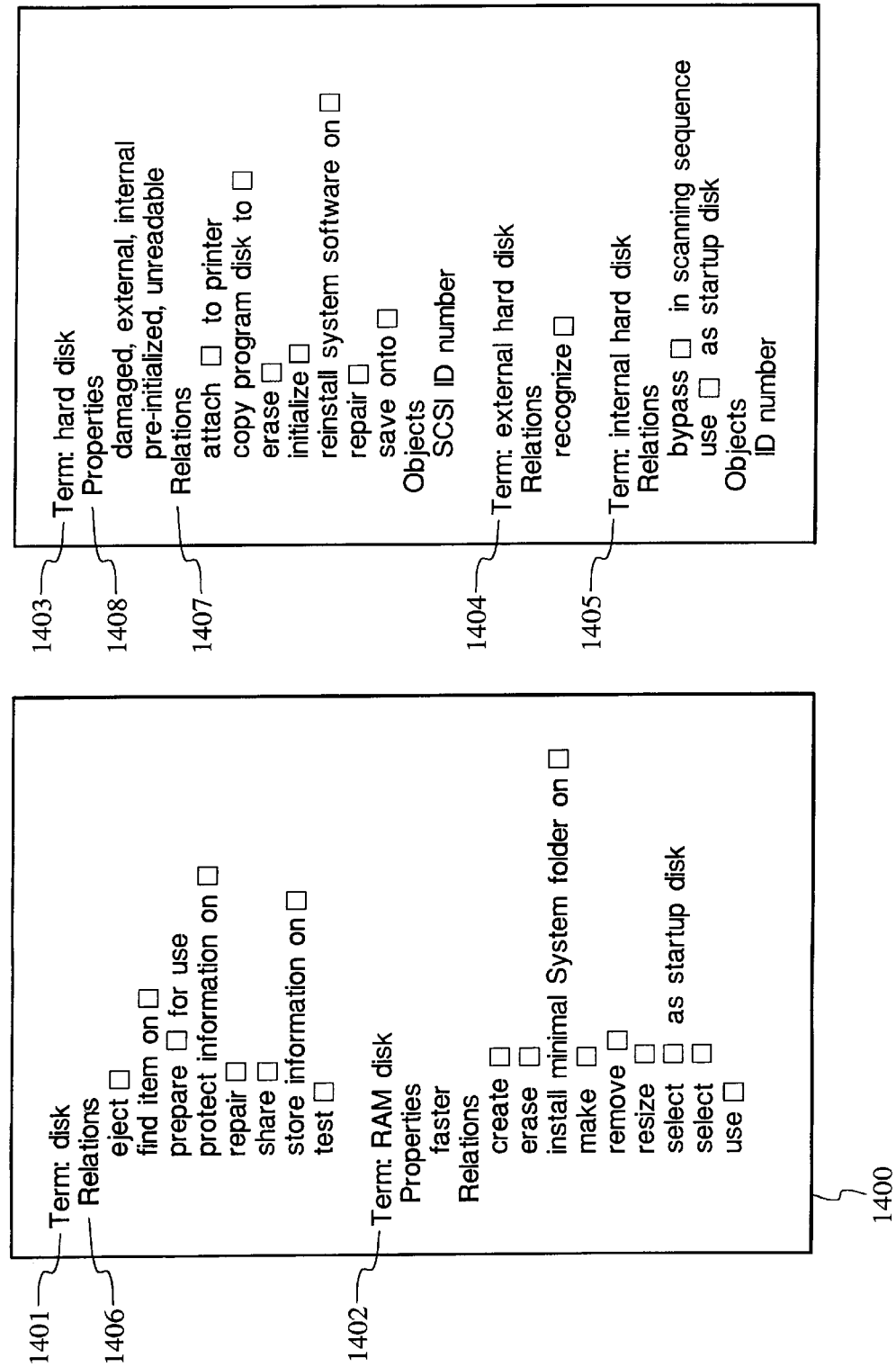
FIG. 14 is a diagram of a data structure of an embodiment of the present invention.

The basic goal of the present invention is to automatically create a domain catalog through a process of linguistic analysis. Upon completion of step 331, however, a domain catalog has yet to be created. What does exist at this point in an embodiment of the present invention is the merged file (example F) containing linguistically analyzed and annotated text and markup information, the list of identified key terms 801, and the observations file 1010 (incorporating all the processing undertaken at steps 603 through 606). Referring to FIG. 14, at step 332, these sources of information are tapped to build the data structure of the domain catalog 1400, including cross references between the key terms present in the catalog. Building the data structure of domain catalog 1400 essentially involves combining key terms from the list of key terms 801 with appropriate information logged in the observations file 1010.

The list of key terms 801 mediates the process of creating domain catalog 1400. The list of key terms 801 forms the basis for a high level index in domain catalog 1400. For example, disk 1401, RAM disk 1402, hard disk 1403, external hard disk 1404 and internal hard disk 1405 form a high level index in domain catalog 1400. Information, e.g., relations, properties, and objects (i.e., key terms which are properties of, and thus related to, other key terms, and which become cross references in domain catalog) from observations file 1010 is provided as input as well. For example, those relations in observations file 1010 relating to the term "disk" are placed in domain catalog 1400 in a field "Relations" 1406 under the term "disk" 1401, e.g., eject, find item on, prepare [ ] for use, etc., whereas relations in the observations file relating to, for example, the term "hard disk" are placed in domain catalog 1400 in a field "Relations" 1407 under the term "hard disk" 1403, e.g., attach [ ] to printer, erase, initialize, etc. and so on. Likewise, properties from observations file 1010 are placed in domain catalog 1400 under their respective key term. For example, those properties in observations file 1010 relating to "hard disk" are placed in domain catalog 1400 in a field "Properties" 1408 under the term "hard disk" 1403, e.g., damaged, external, internal, etc.

In addition to incorporating information from observations file 1010 and key terms from the list of key terms 801 into domain catalog 1400, clustering is performed. Two types of clustering are accomplished: clustering for similarity of use, and clustering for proximity (topicality).

Clustering for similarity of use essentially provides a type of cross-reference of the terms in the domain. As used in this context, similarity of use indicates the degree to which the set of relations associated with each term is an overlapping set. The greater the degree to which the set of relations associated with each term overlap, the greater the degree of similarity of use and thus, a cross-reference between the two terms may be established. Importantly, it is the linguistic processes of the present invention that establish the semantic relationship purely on the basis of observing regular syntactic patterns in the text source from which the terms were derived. For example, the term "document" may have as its set of relations open, close, resize, and delete. The term "file" shares a similar set of relations: open, close, and delete. Likewise with the term "window". Thus, there is some sense in which file, document and window are similar in that they repeatedly appear in similar syntactic environments, i.e., they have the same relations associated with them. The clustering is not on the basis of words or even tokens, but rather on phrases. Moreover, the clustering involves only the phrases which are deemed important.

Clustering key terms for topicality on the basis of proximity is entirely different than clustering on the basis of similarity of use. Clustering on the basis of proximity involves clustering terms on the basis of their physical position in the text with respect to other terms. This process, at a certain level of abstraction, is essentially accomplished by scanning the text with a window through which a fixed number of terms and phrases at any given time is visible. Any time the same two terms or phrases appear in the window, a counter is incremented. At the end of scanning the entire document, a matrix exists providing the frequency of close co-occurrence of a term with respect to each other term in the document, i.e., the result of the process is a measure of how often a term was seen in the window (across the entire document) with each other term. For example, if a term such as "RAM disk" is seen with enough frequency in the physical proximity of another term such as "battery power", while the terms would not be related in terms of similarity of use, the fact that they occur often (relatively speaking) in close proximity with one another suggests there is some semantic or domain connection between the two. By establishing a cross reference between terms according to proximity measures, an additional method is established for navigating through the domain catalog on the basis of semantic relatedness.

Thus, a method involving computer-mediated linguistic analysis of online technical documentation to extract and catalog from the documentation knowledge essential to, for example, creating a online help database useful in providing online assistance to users in performing a task is described.

I claim:

1. A machine-readable medium having stored thereon sequences of instructions, which when executed by a processor cause the processor to:
   a) linguistically analyze and annotate text of online documentation to create a linguistically analyzed and annotated text;
   b) mine said linguistically analyzed and annotated text for text representative of said online documentation, including:

i) searching for syntactic patterns indicative of key terms and maintaining a list of said key terms, ii) searching for syntactic patterns indicative of manifestations of a domain primitive involving one of said key terms and maintaining a list of said manifestations, and iii) analyzing said list of said manifestations to determine said manifestations that are representative of said online documentation on the basis of frequency of their occurrence; and c) combining said list of said key terms and said list of said manifestations that are representative of said online documentation in a domain catalog.

2. A machine-readable medium having stored thereon sequences of instructions, which when executed by a processor cause the processor to:

(a) linguistically analyze and annotate a source code document in a computer system;

(b) mine the linguistically analyzed and annotated source code for code representative of a library of variables and procedure calls, wherein mining further comprise sequences of instructions that cause the processor to:

(i) search for syntactic patterns indicative of key terms comprising variables and procedure calls, and maintaining a list of the key terms, (ii) search for syntactic patterns indicative of manifestations of a primitive involving one of the key terms and maintaining a list of the manifestations, and (iii) analyze the list of the manifestations to determine the manifestations that are representative of the variables and procedure calls on the basis of frequency of occurrence;

(c) combine the list of the key terms and the list of the manifestations that are representative of the variables and procedure calls in a library file; and (d) use the library file to create the library of variables and procedure calls.

3. A machine-readable medium having stored thereon sequences of instructions, which when executed by a processor cause the processor to:

(a) linguistically analyze and annotate text of an online technical document to create a linguistically analyzed and annotated text, further comprising sequences of instructions that cause the processor to:

(i) lexically and morphologically analyze the text, and (ii) disambiguate between possible parts-of-speech for each word of the text and identify a syntactic function for each word of the text;

(b) mine the linguistically analyzed and annotated text for text representative of the online technical document, further comprising sequences of instructions that cause the processor to:

(i) search for syntactic patterns indicative of technical terms and maintain a list of the technical terms and frequency with which the technical terms occur in the text, and (ii) search for syntactic patterns indicative of manifestations of a domain primitive involving one of said technical terms and maintain a list of the manifestations, (iii) analyze the list of the manifestations to determine the manifestations that are representative of the online technical documentation on the basis of frequency of occurrence, (iv) expand the list of technical terms by searching the list of the manifestations for syntactic patterns involving additional term not presently in said list of said technical terms that are adjunct to the manifestations, (v) search the online technical documentation for lexico-syntactic patterns indicative of larger relations involving the technical terms, the additional terms and the manifestations; and (c) combine the technical terms, the additional terms, the manifestations, and the larger relations in a domain catalog.

4. A machine-readable medium having stored thereon sequences of instructions, which when executed by a processor cause the processor to:

(a) translate an American Standard Code for Information Interchange (ASCII) data file having stored therein an online technical document and information regarding a proprietary internal representation for the online technical document to a second ASCI data file having stored therein the online technical document and information regarding standard internal representation of the online technical document;

(b) separate text of the online technical document from the information regarding the standard internal representation for the online document;

(c) linguistically analyze and annotate the text of the online technical document to create a linguistically analyzed and annotated text, further comprising sequences of instructions that cause the processor to:

(i) lexically and morphologically analyze the text to determine possible lexical and morphological features, and (ii) disambiguate between possible parts-of-speech for each word of the text and identify a syntactic function for each word of the text, (d) label each word of the text and the annotations;

(e) combine the linguistically analyzed and annotated text with the information regarding the standard internal representation for the online document into a merged file;

(f) mine the merged file for text representative of the online technical document further comprising sequences of instructions that cause the processor to:

(i) identify key terms further comprising sequences of instructions that cause the processor to:

(A) search for syntactic patterns indicative of technical terms, and (B) maintaining a list of the key terms comprising the technical terms and the frequency with which the technical terms occur, (ii) search for syntactic patterns indicative of manifestations of a domain primitive involving one of the key terms and maintaining a list of the manifestations and the frequency with which the manifestations occur, (iii) discourse analyze each phrase in the merged file to resolve conjunctions and antecedent basis of pronouns to more accurately record the manifestations and the frequency with which the manifestations occur, (iv) analyze the list of the manifestations to determine the manifestation that are representative of the online document on the basis of the frequency with which the manifestations occur, (v) expand the list of key terms by searching the list of the manifestations for syntactic patterns involving additional terms not presently in the list of key terms that are adjunct to one of the manifestations, and (vi) search the online technical document for lexico-syntactic patterns indicative of larger relations involving one of the key terms and one of the manifestations and maintain a list of the larger relations; and (g) combine the key terms, the manifestations, and the larger relations in a domain catalog.

5. The machine-readable medium of claim 4 wherein said frequency with which said technical terms occur in said merged file is weighted according to said information regarding said standard internal representation for said online document.

6. The machine-readable medium of claim 4 wherein analyzing said list of manifestations to determine said manifestations that are representative of said online document on the basis of said frequency with which said manifestations occur is weighted according to said information regarding said standard internal representation for said online document.

7. The machine-readable medium of claim 4 wherein the sequences of instructions that cause the processor to combine said key terms, said manifestations, and said larger relations in a domain catalog further comprises sequences of instructions that cause the processor to:

a) cluster said key terms for similarity of use on the basis of repeated manifestations of said manifestations of a domain primitive occurring in a similar syntactic context;

b) cluster said key terms on the basis of proximity of said key terms in said merged file with respect to other said key terms; and c) index said domain catalog by said key terms such that each of said key terms is an index therein, and incorporate said manifestations and said larger relations according to said indexed key terms.

\* \* \* \* \*